(12) United States Patent
Tran et al.

(10) Patent No.: US 12,444,449 B2
(45) Date of Patent: Oct. 14, 2025

(54) OUTPUT BLOCK FOR ARRAY OF NON-VOLATILE MEMORY CELLS

(71) Applicant: Silicon Storage Technology, Inc., San Jose, CA (US)

(72) Inventors: Hieu Van Tran, San Jose, CA (US); Hoa Vu, Milpitas, CA (US); Stephen Trinh, San Jose, CA (US); Stanley Hong, San Jose, CA (US); Thuan Vu, San Jose, CA (US); Nghia Le, Ho Chi Minh (VN); Duc Nguyen, Ho Chi Minh (VN); Hien Pham, Ho Chi Minh (VN)

(73) Assignee: Silicon Storage Technology, Inc., San Jose, CA (US)

( * ) Notice: Subject to any disclaimer, the term of this patent is extended or adjusted under 35 U.S.C. 154(b) by 237 days.

(21) Appl. No.: 18/195,322

(22) Filed: May 9, 2023

(65) Prior Publication Data

US 2024/0282351 A1    Aug. 22, 2024

Related U.S. Application Data

(60) Provisional application No. 63/446,210, filed on Feb. 16, 2023.

(51) Int. Cl.
*G11C 7/12*    (2006.01)
*G11C 7/14*    (2006.01)
(Continued)

(52) U.S. Cl.
CPC ............... *G11C 7/16* (2013.01); *G11C 7/12* (2013.01); *G11C 7/14* (2013.01); *G11C 11/54* (2013.01); *G11C 16/26* (2013.01)

(58) Field of Classification Search
CPC .... G11C 7/16; G11C 7/12; G11C 7/14; G11C 11/54; G11C 16/26; G11C 7/1006; G11C 16/0483; G11C 7/1069
(Continued)

(56) References Cited

U.S. PATENT DOCUMENTS 5,029,130 A    7/1991  Yeh
6,747,310 B2   6/2004  Fan
(Continued)

FOREIGN PATENT DOCUMENTS

TW    202303382       1/2023
WO    2022 245382    11/2022
(Continued)

OTHER PUBLICATIONS

PCT Search Report and Written Opinion mailed on Dec. 18, 2023 corresponding to the related PCT Patent Application No. PCT/US2023/022969.
(Continued)

*Primary Examiner* — Ly D Pham
(74) *Attorney, Agent, or Firm* — Vedder Price P.C.

(57) ABSTRACT

In one example, a system comprises an array of non-volatile memory cells arranged into rows and columns, the array comprising a first bit line coupled to a first column of non-volatile memory cells and a second bit line coupled to a second column of non-volatile memory cells; and an output block coupled to the array, the output block comprising: a current-to-voltage converter to convert a first current on the first bit line into a first voltage and to convert a second current on the second bit line into a second voltage; and an analog-to-digital converter to convert one or more of the first voltage and the second voltage into a set of output bits.

19 Claims, 62 Drawing Sheets

(51) Int. Cl.
*G11C 7/16* (2006.01)
*G11C 11/54* (2006.01)
*G11C 16/26* (2006.01)

(58) Field of Classification Search
USPC .......................................................... 365/191
See application file for complete search history.

(56) References Cited

U.S. PATENT DOCUMENTS

| | | | | |
|---|---|---|---|---|
| 7,589,990 | B2* | 9/2009 | Sung | G11C 17/12 365/72 |
| 2008/0309530 | A1* | 12/2008 | Baker | G11C 11/5642 341/143 |
| 2017/0337466 | A1 | 11/2017 | Bayat et al. | |
| 2018/0321942 | A1* | 11/2018 | Yu | G06F 9/30036 |
| 2019/0213234 | A1* | 7/2019 | Bayat | G11C 16/0483 |
| 2019/0221262 | A1* | 7/2019 | Ma | G06F 18/24147 |
| 2020/0202203 | A1* | 6/2020 | Nakayama | G11C 13/0028 |
| 2021/0271959 | A1* | 9/2021 | Chettuvetty | G06N 3/065 |
| 2021/0287065 | A1 | 9/2021 | Bayat | |
| 2021/0334633 | A1 | 10/2021 | Hwang | |
| 2021/0375333 | A1 | 12/2021 | Rana | |
| 2022/0101085 | A1* | 3/2022 | Garcia Redondo | G06N 3/065 |
| 2022/0215239 | A1 | 7/2022 | Tran et al. | |
| 2022/0230678 | A1* | 7/2022 | Chakraborty | G11C 11/419 |
| 2022/0270683 | A1* | 8/2022 | Nakao | G11C 13/0038 |
| 2024/0021242 | A1* | 1/2024 | Park | G11C 13/0026 |
| 2024/0089628 | A1* | 3/2024 | Kale | H04N 25/75 |

FOREIGN PATENT DOCUMENTS

| | | |
|---|---|---|
| WO | 2022/245384 A1 | 11/2022 |
| WO | 2023 014386 | 2/2023 |

OTHER PUBLICATIONS

PCT Invitation to Pay Additional Fees mailed on Oct. 18, 2023 corresponding to the related PCT Patent Application No. PCT/US2023/022969.

Kang Minseok, et al, "Peripheral Circuit Optimization with Precharge Technique of Spin Transfer Torque MRAM Synapse Array," IEEE, Jun. 27, 2021, pp. 1-3.

U.S. Appl. No. 17/875,281, filed Jul. 27, 2022 entitled "Precise Data Tuning Method and Apparatus for Analog Neural Memory in an Artificial Neural Network," Tran, et al.

U.S. Appl. No. 18/080,545, filed Dec. 13, 2022 entitled "Verification Method And System In Artificial Neural Network Array," Tran, et al.

Taiwanese Office Action mailed on Jan. 8, 2025 corresponding to the related Taiwanese Patent Application No. 113102658. (Google English Translations and original Taiwanese Office Action.).

* cited by examiner

2100

FIGURE 24
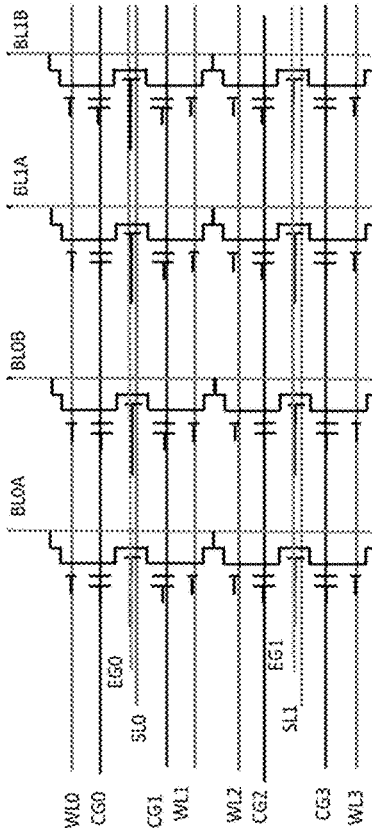
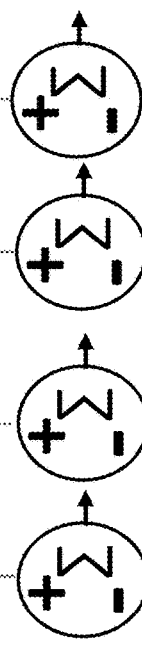
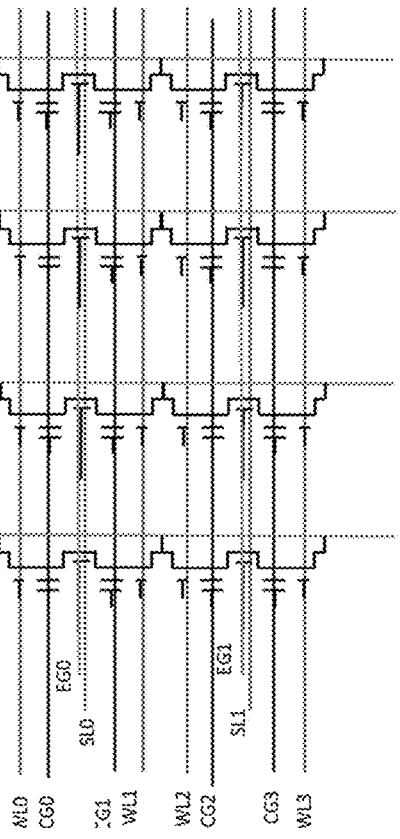
VMM System 2410
w+ array 2411
w- array 2412
2413

FIGURE 51
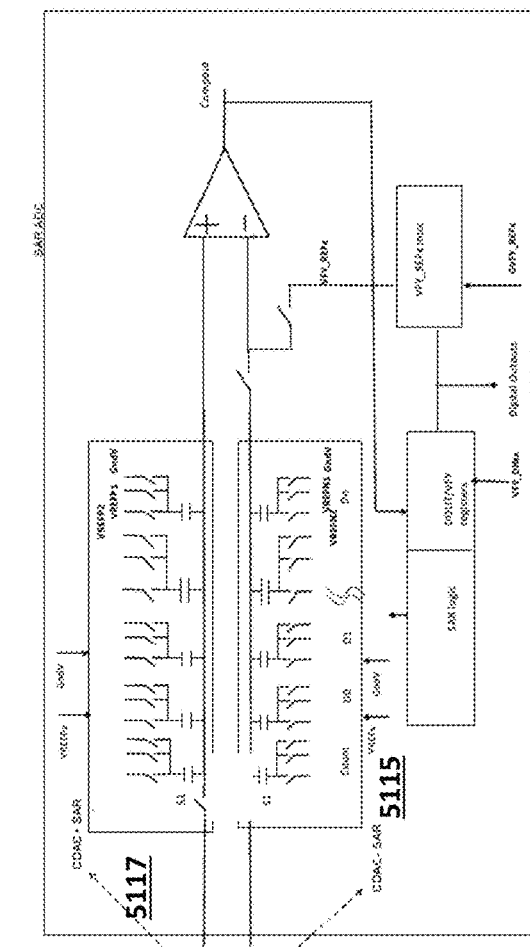
Output Block for Colum Pair
5100
SAR ADC
5102
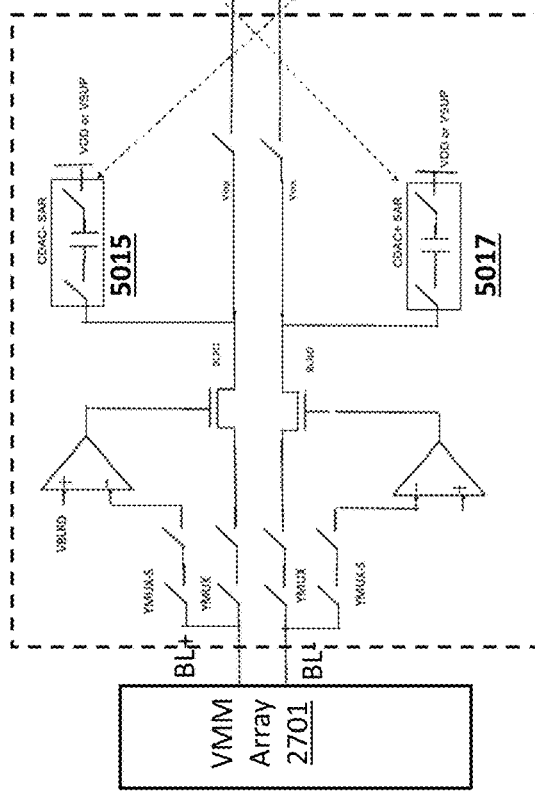
Current-to-Voltage Converter
5001
VMM Array 2701

OUTPUT BLOCK FOR ARRAY OF NON-VOLATILE MEMORY CELLS

PRIORITY CLAIM

This application claims priority to U.S. Provisional Patent Application No. 63/446,210, filed on Feb. 16, 2023, and titled, "Output Block for Neural Network Array," which is incorporated by reference herein.

FIELD OF THE INVENTION

Numerous examples are disclosed of an output block for an array of non-volatile memory cells.

BACKGROUND OF THE INVENTION

Artificial neural networks mimic biological neural networks (the central nervous systems of animals, in particular the brain) and are used to estimate or approximate functions that can depend on a large number of inputs and are generally unknown. Artificial neural networks generally include layers of interconnected "neurons" which exchange messages between each other.

FIG. 1 illustrates an artificial neural network, where the circles represent the inputs or layers of neurons. The connections (called synapses) are represented by arrows and have numeric weights that can be tuned based on experience. This makes neural networks adaptive to inputs and capable of learning. Typically, neural networks include a layer of multiple inputs. There are typically one or more intermediate layers of neurons, and an output layer of neurons that provide the output of the neural network. The neurons at each level individually or collectively make a decision based on the received data from the synapses.

One of the major challenges in the development of artificial neural networks for high-performance information processing is a lack of adequate hardware technology. Indeed, practical neural networks rely on a very large number of synapses, enabling high connectivity between neurons, i.e., a very high computational parallelism. In principle, such complexity can be achieved with digital supercomputers or specialized graphics processing unit clusters. However, in addition to high cost, these approaches also suffer from mediocre energy efficiency as compared to biological networks, which consume much less energy primarily because they perform low-precision analog computation. CMOS analog circuits have been used for artificial neural networks, but most CMOS-implemented synapses have been too bulky given the high number of neurons and synapses.

Applicant previously disclosed an artificial (analog) neural network that utilizes one or more non-volatile memory arrays as the synapses in U.S. Patent Application Publication 2017/0337466A1, which is incorporated by reference. The non-volatile memory arrays operate as an analog neural memory and comprise non-volatile memory cells arranged in rows and columns. The neural network includes a first plurality of synapses configured to receive a first plurality of inputs and to generate therefrom a first plurality of outputs, and a first plurality of neurons configured to receive the first plurality of outputs. The first plurality of synapses includes a plurality of memory cells, wherein each of the memory cells includes spaced apart source and drain regions formed in a semiconductor substrate with a channel region extending there between, a floating gate disposed over and insulated from a first portion of the channel region and a non-floating gate disposed over and insulated from a second portion of the channel region. Each of the plurality of memory cells store a weight value corresponding to a number of electrons on the floating gate. The plurality of memory cells multiply the first plurality of inputs by the stored weight values to generate the first plurality of outputs.

Non-Volatile Memory Cells

Non-volatile memories are well known. For example, U.S. Pat. No. 5,029,130 ("the '130 patent"), which is incorporated herein by reference, discloses an array of split gate non-volatile memory cells, which are a type of flash memory cells. Such a memory cell 210 is shown in FIG. 2. Each memory cell 210 includes source region 14 and drain region 16 formed in semiconductor substrate 12, with channel region 18 there between. Floating gate 20 is formed over and insulated from (and controls the conductivity of) a first portion of the channel region 18, and over a portion of the source region 14. Word line terminal 22 (which is typically coupled to a word line) has a first portion that is disposed over and insulated from (and controls the conductivity of) a second portion of the channel region 18, and a second portion that extends up and over the floating gate 20. The floating gate 20 and word line terminal 22 are insulated from the substrate 12 by a gate oxide. Bitline 24 is coupled to drain region 16.

Memory cell 210 is erased (where electrons are removed from the floating gate) by placing a high positive voltage on the word line terminal 22, which causes electrons on the floating gate 20 to tunnel through the intermediate insulation from the floating gate 20 to the word line terminal 22 via Fowler-Nordheim (FN) tunneling.

Memory cell 210 is programmed by source side injection (SSI) with hot electrons (where electrons are placed on the floating gate) by placing a positive voltage on the word line terminal 22, and a positive voltage on the source region 14. Electron current will flow from the drain region 16 towards the source region 14. The electrons will accelerate and become heated when they reach the gap between the word line terminal 22 and the floating gate 20. Some of the heated electrons will be injected through the gate oxide onto the floating gate 20 due to the attractive electrostatic force from the floating gate 20.

Memory cell 210 is read by placing positive read voltages on the drain region 16 and word line terminal 22 (which turns on the portion of the channel region 18 under the word line terminal). If the floating gate 20 is positively charged (i.e., erased of electrons), then the portion of the channel region 18 under the floating gate 20 is turned on as well, and current will flow across the channel region 18, which is sensed as the erased or "1" state. If the floating gate 20 is negatively charged (i.e., programmed with electrons), then the portion of the channel region under the floating gate 20 is mostly or entirely turned off, and current will not flow (or there will be little flow) across the channel region 18, which is sensed as the programmed or "0" state.

Table No. 1 depicts typical voltage and current ranges that can be applied to the terminals of memory cell 210 for performing read, erase, and program operations:

TABLE NO 1

Operation of Flash Memory Cell 210 of FIG. 2

|  | WL | BL | SL |
|---|---|---|---|
| Read | 2-3 V | 0.6-2 V | 0 V |
| Erase | ~11-13 V | 0 V | 0 V |
| Program | 1-2 V | 10.5-3 µA | 9-10 V |

Other split gate memory cell configurations, which are other types of flash memory cells, are known. For example, FIG. 3 depicts a four-gate memory cell 310 comprising source region 14, drain region 16, floating gate 20 over a first portion of channel region 18, a select gate 22 (typically coupled to a word line, WL) over a second portion of the channel region 18, a control gate 28 over the floating gate 20, and an erase gate 30 over the source region 14. This configuration is described in U.S. Pat. No. 6,747,310, which is incorporated herein by reference for all purposes. Here, all gates are non-floating gates except floating gate 20, meaning that they are electrically connected or connectable to a voltage source. Programming is performed by heated electrons from the channel region 18 injecting themselves onto the floating gate 20. Erasing is performed by electrons tunneling from the floating gate 20 to the erase gate 30.

Table No. 2 depicts typical voltage and current ranges that can be applied to the terminals of memory cell 310 for performing read, erase, and program operations:

TABLE NO 2

Operation of Flash Memory Cell 310 of FIG. 3

|  | WL/SG | BL | CG | EG | SL |
|---|---|---|---|---|---|
| Read | 1.0-2 V | 0.6-2 V | 0-2.6 V | 0-2.6 V | 0 V |
| Erase | −0.5 V/0 V | 0 V | 0 V/−8 V | 8-12 V | 0 V |
| Program | 1 V | 0.1-1 µA | 8-11 V | 4.5-9 V | 4.5-5 V |

FIG. 4 depicts a three-gate memory cell 410, which is another type of flash memory cell. Memory cell 410 is identical to the memory cell 310 of FIG. 3 except that memory cell 410 does not have a separate control gate. The erase operation (whereby erasing occurs through use of the erase gate) and read operation are similar to that of the FIG. 3 except there is no control gate bias applied. The programming operation also is done without the control gate bias, and as a result, a higher voltage is applied on the source line during a program operation to compensate for a lack of control gate bias.

Table No. 3 depicts typical voltage and current ranges that can be applied to the terminals of memory cell 410 for performing read, erase, and program operations:

TABLE NO 3

Operation of Flash Memory Cell 410 of FIG. 4

|  | WL/SG | BL | EG | SL |
|---|---|---|---|---|
| Read | 0.7-2.2 V | 0.6-2 V | 0-2.6 V | 0 V |
| Erase | −0.5 V/0 V | 0 V | 11.5 V | 0 V |
| Program | 1 V | 0.2-3 µA | 4.5 V | 7-9 V |

FIG. 5 depicts stacked gate memory cell 510, which is another type of flash memory cell. Memory cell 510 is similar to memory cell 210 of FIG. 2, except that floating gate 20 extends over the entire channel region 18, and control gate 22 (which here will be coupled to a word line) extends over floating gate 20, separated by an insulating layer (not shown). The erase is done by FN tunneling of electrons from FG to substrate, programming is by channel hot electron (CHE) injection at region between the channel 18 and the drain region 16, by the electrons flowing from the source region 14 towards to drain region 16 and read operation which is similar to that for memory cell 210 with a higher control gate voltage.

Table No. 4 depicts typical voltage ranges that can be applied to the terminals of memory cell 510 and substrate 12 for performing read, erase, and program operations:

TABLE NO 4

Operation of Flash Memory Cell 510 of FIG. 5

|  | CG | BL | SL | Substrate |
|---|---|---|---|---|
| Read | 2-5 V | 0.6-2 V | 0 V | 0 V |
| Erase | −8 to −10 V/0 V | FLT | FLT | 8-10 V/15-20 V |
| Program | 8-12 V | 3-5 V | 0 V | 0 V |

The methods and means described herein may apply to other non-volatile memory technologies such as FINFET split gate flash or stack gate flash memory, NAND flash, SONOS (silicon-oxide-nitride-oxide-silicon, charge trap in nitride), MONOS (metal-oxide-nitride-oxide-silicon, metal charge trap in nitride), ReRAM (resistive ram), PCM (phase change memory), MRAM (magnetic ram), FeRAM (ferro-electric ram), CT (charge trap) memory, CN (carbon-tube) memory, OTP (bi-level or multi-level one time programmable), and CeRAM (correlated electron ram), without limitation.

In order to utilize the memory arrays comprising one of the types of non-volatile memory cells described above in an artificial neural network, two modifications are made. First, the lines are configured so that each memory cell can be individually programmed, erased, and read without adversely affecting the memory state of other memory cells in the array, as further explained below. Second, continuous (analog) programming of the memory cells is provided.

Specifically, the memory state (i.e., charge on the floating gate) of each memory cell in the array can be continuously changed from a fully erased state to a fully programmed state, and vice-versa, independently and with minimal disturbance of other memory cells. This means the cell storage is effectively analog or at the very least can store one of many discrete values (such as 16 or 64 different values), which allows for very precise and individual tuning of all the memory cells in the memory array, and which makes the memory array ideal for storing and making fine tuning adjustments to the synapsis weights of the neural network.

Neural Networks Employing Non-Volatile Memory Cell Arrays

FIG. 6 conceptually illustrates a non-limiting example of a neural network utilizing a non-volatile memory array of the present examples. This example uses the non-volatile memory array neural network for a facial recognition application, but any other appropriate application could be implemented using a non-volatile memory array based neural network.

S0 is the input layer, which for this example is a 32×32 pixel RGB image with 5 bit precision (i.e. three 32×32 pixel arrays, one for each color R, G and B, each pixel being 5 bit precision). The synapses CB1 going from input layer S0 to layer C1 apply different sets of weights in some instances and shared weights in other instances and scan the input image with 3×3 pixel overlapping filters (kernel), shifting the filter by 1 pixel (or more than 1 pixel as dictated by the model). Specifically, values for 9 pixels in a 3×3 portion of the image (i.e., referred to as a filter or kernel) are provided to the synapses CB1, where these 9 input values are multiplied by the appropriate weights and, after summing the outputs of that multiplication, a single output value is determined and provided by a first synapse of CB1 for generating a pixel of one of the feature maps of layer C1. The 3×3 filter is then shifted one pixel to the right within input layer S0 (i.e., adding the column of three pixels on the right, and dropping the column of three pixels on the left), whereby the 9 pixel values in this newly positioned filter are provided to the synapses CB1, where they are multiplied by the same weights and a second single output value is determined by the associated synapse. This process is continued until the 3×3 filter scans across the entire 32×32 pixel image of input layer S0, for all three colors and for all bits (precision values). The process is then repeated using different sets of weights to generate a different feature map of layer C1, until all the features maps of layer C1 have been calculated.

In layer C1, in the present example, there are 16 feature maps, with 30×30 pixels each. Each pixel is a new feature pixel extracted from multiplying the inputs and kernel, and therefore each feature map is a two dimensional array, and thus in this example layer C1 constitutes 16 layers of two dimensional arrays (keeping in mind that the layers and arrays referenced herein are logical relationships, not necessarily physical relationships—i.e., the arrays are not necessarily oriented in physical two dimensional arrays). Each of 16 feature maps in layer C1 is generated by one of sixteen different sets of synapse weights applied to the filter scans. The C1 feature maps could all be directed to different aspects of the same image feature, such as boundary identification. For example, the first map (generated using a first weight set, shared for all scans used to generate this first map) could identify circular edges, the second map (generated using a second weight set different from the first weight set) could identify rectangular edges, or the aspect ratio of certain features, and so on.

An activation function P1 (pooling) is applied before going from layer C1 to layer S1, which pools values from consecutive, non-overlapping 2×2 regions in each feature map. The purpose of the pooling function P1 is to average out the nearby location (or a max function can also be used), to reduce the dependence of the edge location for example and to reduce the data size before going to the next stage. At layer S1, there are 16 15×15 feature maps (i.e., sixteen different arrays of 15×15 pixels each). The synapses CB2 going from layer S1 to layer C2 scan maps in layer S1 with 4×4 filters, with a filter shift of 1 pixel. At layer C2, there are 22 12×12 feature maps. An activation function P2 (pooling) is applied before going from layer C2 to layer S2, which pools values from consecutive non-overlapping 2×2 regions in each feature map. At layer S2, there are 22 6×6 feature maps. An activation function (pooling) is applied at the synapses CB3 going from layer S2 to layer C3, where every neuron in layer C3 connects to every map in layer S2 via a respective synapse of CB3. At layer C3, there are 64 neurons. The synapses CB4 going from layer C3 to the output layer S3 fully connects C3 to S3, i.e., every neuron in layer C3 is connected to every neuron in layer S3. The output at S3 includes 10 neurons, where the highest output neuron determines the class. This output could, for example, be indicative of an identification or classification of the contents of the original image.

Each layer of synapses is implemented using an array, or a portion of an array, of non-volatile memory cells.

FIG. 7 is a block diagram of an array that can be used for that purpose. Vector-by-matrix multiplication (VMM) array 32 includes non-volatile memory cells and is utilized as the synapses (such as CB1, CB2, CB3, and CB4 in FIG. 6) between one layer and the next layer. Specifically, VMM array 32 includes an array of non-volatile memory cells 33, erase gate and word line gate decoder 34, control gate decoder 35, bit line decoder 36 and source line decoder 37, which decode the respective inputs for the non-volatile memory cell array 33. Input to VMM array 32 can be from the erase gate and wordline gate decoder 34 or from the control gate decoder 35. Source line decoder 37 in this example also decodes the output of the non-volatile memory cell array 33. Alternatively, bit line decoder 36 can decode the output of the non-volatile memory cell array 33.

Non-volatile memory cell array 33 serves two purposes. First, it stores the weights that will be used by the VMM array 32. Second, the non-volatile memory cell array 33 effectively multiplies the inputs by the weights stored in the non-volatile memory cell array 33 and adds them up per output line (source line or bit line) to produce the output, which will be the input to the next layer or input to the final layer. By performing the multiplication and addition function, the non-volatile memory cell array 33 negates the need for separate multiplication and addition logic circuits and is also power efficient due to its in-situ memory computation.

The output of non-volatile memory cell array 33 is supplied to a differential summer (such as a summing op-amp or a summing current mirror) 38, which sums up the outputs of the non-volatile memory cell array 33 to create a single value for that convolution. The differential summer 38 is arranged to perform summation of positive weight and negative weight.

The summed-up output values of differential summer 38 are then supplied to an activation function block 39, which rectifies the output. The activation function block 39 may provide sigmoid, tan h, or ReLU functions. The rectified output values of activation function block 39 become an element of a feature map as the next layer (e.g. C1 in FIG. 6), and are then applied to the next synapse to produce the next feature map layer or final layer. Therefore, in this example, non-volatile memory cell array 33 constitutes a plurality of synapses (which receive their inputs from the prior layer of neurons or from an input layer such as an image database), and summing op-amp 38 and activation function block 39 constitute a plurality of neurons.

The input to VMM array 32 in FIG. 7 (WLx, EGx, CGx, and optionally BLx and SLx) can be analog level, binary level, or digital bits (in which case a DAC is provided to convert digital bits to appropriate input analog level) and the output can be analog level, binary level, or digital bits (in which case an output ADC is provided to convert output analog level into digital bits).

FIG. 8 is a block diagram depicting the usage of numerous layers of VMM arrays 32, here labeled as VMM arrays 32*a*, 32*b*, 32*c*, 32*d*, and 32*e*. As shown in FIG. 8, the input, denoted Inputx, is converted from digital to analog by a digital-to-analog converter 31 and provided to input VMM array 32*a*. The converted analog inputs could be voltage or current. The input D/A conversion for the first layer could be done by using a function or a LUT (look up table) that maps the inputs Inputx to appropriate analog levels for the matrix multiplier of input VMM array 32*a*. The input conversion could also be done by an analog to analog (A/A) converter to convert an external analog input to a mapped analog input to the input VMM array 32*a*.

The output generated by input VMM array 32*a* is provided as an input to the next VMM array (hidden level 1) 32*b*, which in turn generates an output that is provided as an input to the next VMM array (hidden level 2) 32*c*, and so on. The various layers of VMM array 32 function as different layers of synapses and neurons of a convolutional neural network (CNN). Each VMM array 32*a*, 32*b*, 32*c*, 32*d*, and 32*e* can be a stand-alone, physical non-volatile memory array, or multiple VMM arrays could utilize different portions of the same physical non-volatile memory array, or multiple VMM arrays could utilize overlapping portions of the same physical non-volatile memory array. The example shown in FIG. 8 contains five layers (32a, 32b, 32c, 32d, 32e): one input layer (32a), two hidden layers (32b, 32c), and two fully connected layers (32d, 32e). One of ordinary skill in the art will appreciate that this is merely an example and that a system instead could comprise more than two hidden layers and more than two fully connected layers.

Vector-by-Matrix Multiplication (VMM) Arrays

FIG. 9 depicts neuron VMM array 900, which is particularly suited for memory cells 310 as shown in FIG. 3 and is utilized as the synapses and parts of neurons between an input layer and the next layer. VMM array 900 comprises memory array 901 of non-volatile memory cells and reference array 902 (at the top of the array) of non-volatile reference memory cells. Alternatively, another reference array can be placed at the bottom.

In VMM array 900, control gate lines, such as control gate line 903, run in a vertical direction (hence reference array 902 in the row direction is orthogonal to control gate line 903), and erase gate lines, such as erase gate line 904, run in a horizontal direction. Here, the inputs to VMM array 900 are provided on the control gate lines (CG0, CG1, CG2, CG3), and the output of VMM array 900 emerges on the source lines (SL0, SL1). In one example, only even rows are used, and in another example, only odd rows are used. The current placed on each source line (SL0, SL1, respectively) performs a summing function of all the currents from the memory cells connected to that particular source line.

As described herein for neural networks, the non-volatile memory cells of VMM array 900, i.e., the memory cells 310 of VMM array 900, may be configured to operate in a sub-threshold region.

The non-volatile reference memory cells and the non-volatile memory cells described herein are biased in weak inversion (sub threshold region):

$$Ids = Io * e^{(Vg-Vth)/nVt} = w * Io * e^{(Vg)/nVt},$$

$$\text{where } w = e^{(-Vth)/nVt}$$

where Ids is the drain to source current; Vg is gate voltage on the memory cell; Vth is threshold voltage of the memory cell; Vt is thermal voltage=k*T/q with k being the Boltzmann constant, T the temperature in Kelvin, and q the electronic charge; n is a slope factor=1+(Cdep/Cox) with Cdep=capacitance of the depletion layer, and Cox capacitance of the gate oxide layer; Io is the memory cell current at gate voltage equal to threshold voltage, Io is proportional to (Wt/L)*u*Cox*(n−1)*Vt² where u is carrier mobility and Wt and L are width and length, respectively, of the memory cell.

For an I-to-V log converter using a memory cell (such as a reference memory cell or a peripheral memory cell) or a transistor to convert input current into an input voltage:

$$Vg = n * Vt * \log[Ids/wp * Io]$$

where, wp is w of a reference or peripheral memory cell.

For a memory array used as a vector matrix multiplier VMM array with the current input, the output current is:

$$Iout = wa * Io * e^{(Vg)/nVt}, \text{ namely}$$

$$Iout = (wa/wp) * Iin = W * Iin$$

$$W = e^{(Vthp-Vtha)/nVt}$$

Here, wa=w of each memory cell in the memory array. Vthp is effective threshold voltage of the peripheral memory cell and Vtha is effective threshold voltage of the main (data) memory cell. Note that the threshold voltage of a transistor is a function of substrate body bias voltage and the substrate body bias voltage, denoted Vsb, can be modulated to compensate for various conditions, on such temperature. The threshold voltage Vth can be expressed as:

$$Vth = Vth0 + \text{gamma}(SQRT | Vsb - 2*\varphi F) - SQRT|2*\varphi F|)$$

where Vth0 is threshold voltage with zero substrate bias, φF is a surface potential, and gamma is a body effect parameter.

A wordline or control gate can be used as the input for the memory cell for the input voltage.

Alternatively, the flash memory cells of VMM arrays described herein can be configured to operate in the linear region:

$$Ids = \text{beta} * (Vgs - Vth) * Vds; \text{beta} = u * Cox * Wt/L$$

$$W = \alpha(Vgs - Vth)$$

meaning weight W in the linear region is proportional to (Vgs−Vth)

A wordline or control gate or bitline or sourceline can be used as the input for the memory cell operated in the linear region. The bitline or sourceline can be used as the output for the memory cell.

For an I-to-V linear converter, a memory cell (such as a reference memory cell or a peripheral memory cell) or a transistor operating in the linear region can be used to linearly convert an input/output current into an input/output voltage.

Alternatively, the memory cells of VMM arrays described herein can be configured to operate in the saturation region:

$$Ids = 1/2 * \text{beta} * (Vgs - Vth)^2; \text{beta} = u * Cox * Wt/L$$

$$W\alpha(Vgs - Vth)^2, \text{ meaning weight } W \text{ is proportional to } (Vgs - Vth)^2$$

A wordline, control gate, or erase gate can be used as the input for the memory cell operated in the saturation region. The bitline or sourceline can be used as the output for the output neuron.

Alternatively, the memory cells of VMM arrays described herein can be used in all regions or a combination thereof (sub threshold, linear, or saturation) for each layer or multi layers of a neural network.

Other examples for VMM array 32 of FIG. 7 are described in U.S. Pat. No. 10,748,630, which is incorporated by reference herein. As described in that application, a sourceline or a bitline can be used as the neuron output (current summation output).

FIG. 10 depicts neuron VMM array 1000, which is particularly suited for memory cells 210 as shown in FIG. 2 and is utilized as the synapses between an input layer and the next layer. VMM array 1000 comprises a memory array 1003 of non-volatile memory cells, reference array 1001 of first non-volatile reference memory cells, and reference array 1002 of second non-volatile reference memory cells. Reference arrays 1001 and 1002, arranged in the column direction of the array, serve to convert current inputs flowing into terminals BLR0, BLR1, BLR2, and BLR3 into voltage inputs WL0, WL1, WL2, and WL3. In effect, the first and second non-volatile reference memory cells are diode-connected through multiplexors 1014 (only partially depicted) with current inputs flowing into them. The reference cells are tuned (e.g., programmed) to target reference levels. The target reference levels are provided by a reference mini-array matrix (not shown).

Memory array 1003 serves two purposes. First, it stores the weights that will be used by the VMM array 1000 on respective memory cells thereof. Second, memory array 1003 effectively multiplies the inputs (i.e. current inputs provided in terminals BLR0, BLR1, BLR2, and BLR3, which reference arrays 1001 and 1002 convert into the input voltages to supply to wordlines WL0, WL1, WL2, and WL3) by the weights stored in the memory array 1003 and then adds all the results (memory cell currents) to produce the output on the respective bit lines (BL0-BLN), which will be the input to the next layer or input to the final layer. By performing the multiplication and addition function, memory array 1003 negates the need for separate multiplication and addition logic circuits and is also power efficient. Here, the voltage inputs are provided on the word lines WL0, WL1, WL2, and WL3, and the output emerges on the respective bit lines BL0-BLN during a read (inference) operation. The current placed on each of the bit lines BL0-BLN performs a summing function of the currents from all non-volatile memory cells connected to that particular bitline.

Table No. 5 depicts operating voltages and currents for VMM array 1000. The columns in the table indicate the voltages placed on word lines for selected cells, word lines for unselected cells, bit lines for selected cells, bit lines for unselected cells, source lines for selected cells, and source lines for unselected cells. The rows indicate the operations of read, erase, and program.

TABLE NO. 5

| Operation of VMM Array 1000 of FIG. 10: | | | | | |
|---|---|---|---|---|---|
| | WL | WL -unsel | BL | BL -unsel | SL | SL -unsel |
| Read | 1-3.5 V | −0.5 V/0 V | 0.6-2 V (Ineuron) | 0.6 V-2 V/0 V | 0 V | 0 V |
| Erase | ~5-13 V | 0 V | 0 V | 0 V | 0 V | 0 V |
| Program | 1-2 V | −0.5 V/0 V | 0.1-3 uA | Vinh ~2.5 V | 4-10 V | 0-1 V/FLT |

FIG. 11 depicts neuron VMM array 1100, which is particularly suited for memory cells 210 as shown in FIG. 2 and is utilized as the synapses and parts of neurons between an input layer and the next layer. VMM array 1100 comprises a memory array 1103 of non-volatile memory cells, reference array 1101 of first non-volatile reference memory cells, and reference array 1102 of second non-volatile reference memory cells. Reference arrays 1101 and 1102 run in row direction of the VMM array 1100. VMM array is similar to VMM 1000 except that in VMM array 1100, the word lines run in the vertical direction. Here, the inputs are provided on the word lines (WLA0, WLB0, WLA1, WLB2, WLA2, WLB2, WLA3, WLB3), and the output emerges on the source line (SL0, SL1) during a read operation. The current placed on each source line performs a summing function of all the currents from the memory cells connected to that particular source line.

Table No. 6 depicts operating voltages and currents for VMM array 1100. The columns in the table indicate the voltages placed on word lines for selected cells, word lines for unselected cells, bit lines for selected cells, bit lines for unselected cells, source lines for selected cells, and source lines for unselected cells. The rows indicate the operations of read, erase, and program.

TABLE NO. 6

| Operation of VMM Array 1100 of FIG. 11 | | | | | |
|---|---|---|---|---|---|
| | WL | WL -unsel | BL | BL -unsel | SL | SL -unsel |
| Read | 1-3.5 V | −0.5 V/0 V | 0.6-2 V | 0.6 V-2 V/0 V | ~0.3-1 V (Ineuron) | 0 V |
| Erase | ~5-13 V | 0 V | 0 V | 0 V | 0 V | SL-inhibit (~4-8 V) |
| Program | 1-2 V | −0.5 V/0 V | 0.1-3 uA | Vinh ~2.5 V | 4-10 V | 0-1 V/FLT |

FIG. 12 depicts neuron VMM array 1200, which is particularly suited for memory cells 310 as shown in FIG. 3 and is utilized as the synapses and parts of neurons between an input layer and the next layer. VMM array 1200 comprises a memory array 1203 of non-volatile memory cells, reference array 1201 of first non-volatile reference memory cells, and reference array 1202 of second non-volatile reference memory cells. Reference arrays 1201 and 1202 serve to convert current inputs flowing into terminals BLR0, BLR1, BLR2, and BLR3 into voltage inputs CG0, CG1, CG2, and CG3. In effect, the first and second non-volatile reference memory cells are diode-connected through multiplexors 1212 (only partially shown) with current inputs flowing into them through BLR0, BLR1, BLR2, and BLR3. Multiplexors 1212 each include a respective multiplexor 1205 and a cascoding transistor 1204 to ensure a constant voltage on the bitline (such as BLR0) of each of the first and second non-volatile reference memory cells during a read operation. The reference cells are tuned to target reference levels.

Memory array 1203 serves two purposes. First, it stores the weights that will be used by the VMM array 1200. Second, memory array 1203 effectively multiplies the inputs (current inputs provided to terminals BLR0, BLR1, BLR2, and BLR3, for which reference arrays 1201 and 1202 convert these current inputs into the input voltages to supply to the control gates (CG0, CG1, CG2, and CG3) by the weights stored in the memory array and then add all the results (cell currents) to produce the output, which appears on BL0-BLN, and will be the input to the next layer or input to the final layer. By performing the multiplication and addition function, the memory array negates the need for separate multiplication and addition logic circuits and is also power efficient. Here, the inputs are provided on the control gate lines (CG0, CG1, CG2, and CG3), and the output emerges on the bit lines (BL0-BLN) during a read operation. The current placed on each bitline performs a summing function of all the currents from the memory cells connected to that particular bitline.

VMM array 1200 implements uni-directional tuning for non-volatile memory cells in memory array 1203. That is, each non-volatile memory cell is erased and then partially programmed until the desired charge on the floating gate is reached. If too much charge is placed on the floating gate (such that the wrong value is stored in the cell), the cell is erased and the sequence of partial programming operations starts over. As shown, two rows sharing the same erase gate (such as EG0 or EG1) are erased together (which is referred to as a page erase), and thereafter, each cell is partially programmed until the desired charge on the floating gate is reached.

Table No. 7 depicts operating voltages and currents for VMM array 1200. The columns in the table indicate the voltages placed on word lines for selected cells, word lines for unselected cells, bit lines for selected cells, bit lines for unselected cells, control gates for selected cells, control gates for unselected cells in the same sector as the selected cells, control gates for unselected cells in a different sector than the selected cells, erase gates for selected cells, erase gates for unselected cells, source lines for selected cells, and source lines for unselected cells. The rows indicate the operations of read, erase, and program.

TABLE NO. 7

Operation of VMM Array 1200 of FIG. 12

| | WL | WL - unsel | BL | BL - unsel | CG | CG - unsel same sector | CG - unsel | EG | EG - unsel | SL | SL - unsel |
|---|---|---|---|---|---|---|---|---|---|---|---|
| Read | 1.0-2 V | −0.5 V/ 0 V | 0.6-2 V (Ineuron) | 0 V | 0-2.6 V | 0-2.6 V | 0-2.6 V | 0-2.6 V | 0-2.6 V | 0 V | 0 V |
| Erase | 0 V | 0 V | 0 V | 0 V | 0 V | 0-2.6 V | 0-2.6 V | 5-12 V | 0-2.6 V | 0 V | 0 V |
| Program | 0.7-1 V | −0.5 V/0 V | 0.1-1 uA | Vinh (1-2 V) | 4-11 V | 0-2.6 V | 0-2.6 V | 4.5-5 V | 0-2.6 V | 4.5-5 V | 0-1 V |

FIG. 13 depicts neuron VMM array 1300, which is particularly suited for memory cells 310 as shown in FIG. 3 and is utilized as the synapses and parts of neurons between an input layer and the next layer. VMM array 1300 comprises a memory array 1303 of non-volatile memory cells, reference array 1301 or first non-volatile reference memory cells, and reference array 1302 of second non-volatile reference memory cells. EG lines EGR0, EG0, EG1 and EGR1 are run vertically while CG lines CG0, CG1, CG2 and CG3 and SL lines WL0, WL1, WL2 and WL3 are run horizontally. VMM array 1300 is similar to VMM array 1400, except that VMM array 1300 implements bi-directional tuning, where each individual cell can be completely erased, partially programmed, and partially erased as needed to reach the desired amount of charge on the floating gate due to the use of separate EG lines. As shown, reference arrays 1301 and 1302 convert input current in the terminal BLR0, BLR1, BLR2, and BLR3 into control gate voltages CG0, CG1, CG2, and CG3 (through the action of diode-connected reference cells through multiplexors 1314) to be applied to the memory cells in the row direction. The current output (neuron) is in the bit lines BL0-BLN, where each bit line sums all currents from the non-volatile memory cells connected to that particular bitline.

Table No. 8 depicts operating voltages and currents for VMM array 1300. The columns in the table indicate the voltages placed on word lines for selected cells, word lines for unselected cells, bit lines for selected cells, bit lines for unselected cells, control gates for selected cells, control gates for unselected cells in the same sector as the selected cells, control gates for unselected cells in a different sector than the selected cells, erase gates for selected cells, erase gates for unselected cells, source lines for selected cells, and source lines for unselected cells. The rows indicate the operations of read, erase, and program.

TABLE NO. 8

Operation of VMM Array 1300 of FIG. 13

|  | WL | WL - unsel | BL | BL - unsel | CG | CG - unsel same sector | CG - unsel | EG | EG - unsel | SL | SL - unsel |
|---|---|---|---|---|---|---|---|---|---|---|---|
| Read | 1.0-2 V | −0.5 V/0 V | 0.6-2 V (Ineuron) | 0 V | 0-2.6 V | 0-2.6 V | 0-2.6 V | 0-2.6 V | 0-2.6 V | 0 V | 0 V |
| Erase | 0 V | 0 V | 0 V | 0 V | 0 V | 4-9 V | 0-2.6 V | 5-12 V | 0-2.6 V | 0 V | 0 V |
| Program | 0.7-1 V | −0.5 V/0 V | 0.1-1 uA | Vinh (1-2 V) | 4-11 V | 0-2.6 V | 0-2.6 V | 4.5-5 V | 0-2.6 V | 4.5-5 V | 0-1 V |

FIG. 14 depicts VMM array 1400, which is particularly suited for memory cells 210 as shown in FIG. 2 and is utilized as the synapses and parts of neurons between an input layer and the next layer. In VMM array 1400, the inputs $INPUT_0, \ldots, INPUT_N$ are received on bitlines $BL_0, \ldots, BL_N$, respectively, and the outputs $OUTPUT_1$, $OUTPUT_2$, $OUTPUT_3$, and $OUTPUT_4$ are generated on source lines $SL_0$, $SL_1$, $SL_2$, and $SL_3$, respectively.

FIG. 15 depicts VMM array 1500, which is particularly suited for memory cells 210 as shown in FIG. 2 and is utilized as the synapses and parts of neurons between an input layer and the next layer. In this example, the inputs $INPUT_0$, $INPUT_1$, $INPUT_2$, and $INPUT_3$ are received on source lines $SL_0$, $SL_1$, $SL_2$, and $SL_3$, respectively, and the outputs $OUTPUT_0, \ldots, OUTPUT_N$ are generated on bitlines $BL_0, \ldots, BL_N$.

FIG. 16 depicts VMM array 1600, which is particularly suited for memory cells 210 as shown in FIG. 2 and is utilized as the synapses and parts of neurons between an input layer and the next layer. In this example, the inputs $INPUT_0, \ldots, INPUT_M$ are received on word lines $WL_0, \ldots, WL_M$, respectively, and the outputs $OUTPUT_0, \ldots, OUTPUT_N$ are generated on bitlines $BL_0, \ldots, BLN$.

FIG. 17 depicts VMM array 1700, which is particularly suited for memory cells 310 as shown in FIG. 3 and is utilized as the synapses and parts of neurons between an input layer and the next layer. In this example, the inputs $INPUT_0 \ldots, INPUT_M$ are received on word lines $WL_0, \ldots, WL_M$, respectively, and the outputs $OUTPUT_0, \ldots, OUTPUT_N$ are generated on bitlines $BL_0, \ldots, BLN$.

FIG. 18 depicts VMM array 1800, which is particularly suited for memory cells 410 as shown in FIG. 4 and is utilized as the synapses and parts of neurons between an input layer and the next layer. In this example, the inputs $INPUT_0 \ldots, INPUT_n$ are received on vertical control gate lines $CG_0, \ldots, CG_N$, respectively, and the outputs $OUTPUT_1$ and $OUTPUT_2$ are generated on source lines $SL_0$ and $SL_1$.

FIG. 19 depicts VMM array 1900, which is particularly suited for memory cells 410 as shown in FIG. 4 and is utilized as the synapses and parts of neurons between an input layer and the next layer. In this example, the inputs $INPUT_0 \ldots, INPUT_N$ are received on the gates of bitline control gates 1901-1, 1901-2, ..., 1901-(N−1), and 1901-N, respectively, which are coupled to bitlines $BL_0, \ldots, BLN$, respectively. Example outputs $OUTPUT_1$ and $OUTPUT_2$ are generated on source lines $SL_0$ and $SL_1$.

FIG. 20 depicts VMM array 2000, which is particularly suited for memory cells 310 as shown in FIG. 3, memory cells 510 as shown in FIG. 5, and memory cells 710 as shown in FIG. 7, and is utilized as the synapses and parts of neurons between an input layer and the next layer. In this example, the inputs $INPUT_0, \ldots, INPUT_M$ are received on word lines $WL_0, \ldots, WL_M$, and the outputs $OUTPUT_0, \ldots, OUTPUT_N$ are generated on bitlines $BL_0, \ldots, BLN$, respectively.

FIG. 21 depicts VMM array 2100, which is particularly suited for memory cells 310 as shown in FIG. 3, memory cells 510 as shown in FIG. 5, and memory cells 710 as shown in FIG. 7, and is utilized as the synapses and parts of neurons between an input layer and the next layer. In this example, the inputs $INPUT_0 \ldots, INPUT_M$ are received on control gate lines $CG_0, \ldots, CG_M$. Outputs $OUTPUT_0, \ldots, OUTPUT_N$ are generated on vertical source lines $SL_0, \ldots, SL_N$, respectively, where each source line $SL_i$ is coupled to the source lines of all memory cells in column i.

FIG. 22 depicts VMM array 2200, which is particularly suited for memory cells 310 as shown in FIG. 3, memory cells 510 as shown in FIG. 5, and memory cells 710 as shown in FIG. 7, and is utilized as the synapses and parts of neurons between an input layer and the next layer. In this example, the inputs $INPUT_0 \ldots, INPUT_M$ are received on control gate lines $CG_0, \ldots, CG_M$. Outputs $OUTPUT_0, \ldots, OUTPUT_N$ are generated on vertical bitlines $BL_0, \ldots, BL_N$, respectively, where each bitline $BL_i$ is coupled to the bitlines of all memory cells in column i.

The input to the VMM arrays can be an analog level, a binary level, a pulse, a time modulated pulse, or digital bits (in this case a DAC is used to convert digital bits to appropriate input analog level) and the output can be an analog level, a binary level, a timing pulse, pulses, or digital bits (in this case an output ADC is used to convert output analog level into digital bits).

In general, for each memory cell in a VMM array, each weight W can be implemented by a single memory cell or by a differential cell or by two blend memory cells (average of 2 cells). In the differential cell case, two memory cells are used to implement a weight W as a differential weight (W=W+−W−). In the two blend memory cells, two memory cells are used to implement a weight W as an average of two cells.

FIG. 23 depicts VMM system 2300 (which comprises VMM array 2301 and summation circuits 2301 and 2302). In some examples, the weights, W, stored in a VMM array are stored as differential pairs, W+ (positive weight) and W− (negative weight), where W=(W+)−(W−). In VMM system 2300, half of the bitlines are designated as W+ lines, that is, bitlines connecting to memory cells that will store positive weights W+, and the other half of the bitlines are designated as W-lines, that is, bitlines connecting to memory cells implementing negative weights W−. The W-lines are interspersed among the W+ lines in an alternating fashion. The subtraction operation is performed by a summation circuit that receives current from a W+ line and a W− line, such as summation circuits 2301 and 2302. The output of a W+ line and the output of a W− line are combined together to give effectively W=W+−W− for each pair of (W+, W−) cells for all pairs of (W+, W−) lines. While the above has been described in relation to W-lines interspersed among the W+ lines in an alternating fashion, in other examples W+ lines and W− lines can be arbitrarily located anywhere in the array.

FIG. 24 depicts another example. In VMM system 2410, positive weights W+ are implemented in first array 2411 and negative weights W− are implemented in a second array 2412, second array 2412 separate from the first array, and the resulting weights are appropriately combined together by summation circuits 2413.

FIG. 25 depicts VMM system 2500, the weights, W, stored in a VMM array are stored as differential pairs, W+ (positive weight) and W− (negative weight), where W=(W+)−(W−). VMM system 2500 comprises array 2501 and array 2502. Half of the bitlines in each of array 2501 and 2502 are designated as W+ lines, that is, bitlines connecting to memory cells that will store positive weights W+, and the other half of the bitlines in each of array 2501 and 2502 are designated as W-lines, that is, bitlines connecting to memory cells implementing negative weights W−. The W-lines are interspersed among the W+ lines in an alternating fashion. The subtraction operation is performed by a summation circuit that receives current from a W+ line and a W-line, such as summation circuits 2503, 2504, 2505, and 2506. The output of a W+ line and the output of a W-line from each array 2501, 2502 are respectively combined together to give effectively W=W+−W− for each pair of (W+, W−) cells for all pairs of (W+, W−) lines. In addition, the W values from each array 2501 and 2502 can be further combined through summation circuits 2507 and 2508, such that each W value is the result of a W value from array 2501 minus a W value from array 2502, meaning that the end result from summation circuits 2507 and 2508 is a differential value of two differential values.

Each non-volatile memory cells used in the analog neural memory system is to be erased and programmed to hold a very specific and precise amount of charge, i.e., the number of electrons, in the floating gate. For example, each floating gate holds one of N different values, where N is the number of different weights that can be indicated by each cell. Examples of N include 16, 32, 64, 128, and 256.

It is desirable for the output block to precisely and consistently perform verify and read operations, since each cell can hold one of N different values. In the prior art, the inputs to the output blocks vary in voltage depending on the current being drawn by the memory array, as shown below with reference to FIG. 26, which depicts the relationship between changes in bitline voltage with changes in current drawn by the bitline through the memory cells coupled to that bitline. As can be seen, bitline voltage varies significantly as bitline current varies. This leads to imprecision and also an asymmetrical condition between verify operations, when one or a handful of cells are being read, and neural read operations, where all cells are being read.

SUMMARY OF THE INVENTION

In one example, a system comprises an array of non-volatile memory cells arranged into rows and columns, the array comprising a first bit line coupled to a first column of non-volatile memory cells and a second bit line coupled to a second column of non-volatile memory cells; and an output block coupled to the array, the output block comprising: a current-to-voltage converter to convert a first current on the first bit line into a first voltage and to convert a second current on the second bit line into a second voltage; and an analog-to-digital converter to convert one or more of the first voltage and the second voltage into a set of output bits.

BRIEF DESCRIPTION OF THE DRAWINGS

FIG. 24 depicts another example of a VMM system.

FIG. 51 depicts an output block.

DETAILED DESCRIPTION OF THE INVENTION

VMM System Architecture

Figure 27:
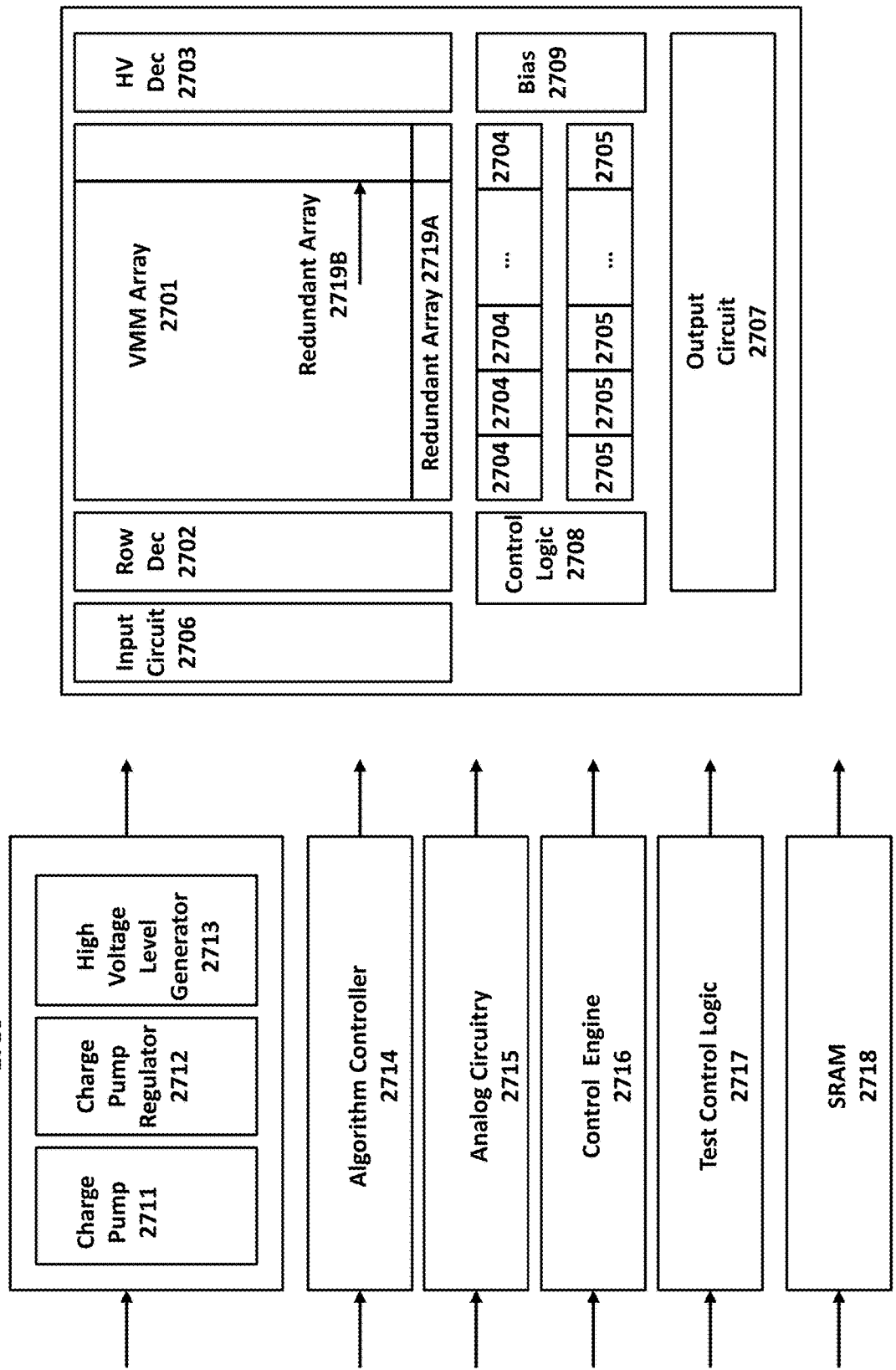
FIG. 27 depicts a VMM system.

FIG. 27 depicts a block diagram of VMM system 2700. VMM system 2700 comprises VMM array 2701, redundant arrays 2719A (row redundant array) and 2719B (column redundant array), row decoder 2702, high voltage decoder 2703, column decoders 2704, bitline drivers 2705 (such as bitline control circuitry for programming), input circuit 2706, output circuit 2707, control logic 2708, and bias generator 2709. VMM system 2700 further comprises high voltage generation block 2710, which comprises charge pump 2711, charge pump regulator 2712, and high voltage level generator 2713. VMM system 2700 further comprises (program/erase, or weight tuning) algorithm controller 2714, analog circuitry 2715, control engine 2716 (that may include functions such as arithmetic functions, activation functions, embedded microcontroller logic, without limitation), test control logic 2717, and static random access memory (SRAM) block 2718 to store intermediate data such as for input circuits (e.g., activation data) or output circuits (neuron output data, partial sum output neuron data) or data in for programming (such as data in for a whole row or for multiple rows).

VMM array 2701 comprises non-volatile memory cells (such as non-volatile memory cells of the type shown as memory cells 210, 310, 410, and 510 in FIGS. 2, 3, 4, and 5, respectively) arranged into rows and columns. Here, redundant arrays 2719A and 2719B are shown as part of the same physical array as VMM array 2701, but a person of ordinary skill in the art will appreciate that redundant arrays 2719A and 2719B and VMM array 2701 instead could be located in separate physical arrays.

The input circuit 2706 may include circuits such as a DAC (digital to analog converter), DPC (digital to pulses converter, digital to time modulated pulse converter), AAC (analog to analog converter, such as a current to voltage converter, logarithmic converter), PAC (pulse to analog level converter), or any other type of converters. The input circuit 2706 may implement one or more of normalization, linear or non-linear up/down scaling functions, or arithmetic functions. The input circuit 2706 may implement a temperature compensation function for input levels. The input circuit 2706 may implement an activation function such as ReLU or sigmoid. Input circuit 2706 may store digital activation data to be applied as, or combined with, an input signal during a program or read operation. The digital activation data can be stored in registers. Input circuit 2706 may comprise circuits to drive the array terminals, such as CG, WL, EG, and SL lines, which may include sample-and-hold circuits and buffers. A DAC can be used to convert digital activation data into an analog input voltage to be applied to the array.

The output circuit 2707 may include circuits such as an ITV (current-to-voltage circuit), ADC (analog to digital converter, to convert neuron analog output to digital bits), AAC (analog to analog converter, such as a current to voltage converter, logarithmic converter), APC (analog to pulse(s) converter, analog to time modulated pulse converter), or any other type of converters. The output circuit 2707 may convert array outputs into activation data. The output circuit 2707 may implement an activation function such as rectified linear activation function (ReLU) or sigmoid. The output circuit 2707 may implement one or more of statistic normalization, regularization, up/down scaling/gain functions, statistical rounding, or arithmetic functions (e.g., add, subtract, divide, multiply, shift, log) for neuron outputs. The output circuit 2707 may implement a temperature compensation function for neuron outputs or array outputs (such as bitline output) so as to keep power consumption of the array approximately constant or to improve precision of the array (neuron) outputs such as by keeping the IV slope approximately the same over temperature. The output circuit 2707 may comprise registers for storing output data.

Figure 28:
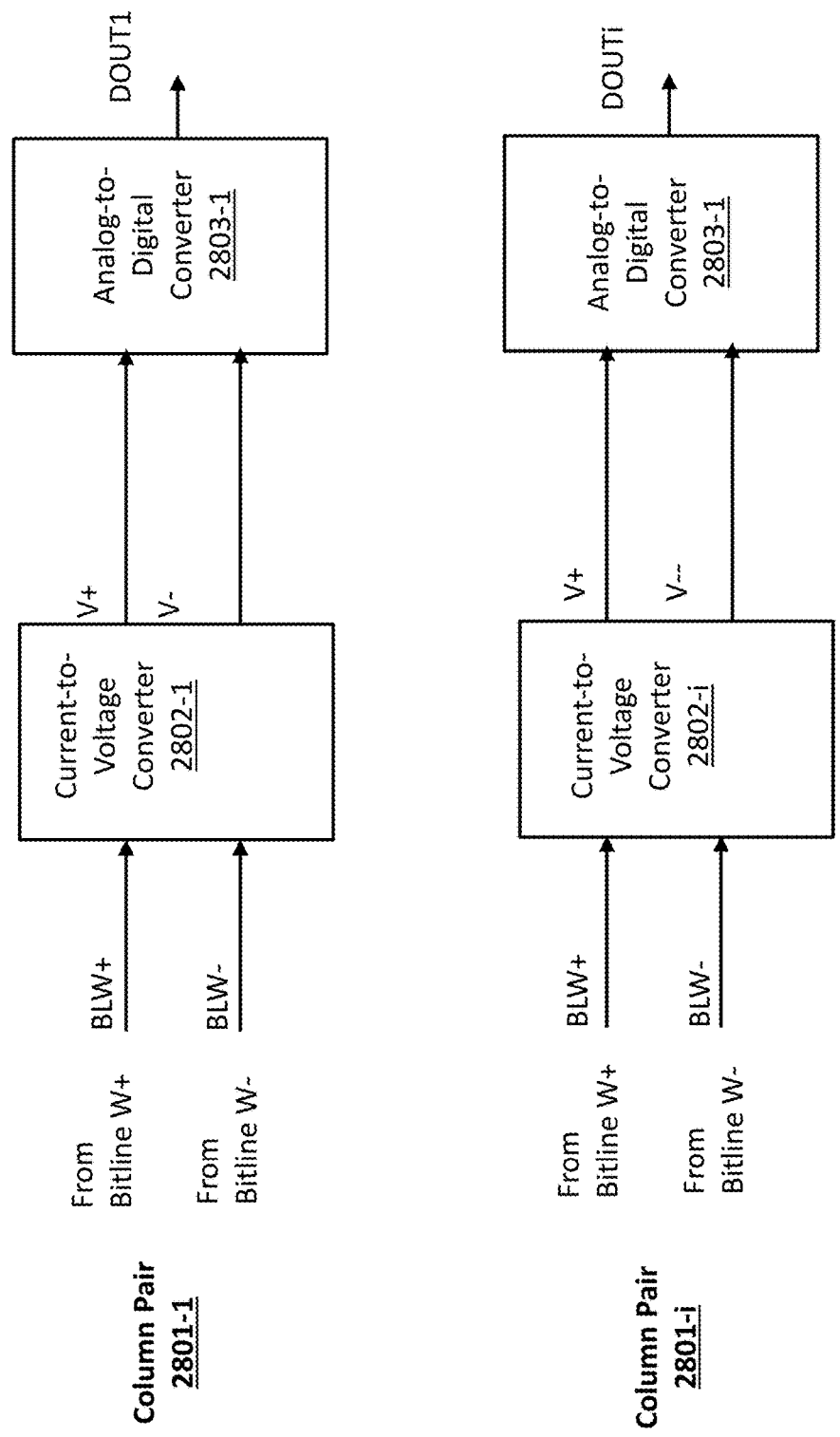
FIG. 28 depicts an output block in a VMM system.

FIG. 28 depicts output block 2800 that receives analog signals from a VMM array and generates a digital output. Columns in the VMM array are paired together, with one column providing current BLW+ from bitline W+ (which can be referred to herein as a first bitline) and one column providing current BLW− from bitline W− (which can be referred to herein as a second bitline). There are i column pairs, labeled column pair 2801-1, ..., 2801-$i$, where each pair comprises a W+ bitline and a W-bitline. Current-to-voltage converters 2802-1, ..., 2802-$i$ convert the received currents from respective column pairs 2801-1, ..., 2801-$i$, into respective pairs of voltages V+ and V−. Analog-to-digital converters 2803-1, ..., 2803-$i$ receive pairs of voltages V+ and V− from current-to-voltage converters 2802-1, ..., 2802-$i$, respectively, and generate respective digital outputs DOUT1, ..., DOUTi. The use of differential cells (one storing a W+ value and another storing a W-value, which together store a value W according to the formula W=W+−W−) is disclosed in U.S. patent application Ser. No. 17/875,281, filed on Jul. 27, 2022, published as US 2022/0374699A1, and titled, "Precise Data Tuning Method and Apparatus for Analog Neural Memory in an Artificial Neural Network," which is incorporated by reference herein.

Figure 29:
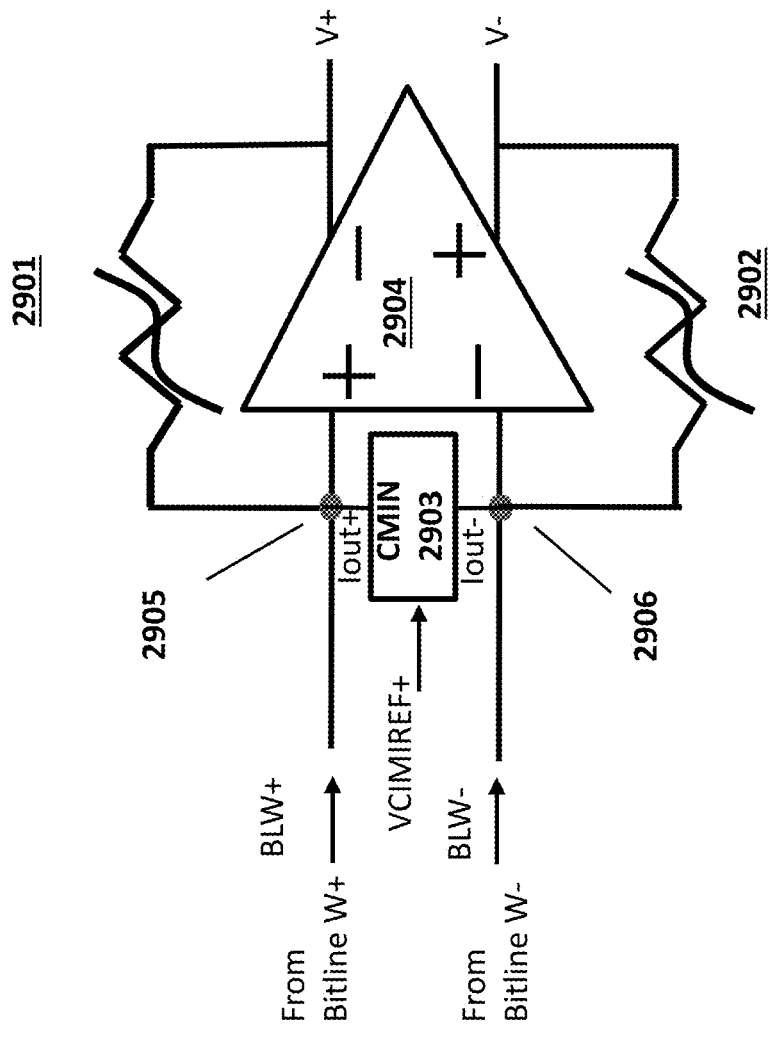
FIG. 29 depicts a current-to-voltage converter.
Figure 30:
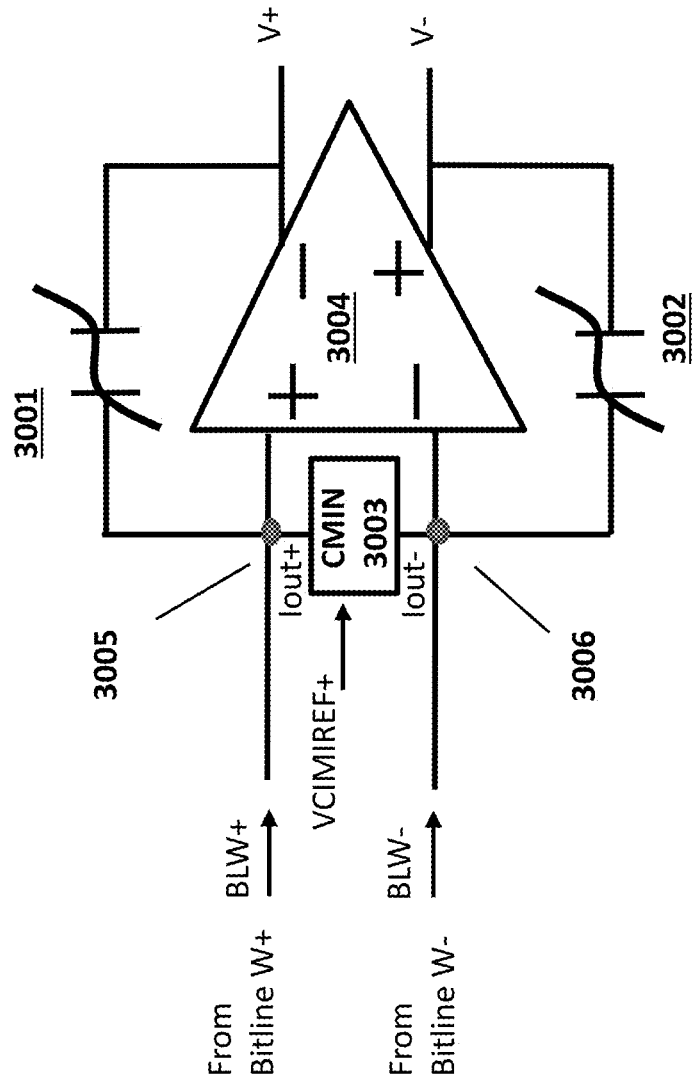
FIG. 30 depicts a current-to-voltage converter.
Figure 31:
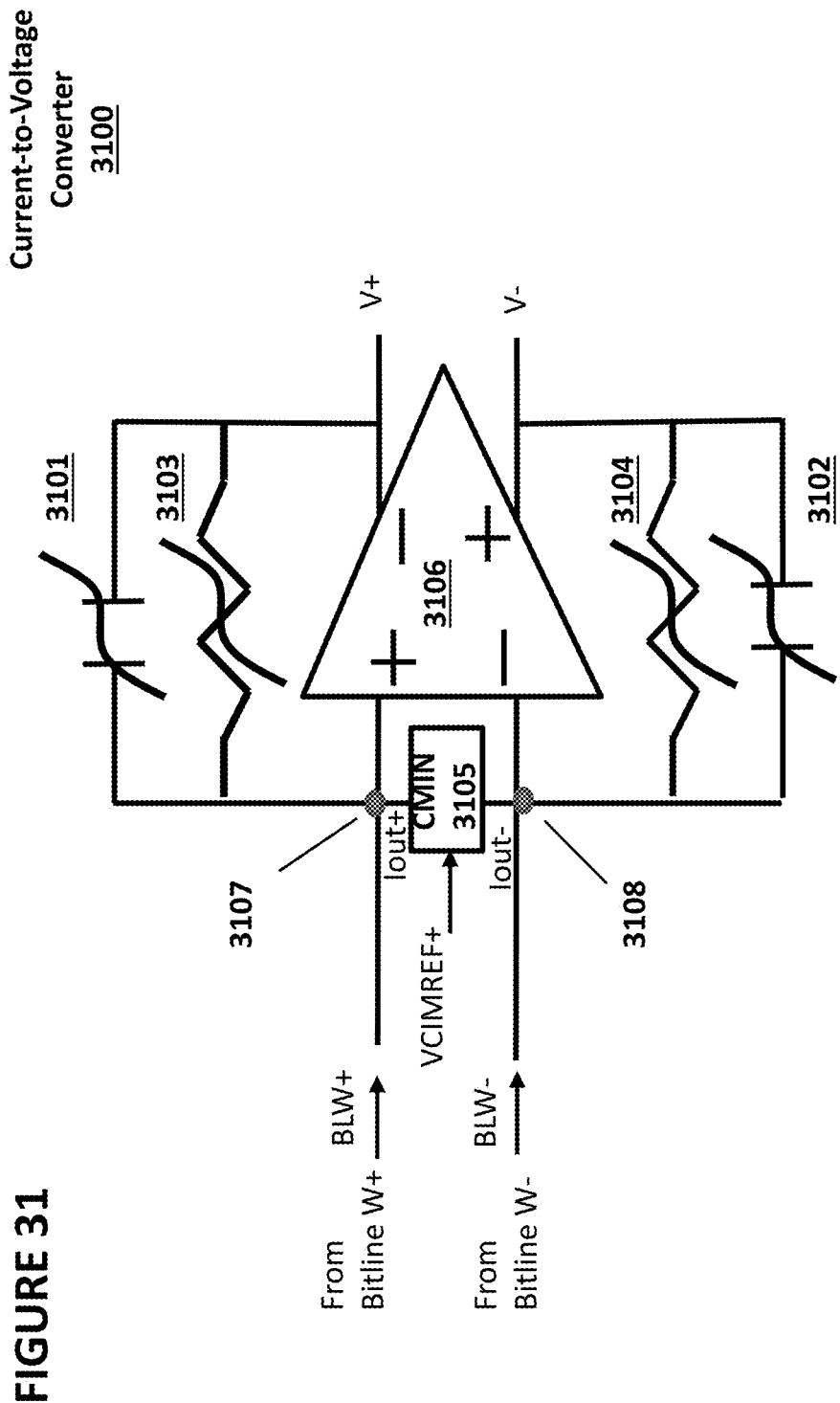
FIG. 31 depicts a current-to-voltage converter.

FIGS. 29, 30, and 31 disclose three examples of current-to-voltage converters that can be used as current-to-voltage converters 2802 in output block 2800 in FIG. 28. The inputs are currents BLW+ and BLW− from bitlines W+ and W−, respectively, and the outputs are voltages V+ and V−. V+ and V− are complementary, meaning one is positive and the other is negative around an output common mode voltage, VCM (which can be ground or can be another voltage). The inverting and non-inverting inputs to operational amplifiers 2904, 3004, and 3106 are maintained at a common reference voltage dictated by common mode circuits 2903, 3003, and 3105, respectively.

FIG. 29 depicts current-to-voltage converter 2900, which comprises variable resistor 2901, variable resistor 2902, common mode circuit 2903, and operational amplifier 2904. A first output of common mode circuit 2903 is coupled to node 2905, which node 2905 is coupled to the non-inverting input of operational amplifier 2904 and a second output of common mode circuit 2903 is coupled to node 2906, which node 2906 is coupled to the inverting input of operational amplifier 2904. Common mode circuit 2903 maintains the same voltage at nodes 2905 and 2906, meaning that the voltages on the non-inverting input and the inverting input of operational amplifier 2904 are equal. Common mode circuit 2903 receives a reference voltage, VCIMREF, and outputs a current Iout+ into node 2905 and a current Iout- into node 2906, where Iout+ and Iout- are equal. The equal voltage at nodes 2905 and 2906 and the equal currents Iout+ and Iout- lead to the generation of a common mode component, VCM, in the output voltage around which V+ and V- are centered. Current-to-voltage converter 2900 converts currents BLW+ and BLW- into voltages V+ and V-. The output voltages minus the common mode component, dV+=V+-VCIMREF and dV-=V--VCIMREF, are proportional to half of the difference between BLW+ and BLW- multiplied by the resistance of the respective feedback resistor (2901/2902), specifically:

$$dV + = \{(BLW + -BLW -)/2\} * R\_2901, \text{ and}$$

$$dV - = \{(BLW - -BLW +)/2\} * R\_2902$$

FIG. 30 depicts current-to-voltage converter 3000, which comprises variable capacitor 3001, variable capacitor 3002, common mode circuit 3003, and operational amplifier 3004. A first output of common mode circuit 3003 is coupled to node 3005, which node 3005 is coupled to the non-inverting input of operational amplifier 3004 and a second output of common mode circuit 3003 is coupled to node 3006, which node 3006 is coupled to the inverting input of operational amplifier 2904. Common mode circuit 3003 maintains the same voltage at nodes 3005 and 3006, meaning that the voltages on the non-inverting input and the inverting input of operational amplifier 3004 are equal. Common mode circuit 3003 receives a reference voltage, VCIMREF, and outputs a current Iout+ into node 3005 and a current Iout- into node 3006, where Iout+=Iout-. The equal voltage at nodes 3005 and 3006 and the equal currents Iout+ and Iout-lead to the generation of a common mode component, VCM, in the output voltage around which V+ and V- are centered. Current-to-voltage converter 3000 converts currents BLW+ and BLW- into voltages V+ and V-. The output voltages minus the common mode component, dV+=V+-VCIMREF) and dV-=V--VCIMREF, are proportional to half of the difference between BLW+ and BLW-multiplied by the capacitance value of feedback capacitors (3001/3002), specifically:

$$dV + = \{(BLW + -BLW -)/2\} * C\_3001, \text{ and}$$

$$dV - = \{(BLW - -BLW +)/2\} * C\_3003$$

FIG. 31 depicts current-to-voltage converter 3100, which comprises variable capacitor 3101, variable capacitor 3102, variable resistor 3103, variable resistor 3104, common mode circuit 3105, and operational amplifier 3106. A first output of common mode circuit 3105 is coupled to node 3107, which node 3107 is coupled to the non-inverting input of operational amplifier 3106 and a second output of common mode circuit 3105 is coupled to node 3108, which node 3108 is coupled to the inverting input of operational amplifier 3106. Common mode circuit 3105 maintains the same voltage at nodes 3107 and 3108, meaning that the voltages on the non-inverting input and the inverting input of operational amplifier 3106 are equal. Common mode circuit 3105 receives a reference voltage, VCIMREF, and outputs a current Iout+ into node 3107 and a current Iout- into node 3108, where Iout+=Iout-. The equal voltage at nodes 3107 and 3108 and the equal currents Iout+ and Iout-lead to the generation of a common mode component, VCM, in the output voltage around which V+ and V- are centered. Current-to-voltage converter 3100 converts current on BLW+ and BLW- into voltages V+ and V-. The output voltages minus the common mode component, dV+=V+-VCIMREF and dV-=V--VCIMREF, are proportional to half of the difference between BLW+ and BLW-multiplied by the resistance value of the feedback resistors (3103/3104), specifically:

$$dV + = \{(BLW + -BLW -)/2\} * R\_3101, \text{ and}$$

$$dV - = \{(BLW - -BLW +)/2\} * R\_3102$$

Thus, resistors 3103 and 3104 convert current to voltage. After the conversion is complete, resistors 3103 and 3104 are shut off by switches (not shown), and capacitors 3101 and 3102 are used to hold the converted voltage.

FIGS. 32-36 depict examples of common mode circuits that can be used as common mode circuits 2903, 3003, and 3105 in current-to-voltage converters 2900, 3000, and 3100 in FIGS. 29-31, respectively.

Figure 32:
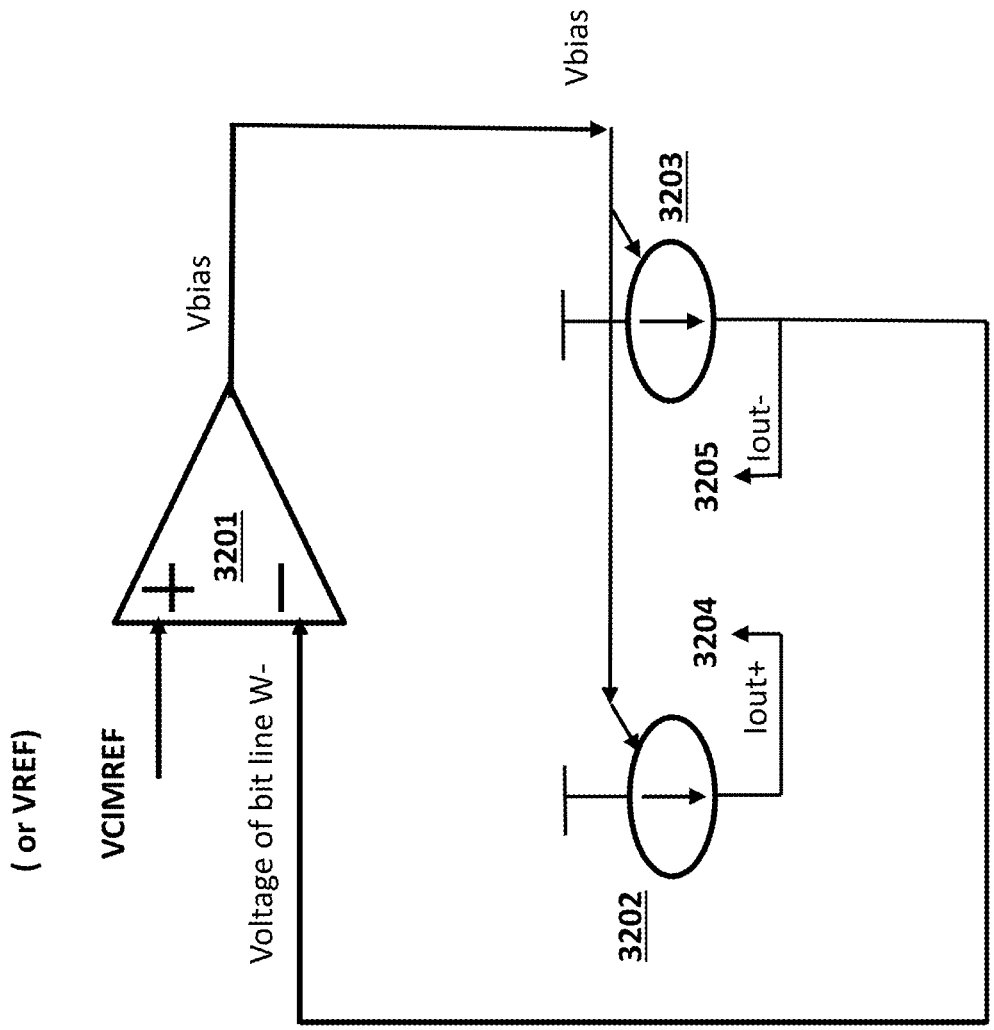
FIG. 32 depicts a common mode circuit for current-to-voltage converters.

FIG. 32 depicts common mode circuit 3200, which comprises operational amplifier 3201 (which is an example of a regulating circuit), current source 3202, current source 3203, node 3204 (which corresponds to nodes 2905, 3005, and 3107 in FIGS. 29, 30, and 31), and node 3205 (which corresponds to nodes 2906, 3006, and 3108 in FIGS. 29, 30, and 31).

Operational amplifier 3201 receives voltage VCIMREF as an input on its non-inverting input and the voltage of node 3205 on its inverting input. Due to the high input impedance of operational amplifier 3201, no current flows from BLw- into operational amplifier 3201. Operational amplifier 3201 generates voltage output Vbias (a voltage bias), which is applied as a bias signal to current sources 3202 and 3203 to control their current magnitudes, Iout+ and Iout-, respectively. Operational amplifier 3201 will modify Vbias until the voltage of bitline W-, which is the voltage at node 3205, equals VCIMREF.

Figure 33:
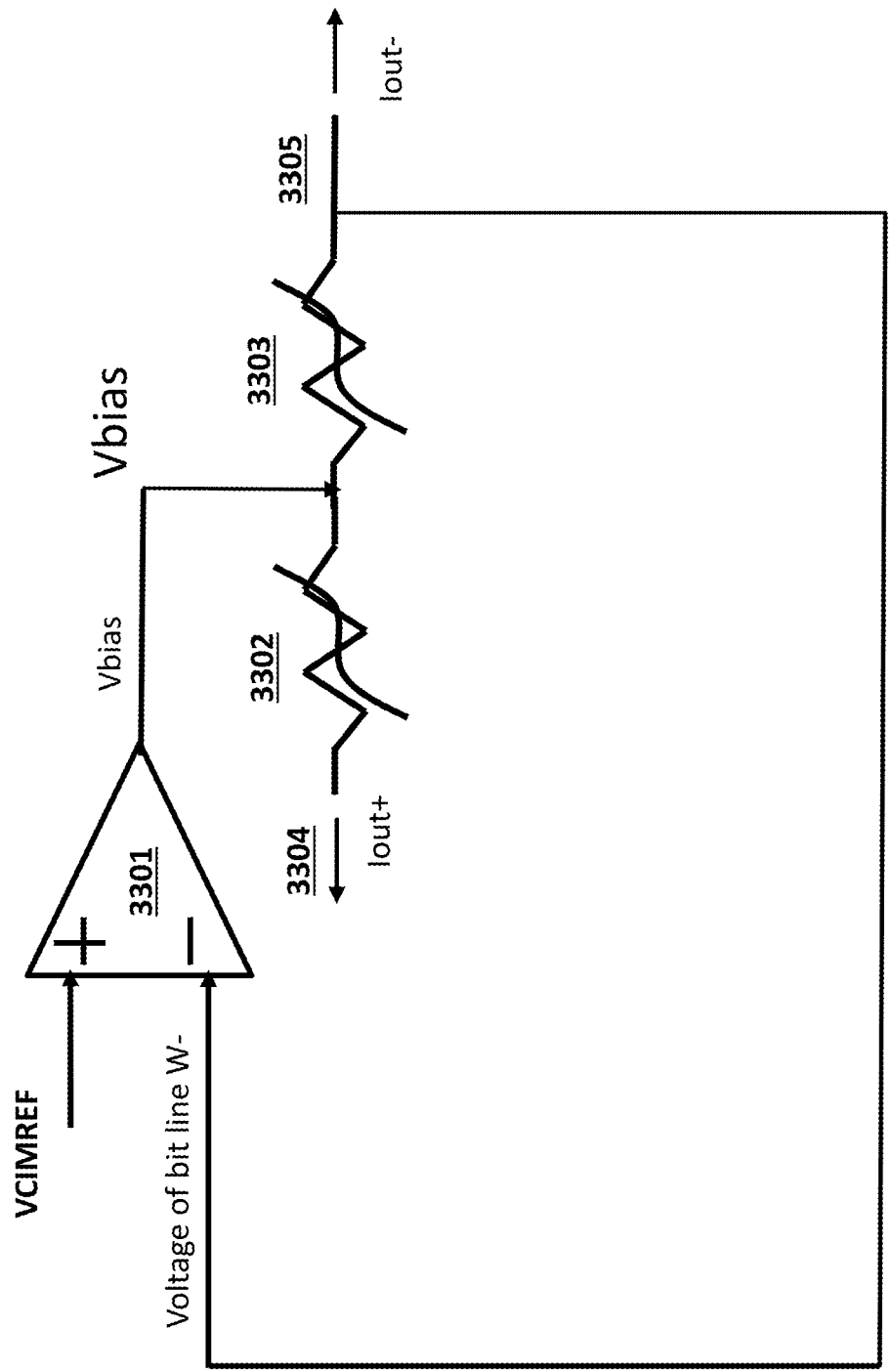
FIG. 33 depicts a common mode circuit for current-to-voltage converters.

FIG. 33 depicts common mode circuit 3300, which comprises operational amplifier 3301 (which is an example of a regulating circuit), variable resistor 3302, variable resistor 3303, node 3304 (which corresponds to nodes 2905, 3005, and 3107 in FIGS. 29, 30, and 31), and node 3305 (which corresponds to nodes 2906, 3006, and 3108 in FIGS. 29, 30, and 31). Vbias (a voltage bias) is applied at a node between variable resistor 3302 and variable resistor 3303. The current through variable resistors 3302 and 3303 are Iout+ and Iout-, respectively, where Iout+=Iout-. The variable resistors are set during a configuration mode to ensure that the voltages at nodes 3304 and 3305 are equal, which will also cause Iout+ and Iout- to be equal. Operational amplifier 3301 receives voltage VCIMREF as an input on its non-inverting input and the voltage of node 3305 on its inverting input. Due to the high input impedance of operational amplifier 3301, no current flows from node 3305 (or the bitline W−) into operational amplifier 3301. Operational amplifier 3301 generates voltage output Vbias and will modify Vbias until the voltage of bitline W−, which is the voltage at node 3305, equals VCIMREF.

Figure 34:
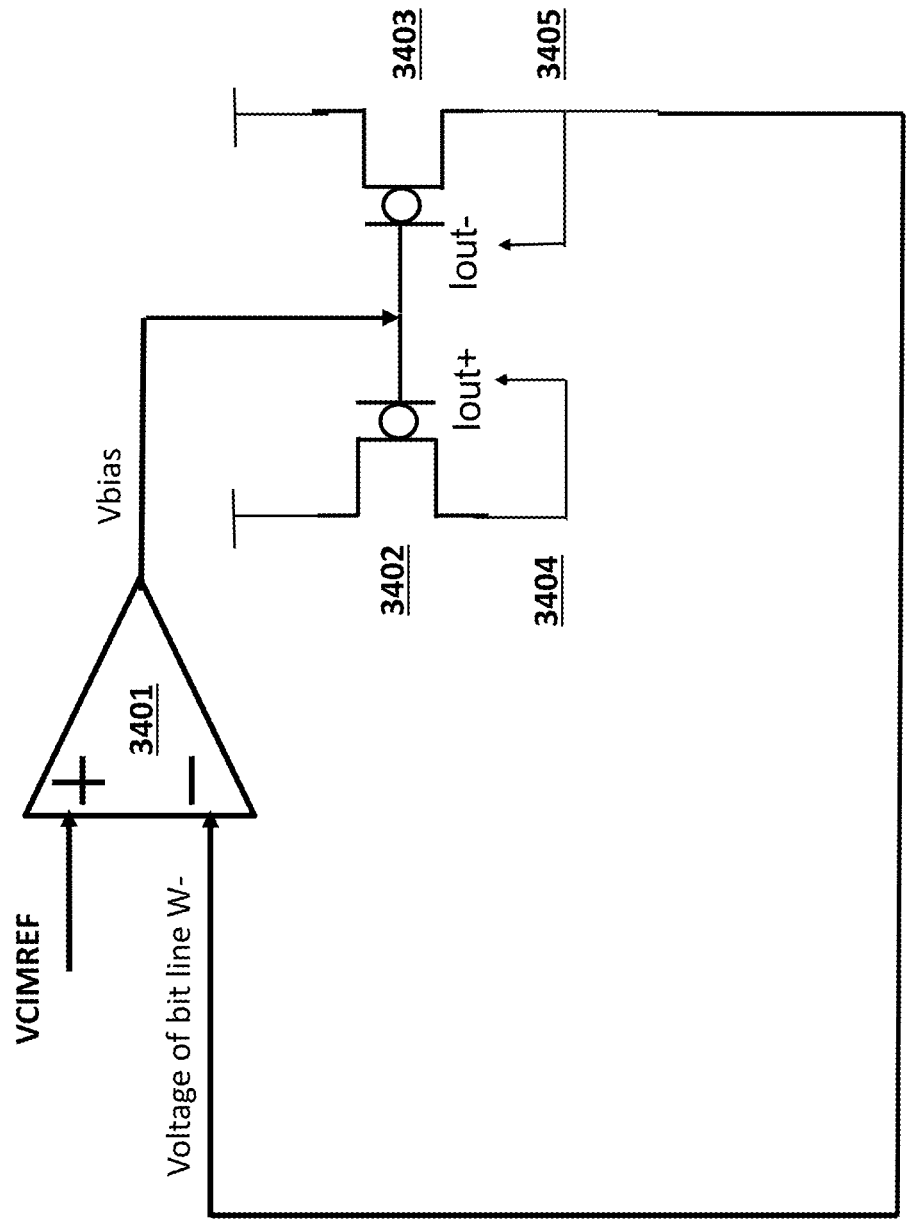
FIG. 34 depicts a common mode circuit for current-to-voltage converters.

FIG. 34 depicts common mode circuit 3400, which comprises operational amplifier 3401 (which is an example of a regulating circuit), PMOS transistor 3402, PMOS transistor 3403, node 3404 (which corresponds to nodes 2905, 3005, and 3107 in FIGS. 29, 30, and 31), and node 3405 (which corresponds to nodes 2906, 3006, and 3108 in FIGS. 29, 30, and 31). Vbias (a voltage bias) is applied at a node coupled to the gates of PMOS transistors 3402 and 3403, resulting in currents Iout+ and out−, where Iout+=Iout−. The voltages at nodes 3404 and 3405 are equal. Operational amplifier 3401 receives voltage VCIMREF as an input on its non-inverting input and the voltage of node 3405 on its inverting input. Due to the high input impedance of operational amplifier 3401, no current flows from node 3405 (or the bitline W−) into operational amplifier 3401. Operational amplifier 3401 generates voltage output Vbias and will modify Vbias until the voltage of bitline W−, which is the voltage at node 3405, equals VCIMREF.

Figure 35:
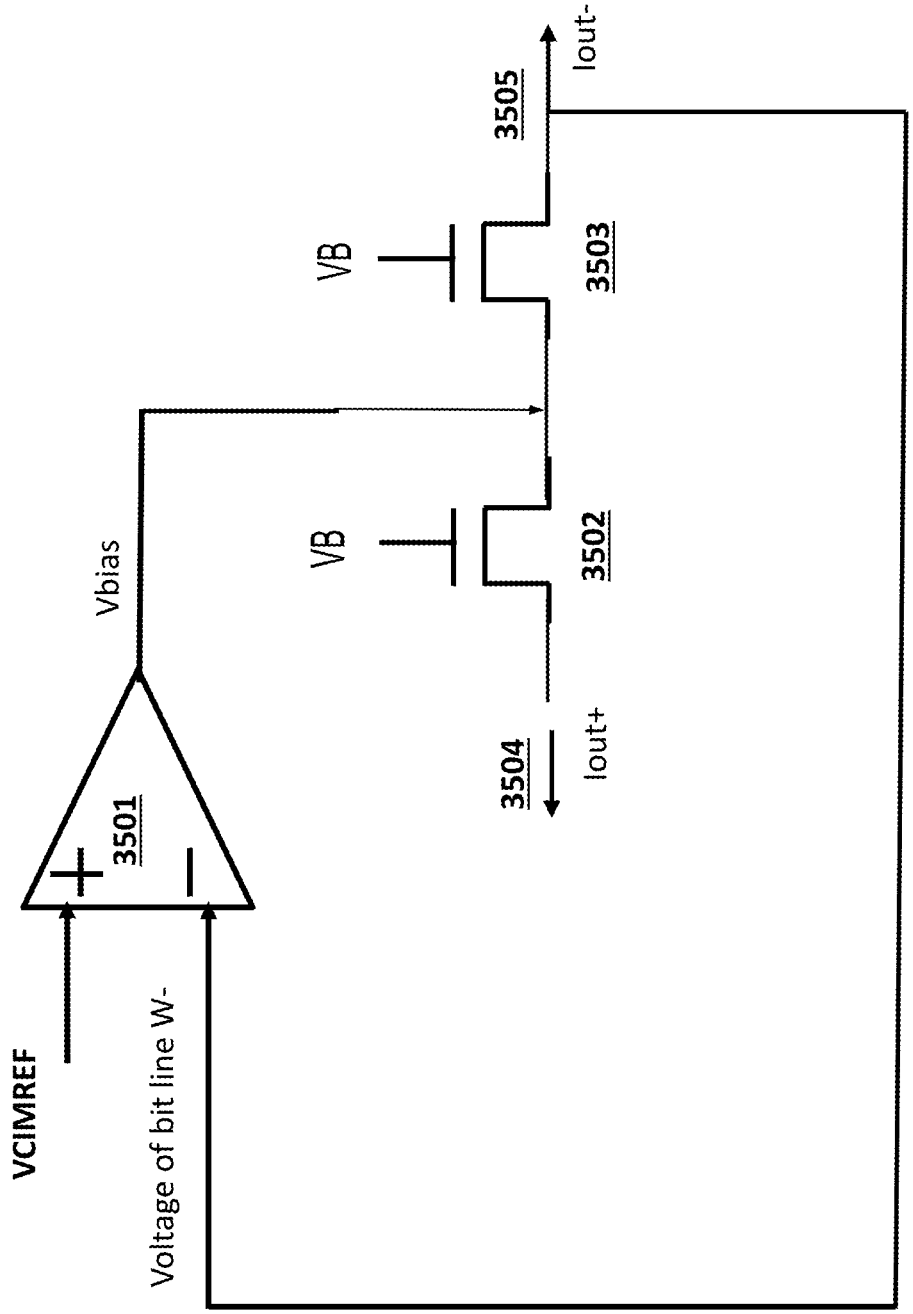
FIG. 35 depicts a common mode circuit for current-to-voltage converters.

FIG. 35 depicts common mode circuit 3500, which comprises operational amplifier 3501 (which is an example of a regulating circuit), NMOS transistor 3502, NMOS transistor 3503, node 3504 (which corresponds to nodes 2905, 3005, and 3107 in FIGS. 29, 30, and 31), and node 3505 (which corresponds to nodes 2906, 3006, and 3108 in FIGS. 29, 30, and 31). Vbias (a voltage bias) is applied at a node between NMOS transistors 3502 and 3503 and VB is a bias voltage applied to turn on NMOS transistors 3502 and 3503 during operation, resulting in currents Iout+ and Iout−, where Iout+=Iout−. The voltages at nodes 3504 and 3505 are equal. Operational amplifier 3501 receives voltage VCIMREF as an input on its non-inverting input and the voltage of node 3505 on its inverting input. Due to the high input impedance of operational amplifier 3501, no current flows from node 3505 (or the bitline W−) into operational amplifier 3501. Operational amplifier 3501 generates voltage output Vbias and will modify Vbias until the voltage of bitline W−, which is the voltage at node 3505, equals VREF.

Figure 36:
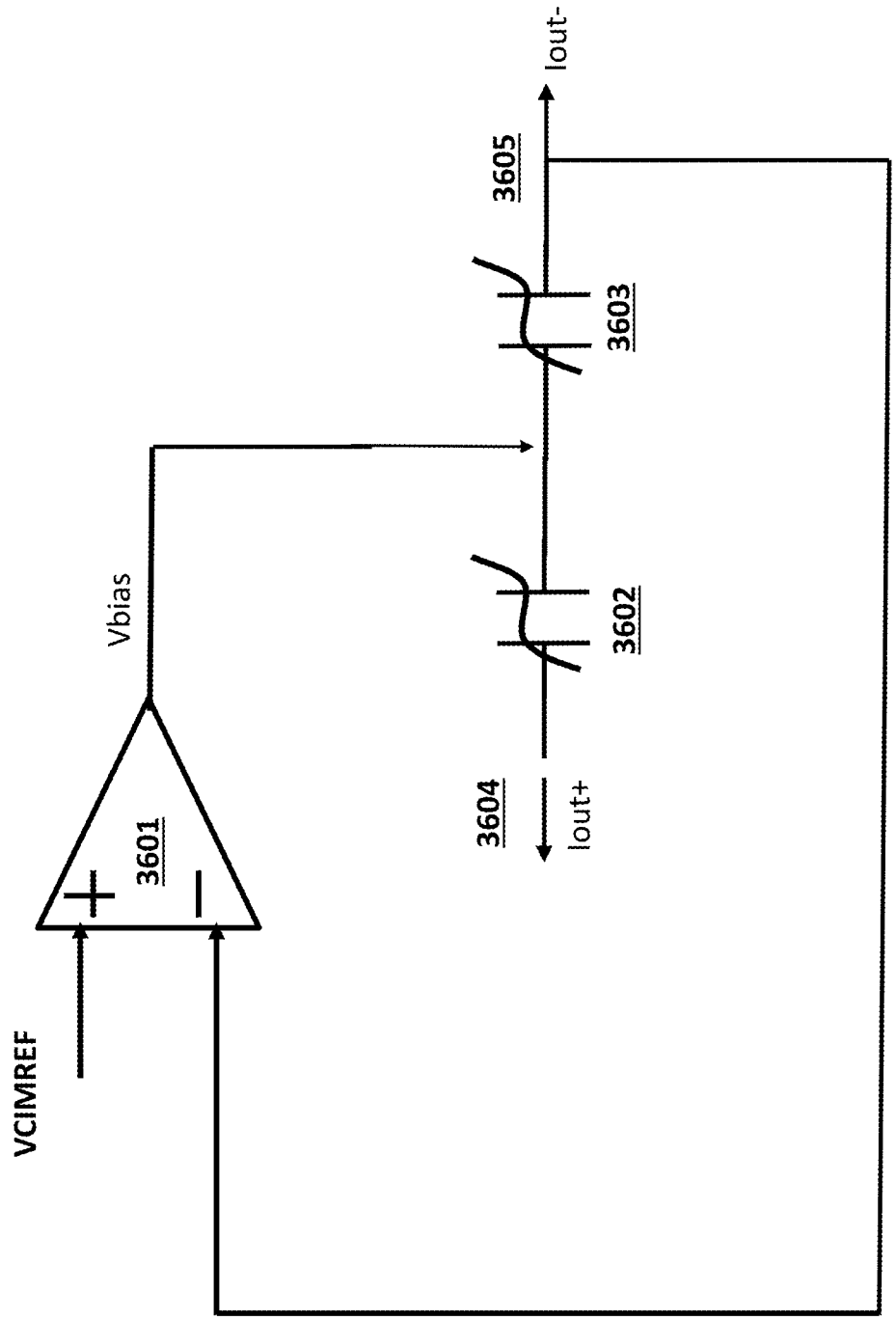
FIG. 36 depicts a common mode circuit for current-to-voltage converters.

FIG. 36 depicts common mode circuit 3600, which comprises operational amplifier 3601 (which is an example of a regulating circuit), variable capacitor 3602, variable capacitor 3603, node 3604 (which corresponds to nodes 2905, 3005, and 3107 in FIGS. 29, 30, and 31), and node 3605 (which corresponds to nodes 2906, 3006, and 3108 in FIGS. 29, 30, and 31). Vbias (a voltage bias) is applied at a node between variable capacitor 3602 and variable capacitor 3603. The current out of variable capacitors 3602 and 3603 are Iout+ and Iout−, respectively, where Iout+=Iout−. The variable capacitors are set during a configuration mode to ensure that the voltages at nodes 3604 and 3605 are equal, which will also cause Iout+ and Iout− to be equal. Operational amplifier 3601 receives voltage VCIMREF as an input on its non-inverting input and the voltage of node 3605 on its inverting input. Due to the high input impedance of operational amplifier 3601, no current flows from node 3605 (or the bitline W−) into operational amplifier 3601. Operational amplifier 3601 generates voltage output Vbias and will modify Vbias until the voltage of bitline W−, which is the voltage at node 3605, equals VCIMREF.

Figure 37:
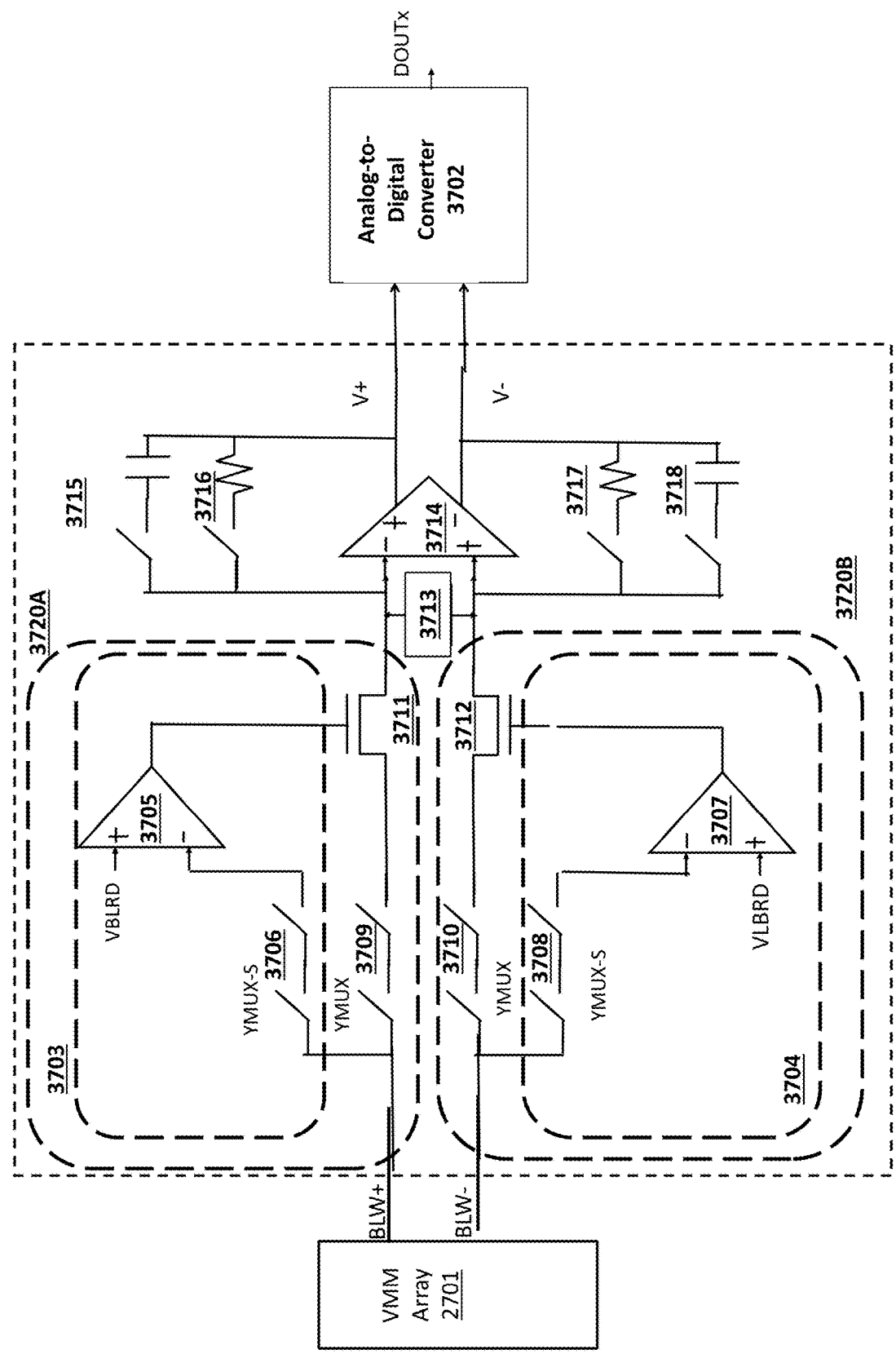
FIG. 37 depicts a current-to-voltage converter.

FIG. 37 depicts an example output block for column pair 3700. Only one output block for column pair 3700 is shown, but it is to be understood that an instantiation of output block for column pair 3700 would be used for each pair of columns in VMM array 2701. Output block for column pair 3700 receives current BLW+ (a first current) from one column and current BLW− (a second current) from another column in VMM array 2701 and generates DOUTx, a digital output that comprises a set of output bits.

Output block for column pair 3700 comprises current-to-voltage (ITV) converter 3701 and analog-to-digital converter (ADC) 3702. Current-to-voltage converter 3701 comprises regulator 3703 (a first regulator), regulator 3704 (a second regulator), common mode circuit 3713, switches 3709, switches 3710, NMOS transistor 3711, NMOS transistor 3712, operational amplifier (which may be referred to as opamp) (which is an example of a regulating circuit) 3714, switched capacitor 3715 (a first capacitor), switched resistor 3716 (a first resistor), switched resistor 3717 (a second resistor), and switched capacitor 3718 (a second capacitor). Operational amplifier 3714 comprises a first input terminal, a second input terminal, a first output terminal, and a second output terminal, the first output terminal and the second output terminal providing the differential voltages.

Switched capacitors 3715 and 3718 may be variable capacitors or fixed capacitors. Switched resistors 3716 and 3717 may be variable resistors or fixed resistors. Optionally, switched capacitors 3715 and 3718 can be removed. Optionally, switched resistors 3716 and 3717 can be removed. Regulator 3703 comprises switches 3706 and operational amplifier 3705 (which is an example of a regulating circuit). Regulator 3704 comprises switches 3708 and operational amplifier 3707 (which is an example of a regulating circuit). BL+ regulation circuit 3720A comprises regulator 3703, switches 3709, and NMOS transistor 3711. BL− regulation circuit 3720B comprises regulator 3704, switches 3710, and NMOS transistor 3712.

For the circuit path connecting bitline BL+ (a first bitline), the switches 3709 and 3706 are portions of a column multiplexor that multiplexes the bitlines from VMM array 2701 into the current-to-voltage converter 3701. Specifically, the column multiplexor selects bitline BL+ by closing switches 3706 and 3709. A conventional column multiplexor only uses the equivalent of switches 3709 which conduct the bitline current from VMM array 2701 to the current-to-voltage converter 3701 (which may also be referred to as an output circuit, or a sensing circuit). The example shown here adds switches 3706 which is part of a sensing multiplexor (YMUX-S) that carries no current due to the high impedance of operational amplifier 3705. Under this configuration switches 3706 and 3709 will have the same voltage but switches 3709 will carry current while switches 3706 will not carry current. When switches 3706 and 3709 are closed, the voltage of the bitline will initially be lower than VBLRD, which causes the output of operational amplifier 3705 to increase and turns on NMOS transistor 3711. The increase in voltage on the gate of NMOS transistor 3711 causes the voltage of the source of NMOS transistor 3711 to also increase until the voltage of the bitline equals VBLRD.

For the circuit path connecting bitline BL− (a second bitline), the switches 3710 and 3708 are portions of a column multiplexor that multiplexes the bitlines from VMM array 2701 into the current-to-voltage converter 3701. Specifically, the column multiplexor selects bitline BL− by closing switches 3708 and 3710. A conventional column multiplexor only uses the equivalent of switches 3710 which conduct the bitline current from VMM array 2701 to the current-to-voltage converter 3701 (which may also be referred to as an output circuit, or a sensing circuit). The example shown here adds switches 3708 which is part of a sensing multiplexor (YMUX-S) that carries no current due to the high impedance of operational amplifier 3707. Under this configuration, switches 3708 and 3710 will have the same voltage but switches 3710 will carry current while switches 3708 will not carry current. When switches 3708 and 3710 are closed, the voltage of the bitline will initially be lower than VBLRD, which causes the output of operational amplifier 3707 to increase and turns on NMOS transistor 3712. The increase in voltage on the gate of NMOS transistor 3712 causes the voltage of the source of NMOS transistor 3712 to also increase until the voltage of the bitline equals VBLRD.

Alternatively, transistors 3711 and 3712 can be PMOS transistors instead of NMOS transistors.

Figure 1:
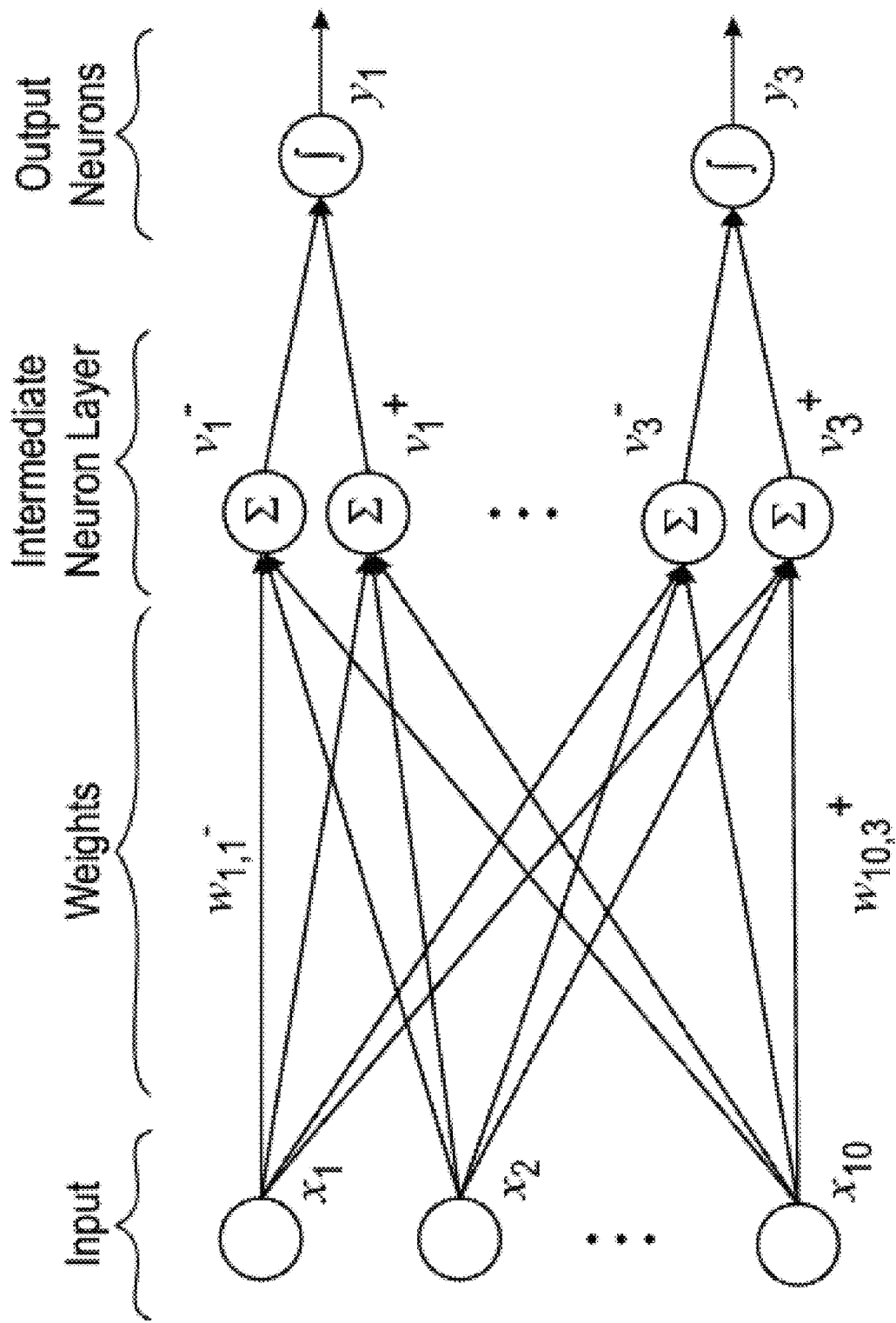
FIG. 1 is a diagram that illustrates an artificial neural network.
Figure 2:
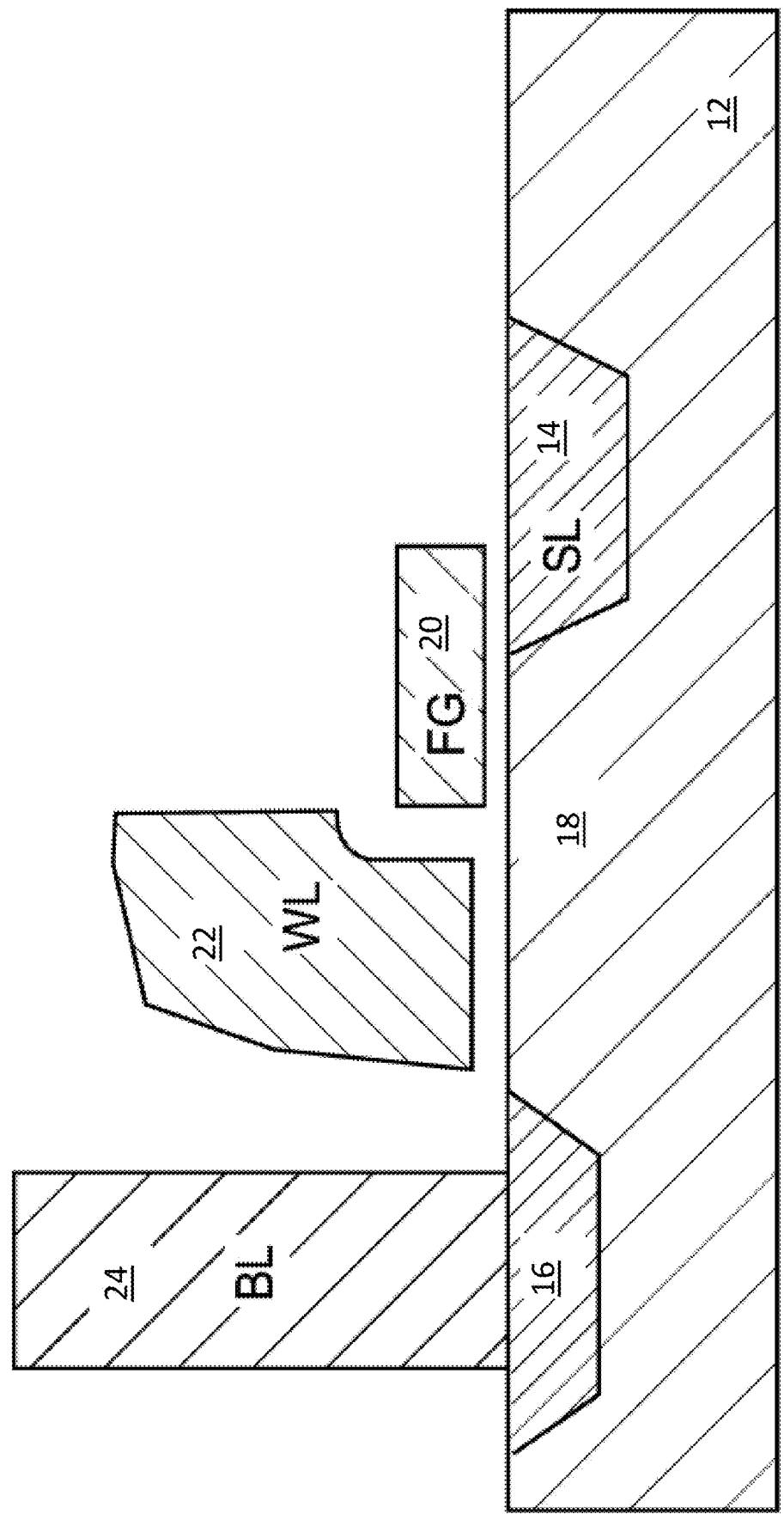
FIG. 2 depicts a prior art split gate flash memory cell.
Figure 3:
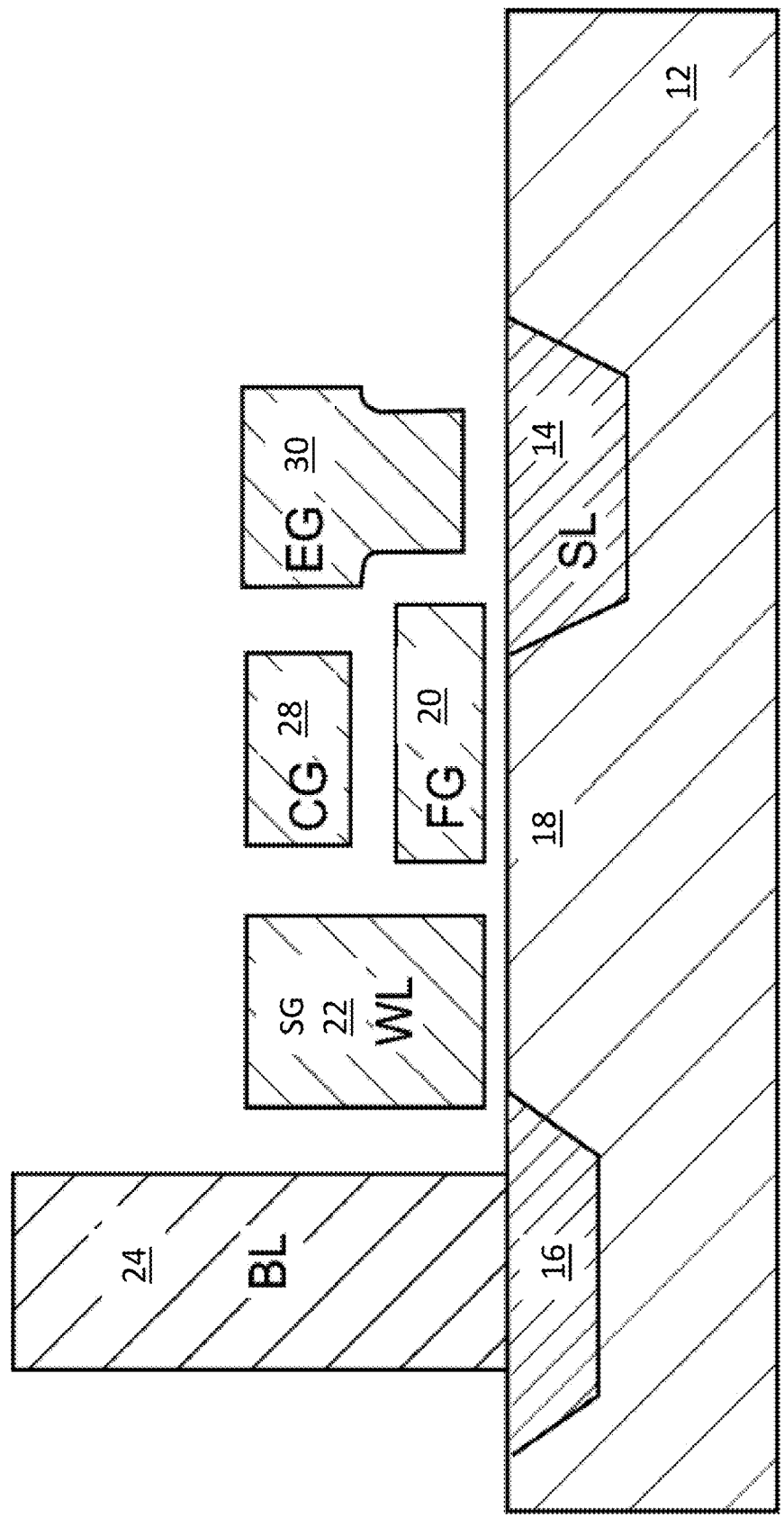
FIG. 3 depicts another prior art split gate flash memory cell.
Figure 4:
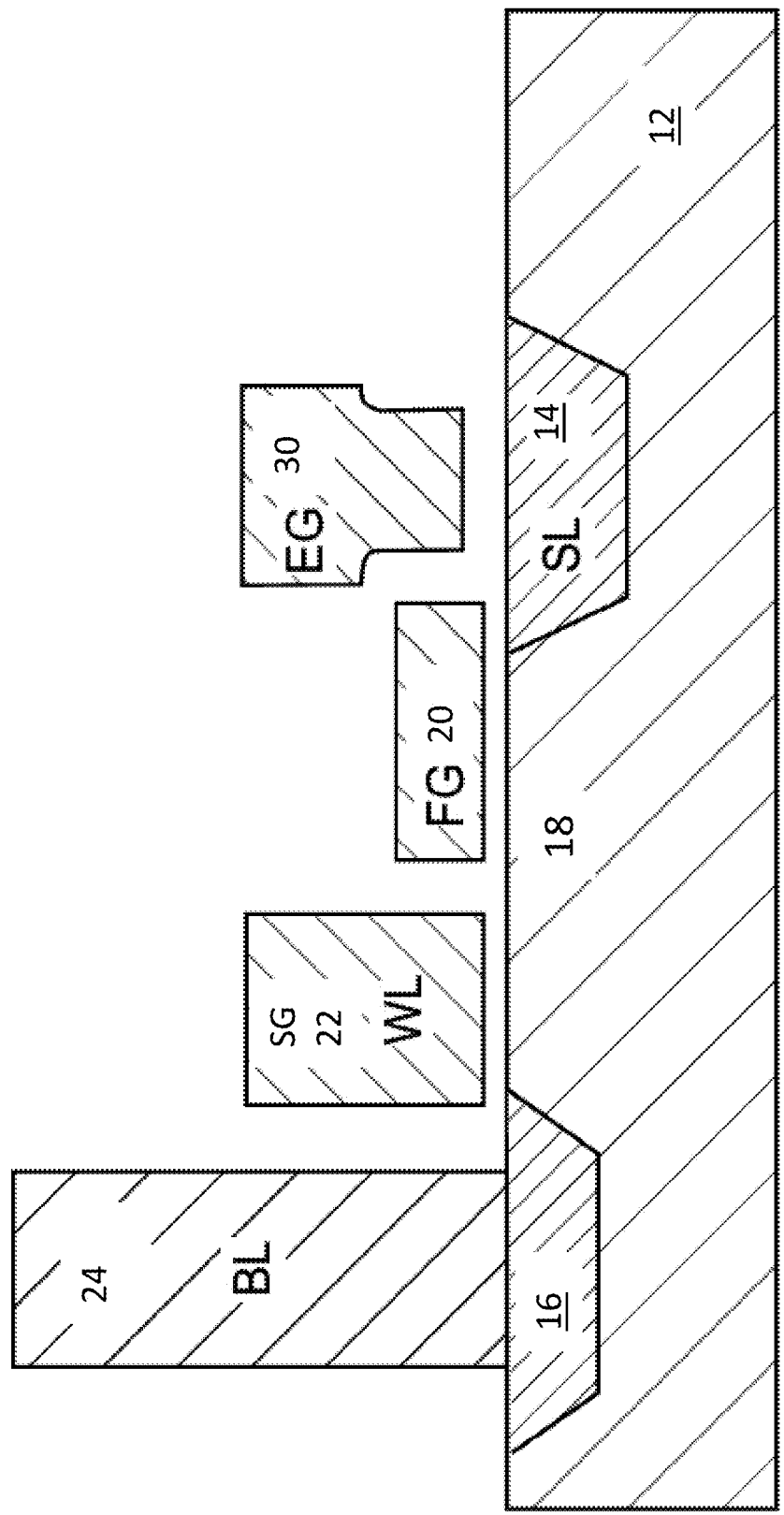
FIG. 4 depicts another prior art split gate flash memory cell.
Figure 5:
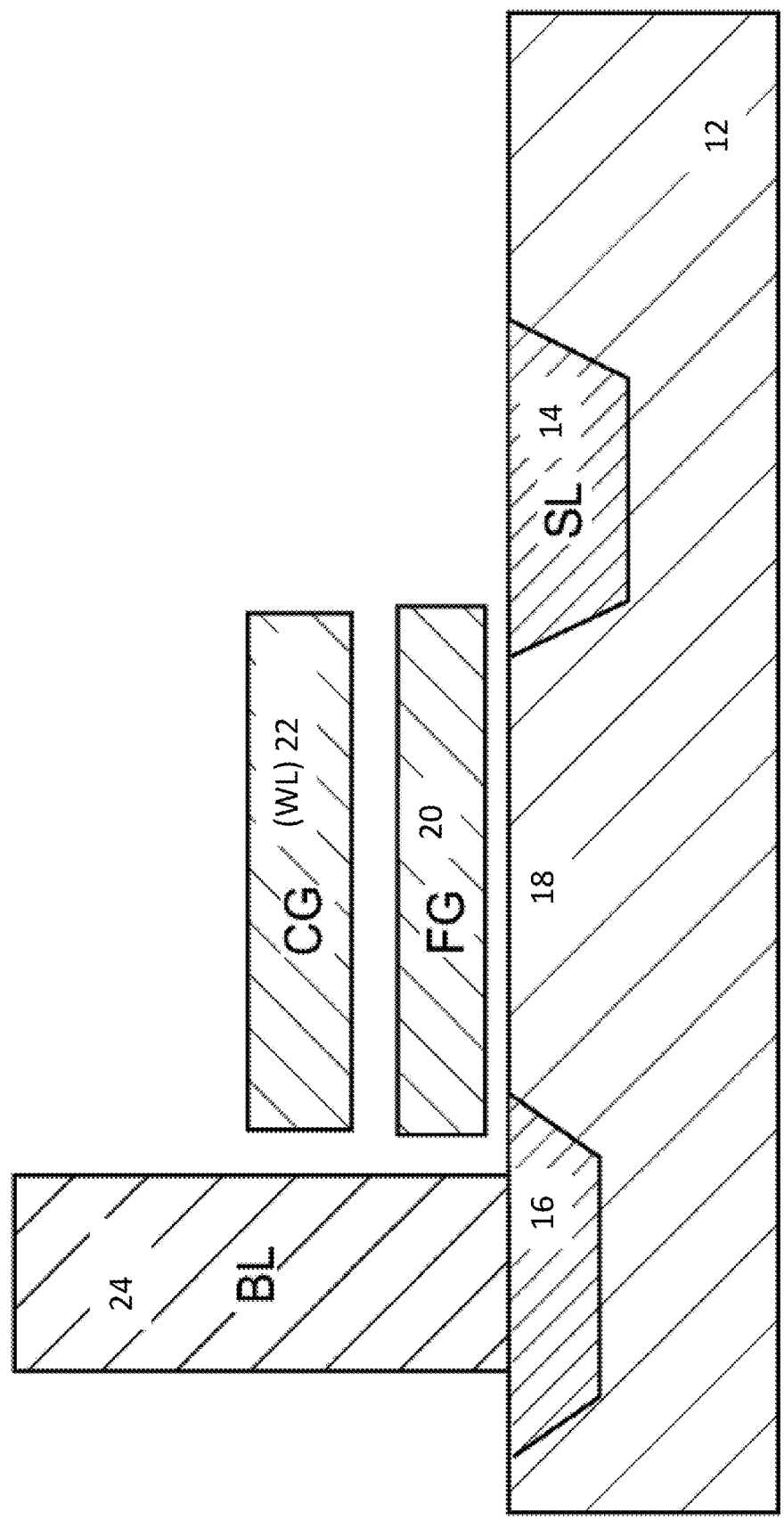
FIG. 5 depicts another prior art split gate flash memory cell.
Figure 6:
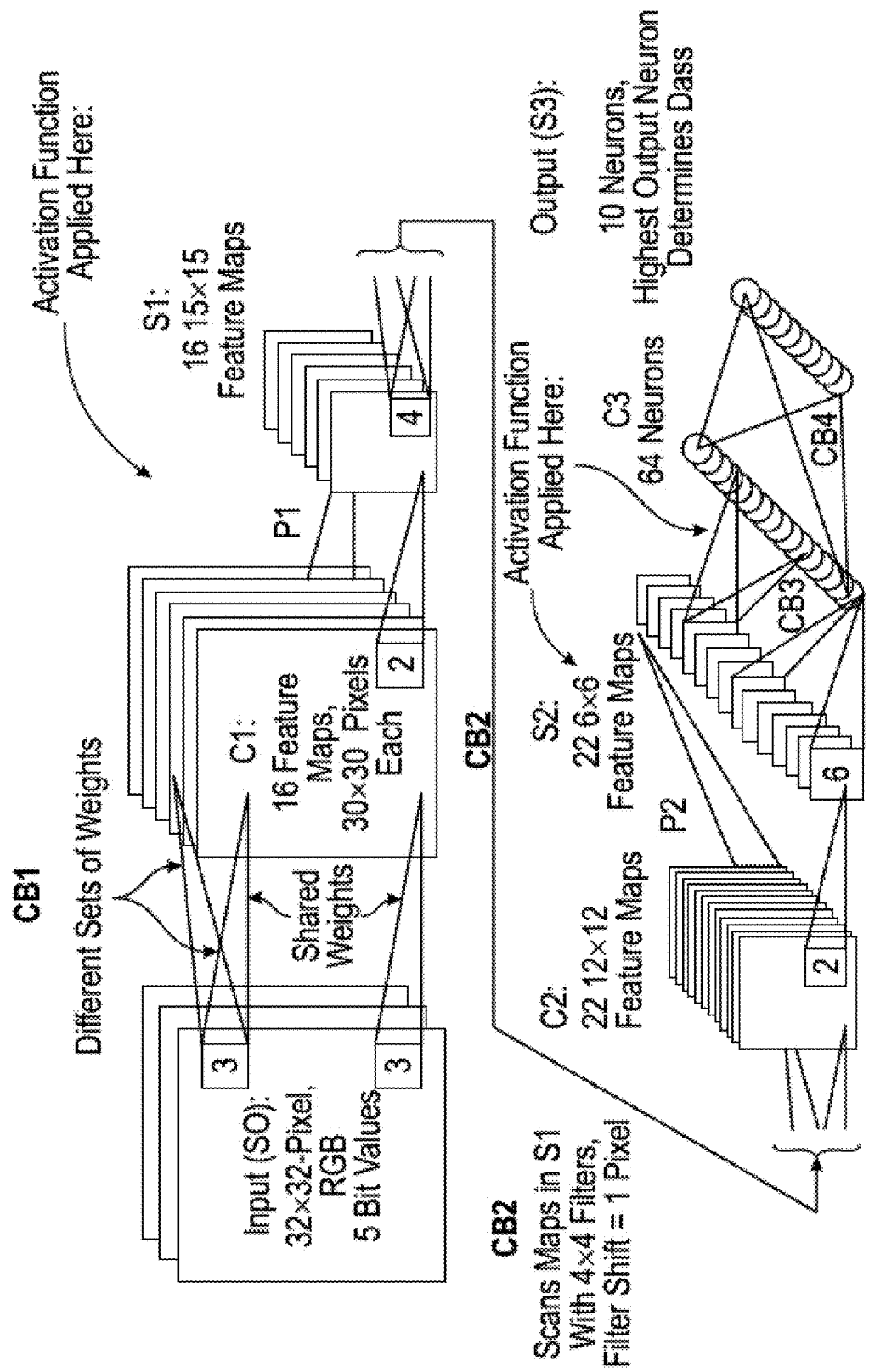
FIG. 6 is a diagram illustrating the different levels of an artificial neural network utilizing one or more non-volatile memory arrays.
Figure 7:
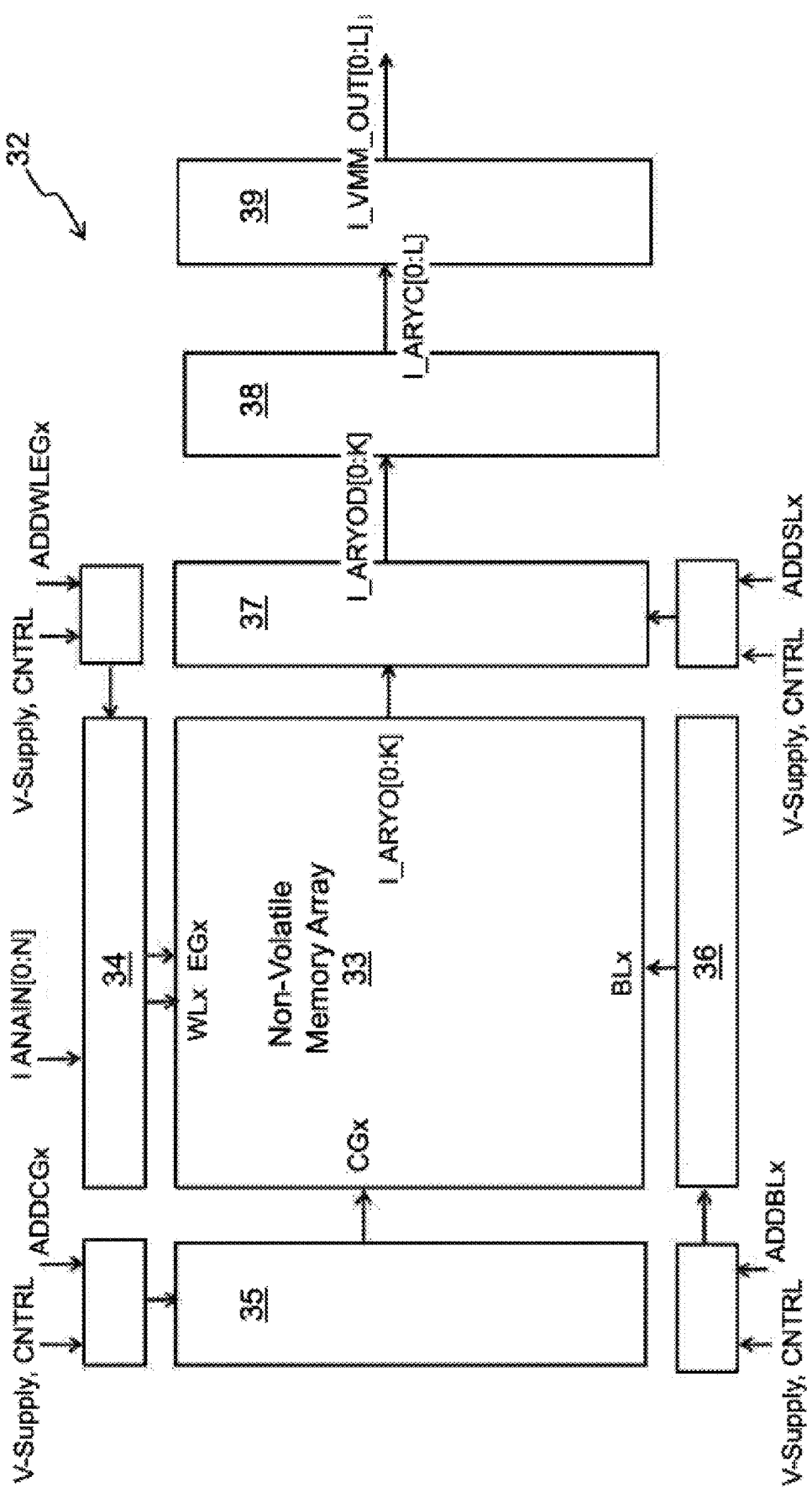
FIG. 7 is a block diagram illustrating a VMM system.
Figure 8:
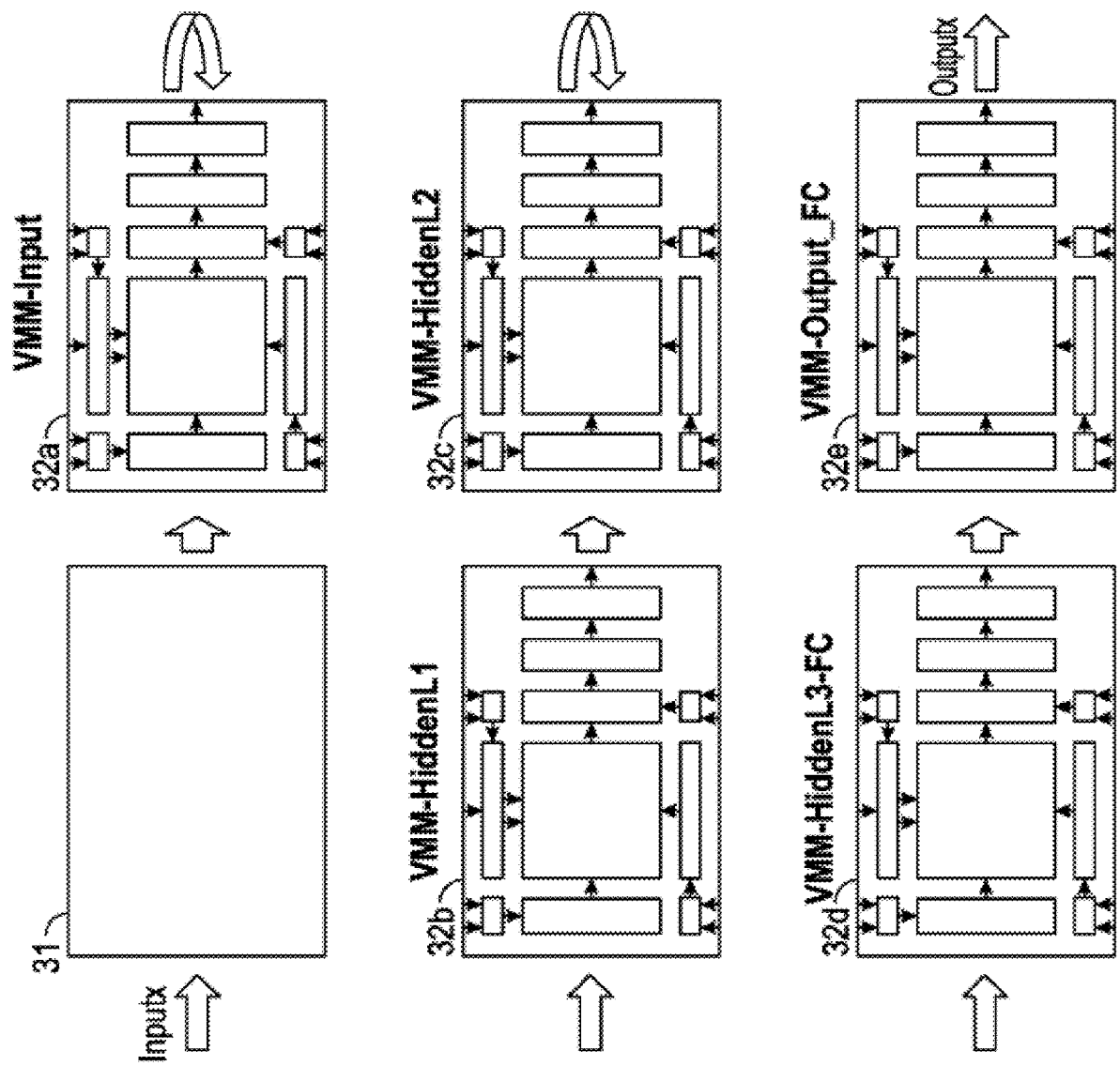
FIG. 8 is a block diagram illustrates an example artificial neural network utilizing one or more VMM systems.
Figure 9:
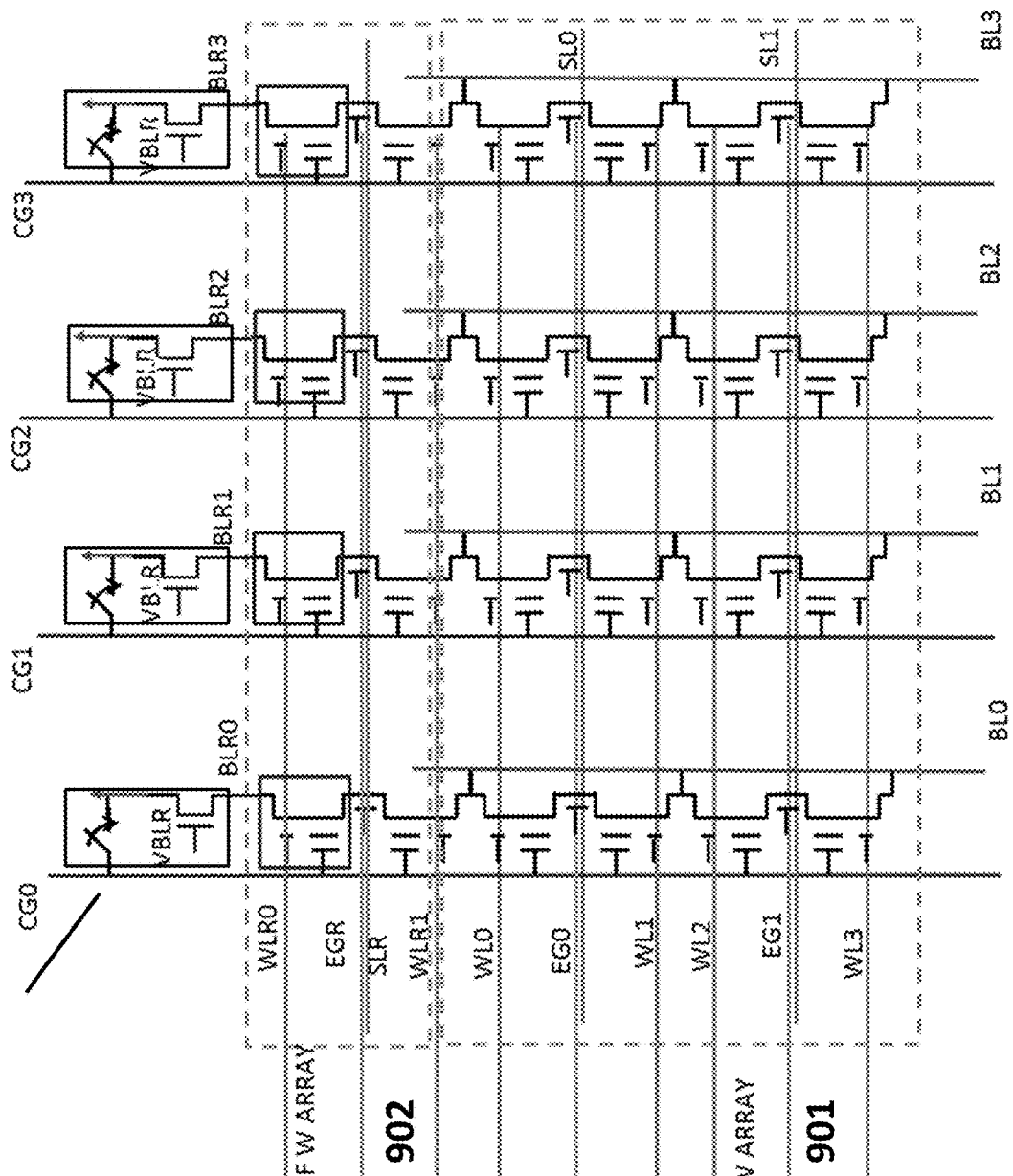
FIG. 9 depicts another example of a VMM system.
Figure 10:
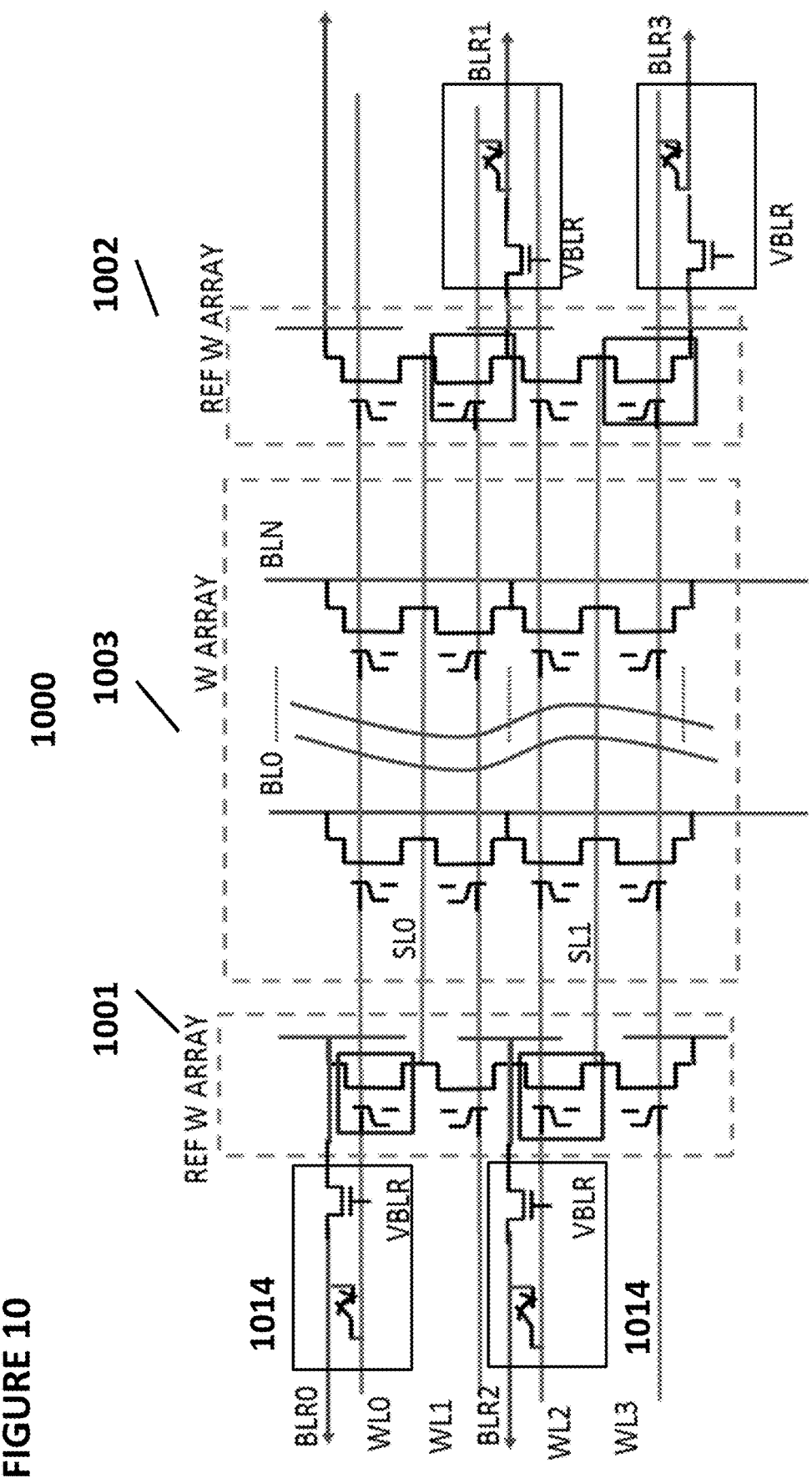
FIG. 10 depicts another example of a VMM system.
Figure 11:
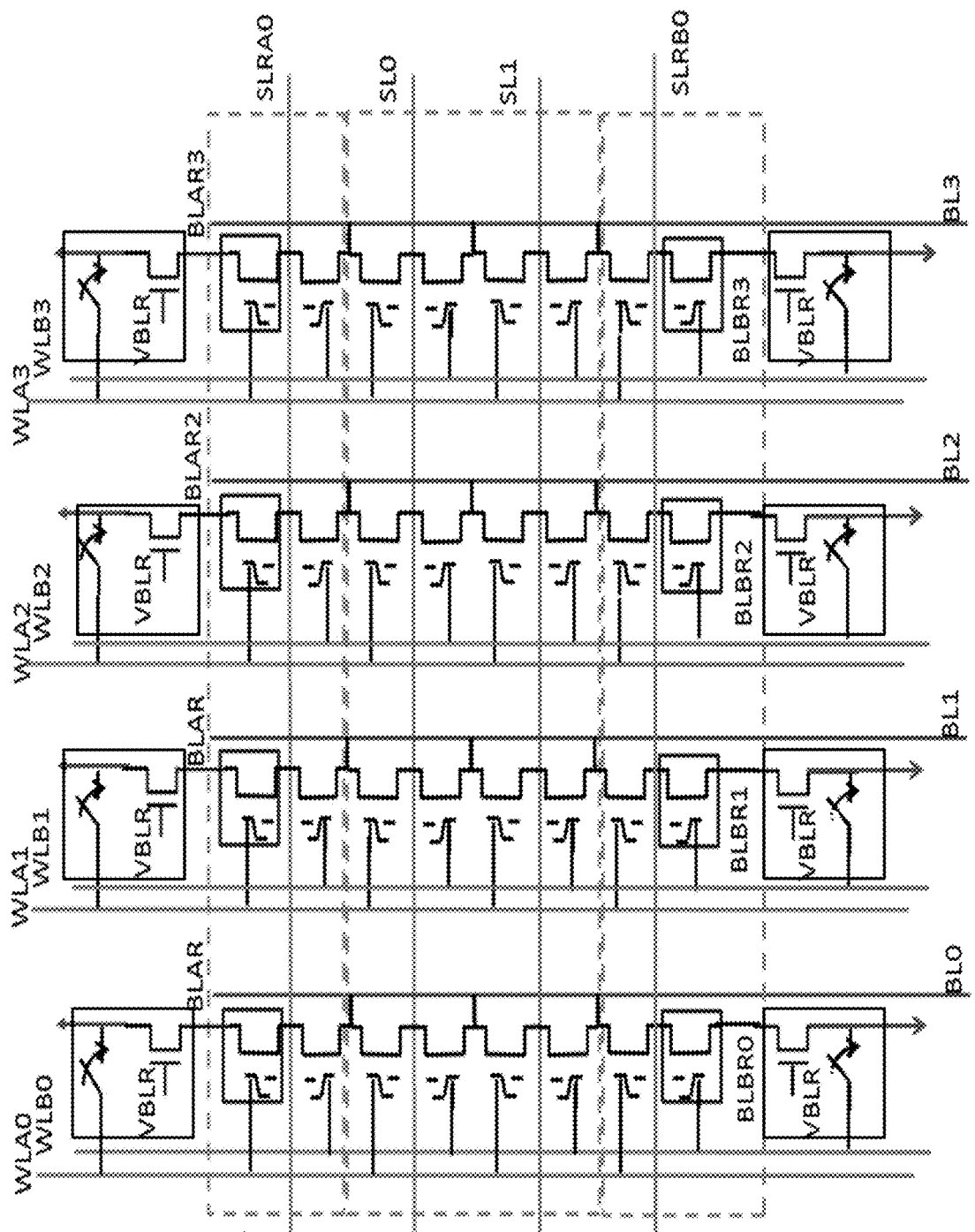
FIG. 11 depicts another example of a VMM system.
Figure 12:
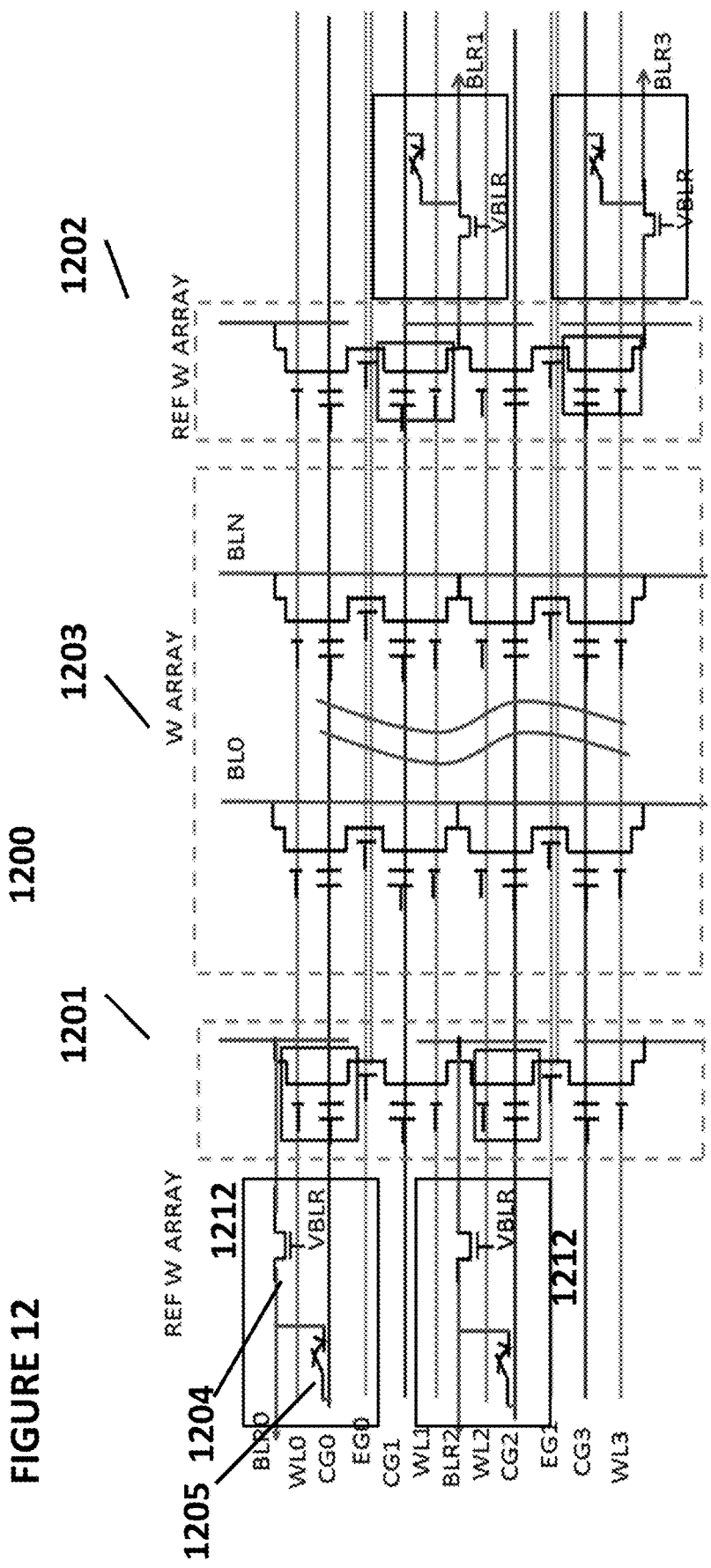
FIG. 12 depicts another example of a VMM system.
Figure 13:
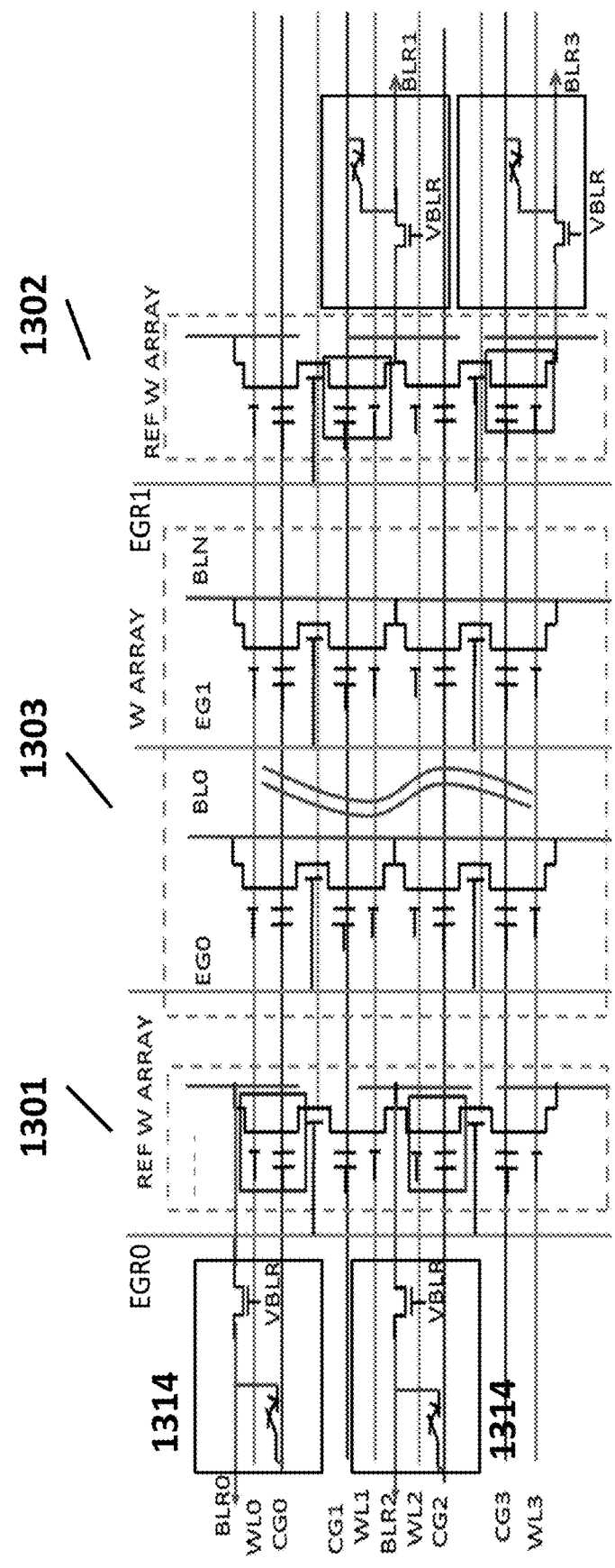
FIG. 13 depicts another example of a VMM system.
Figure 14:
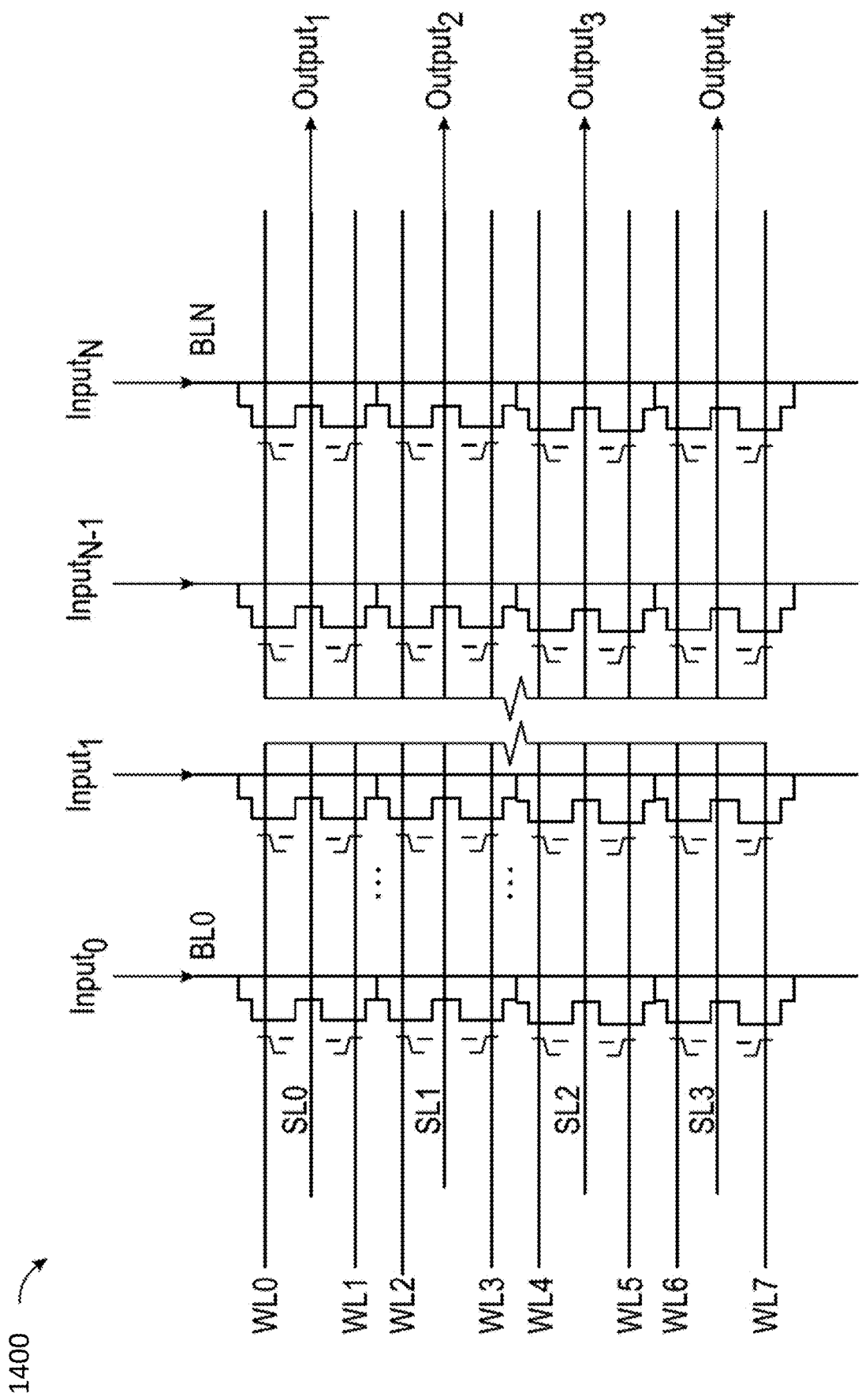
FIG. 14 depicts another example of a VMM array.
Figure 15:
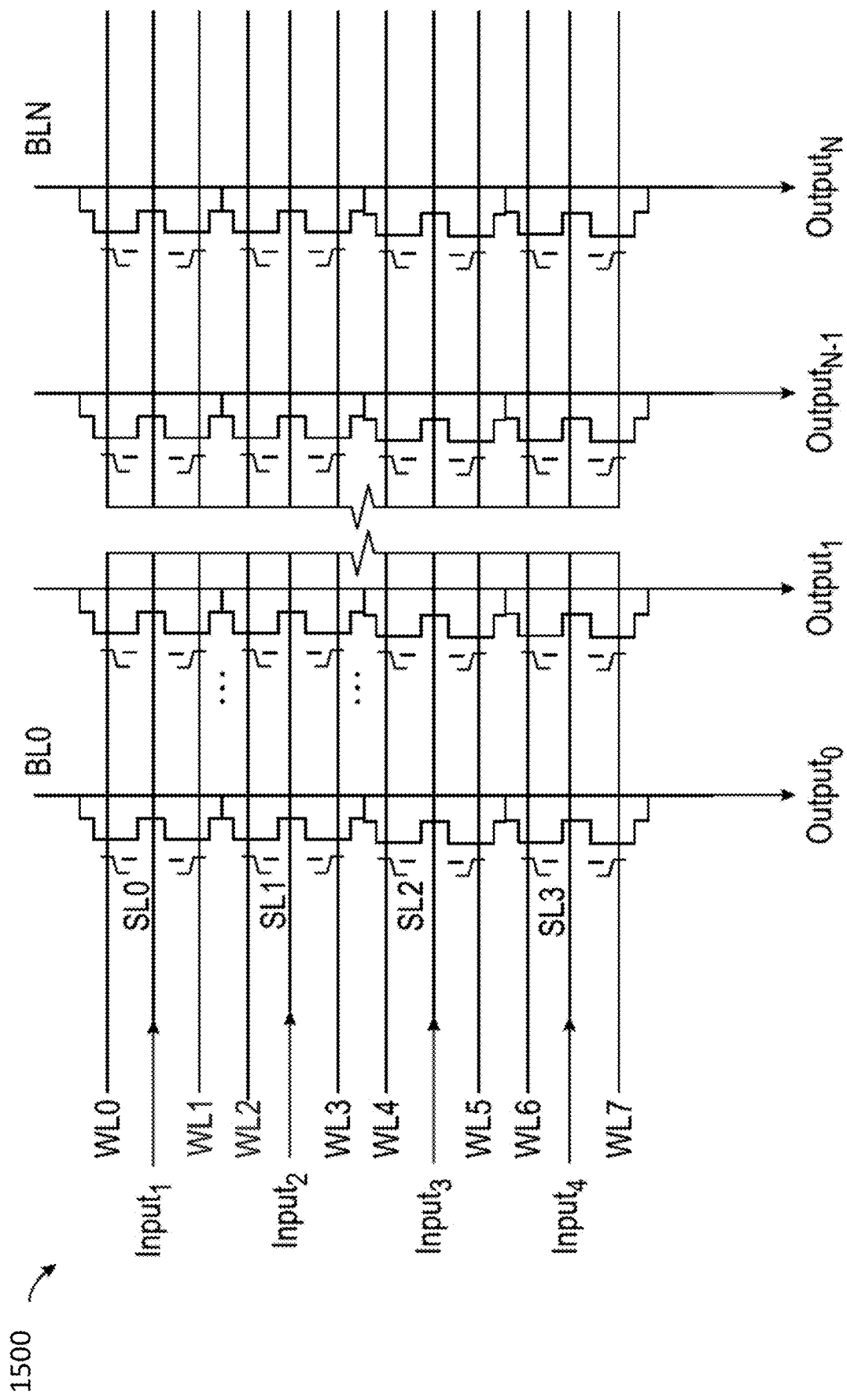
FIG. 15 depicts another example of a VMM array.
Figure 16:
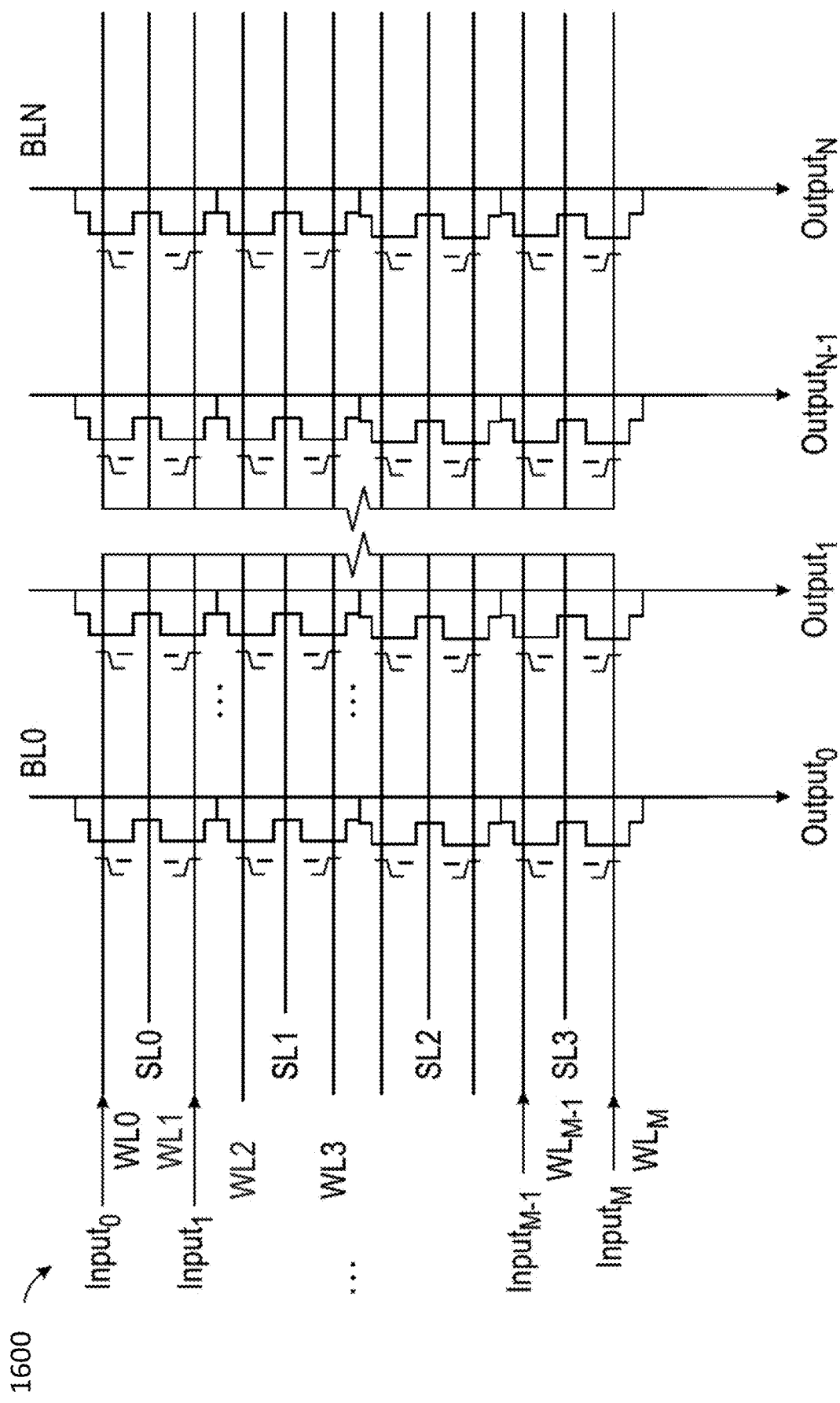
FIG. 16 depicts another example of a VMM array.
Figure 17:
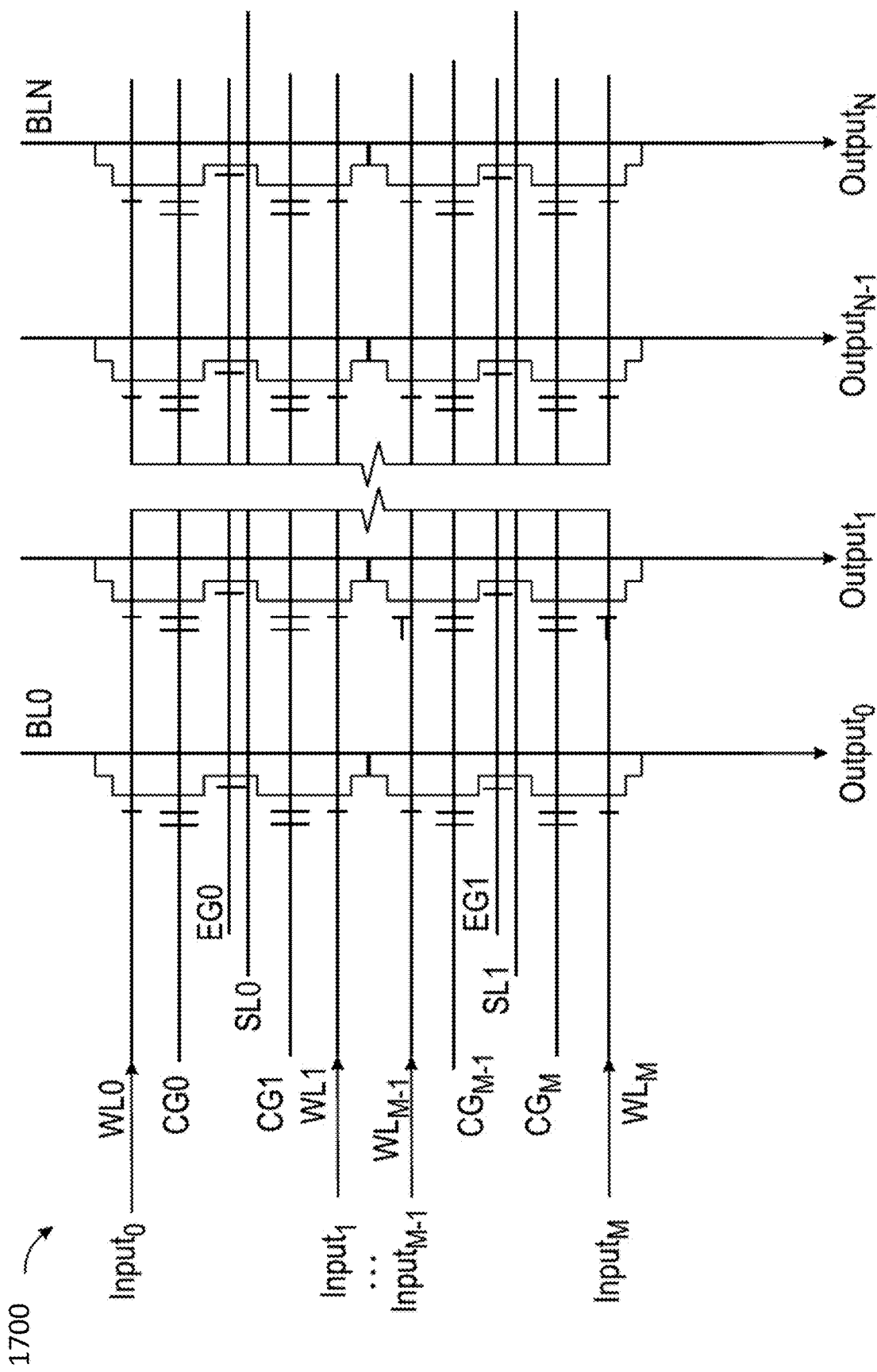
FIG. 17 depicts another example of a VMM array.
Figure 18:
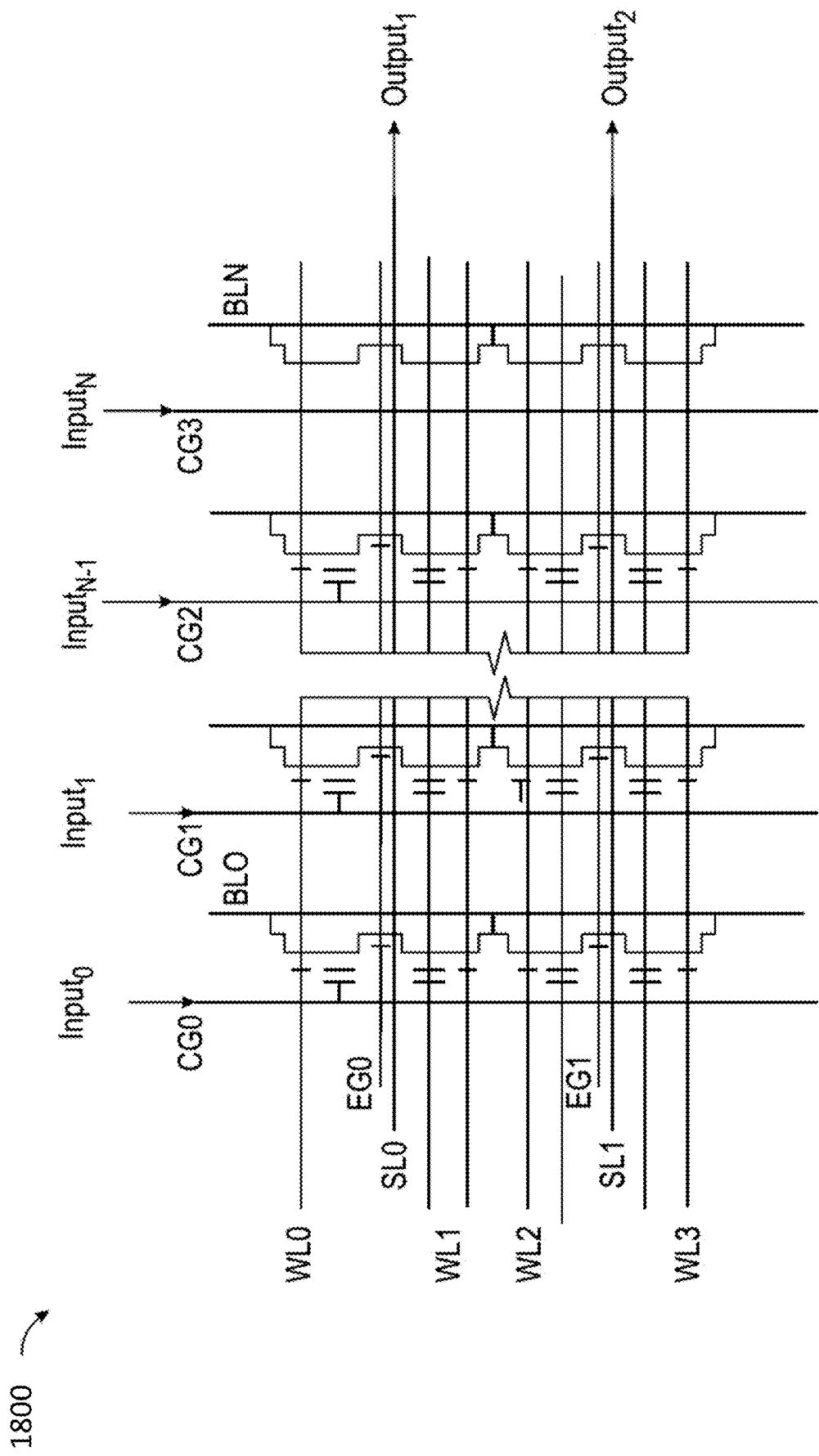
FIG. 18 depicts another example of a VMM array.
Figure 19:
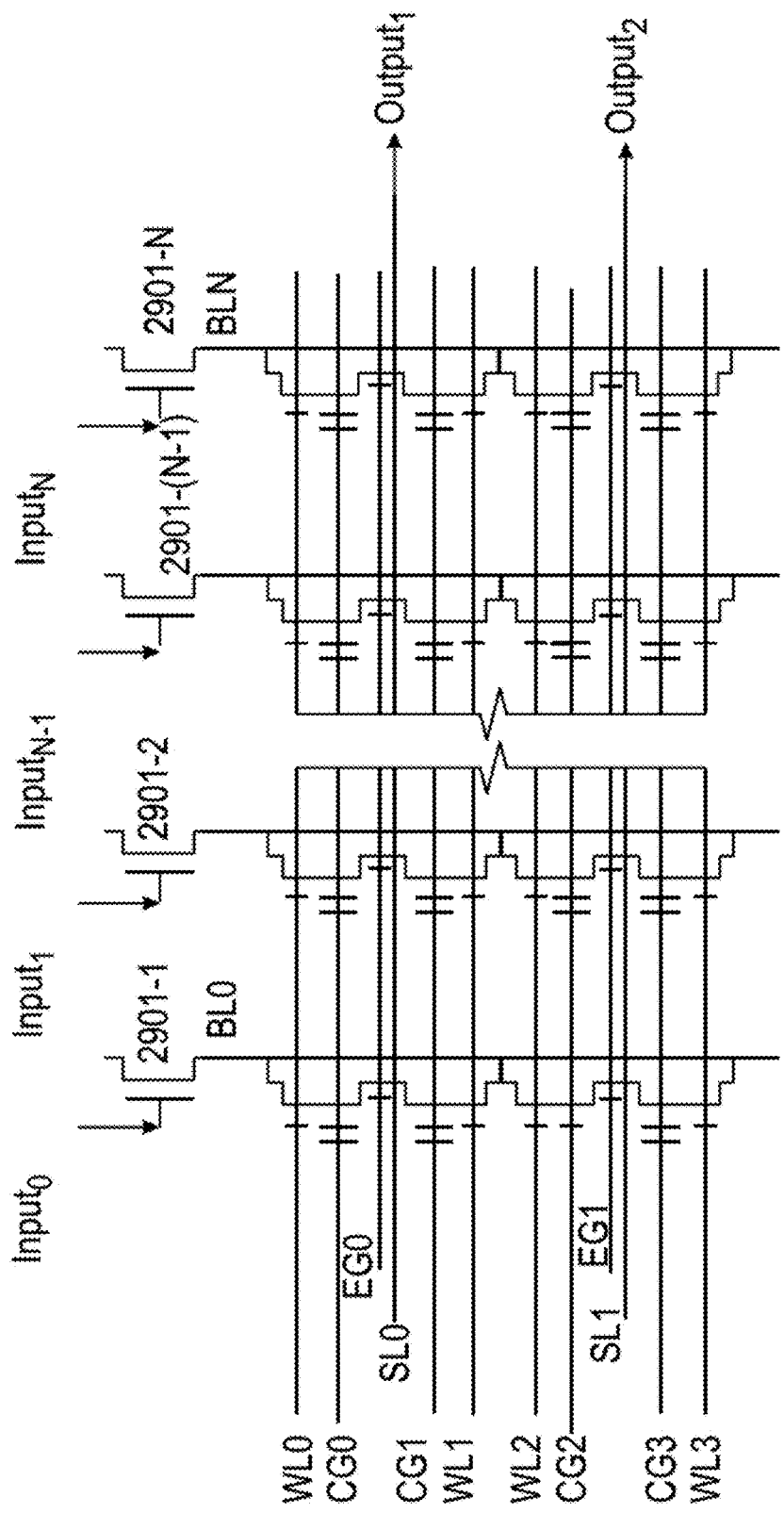
FIG. 19 depicts another example of a VMM system.
Figure 20:
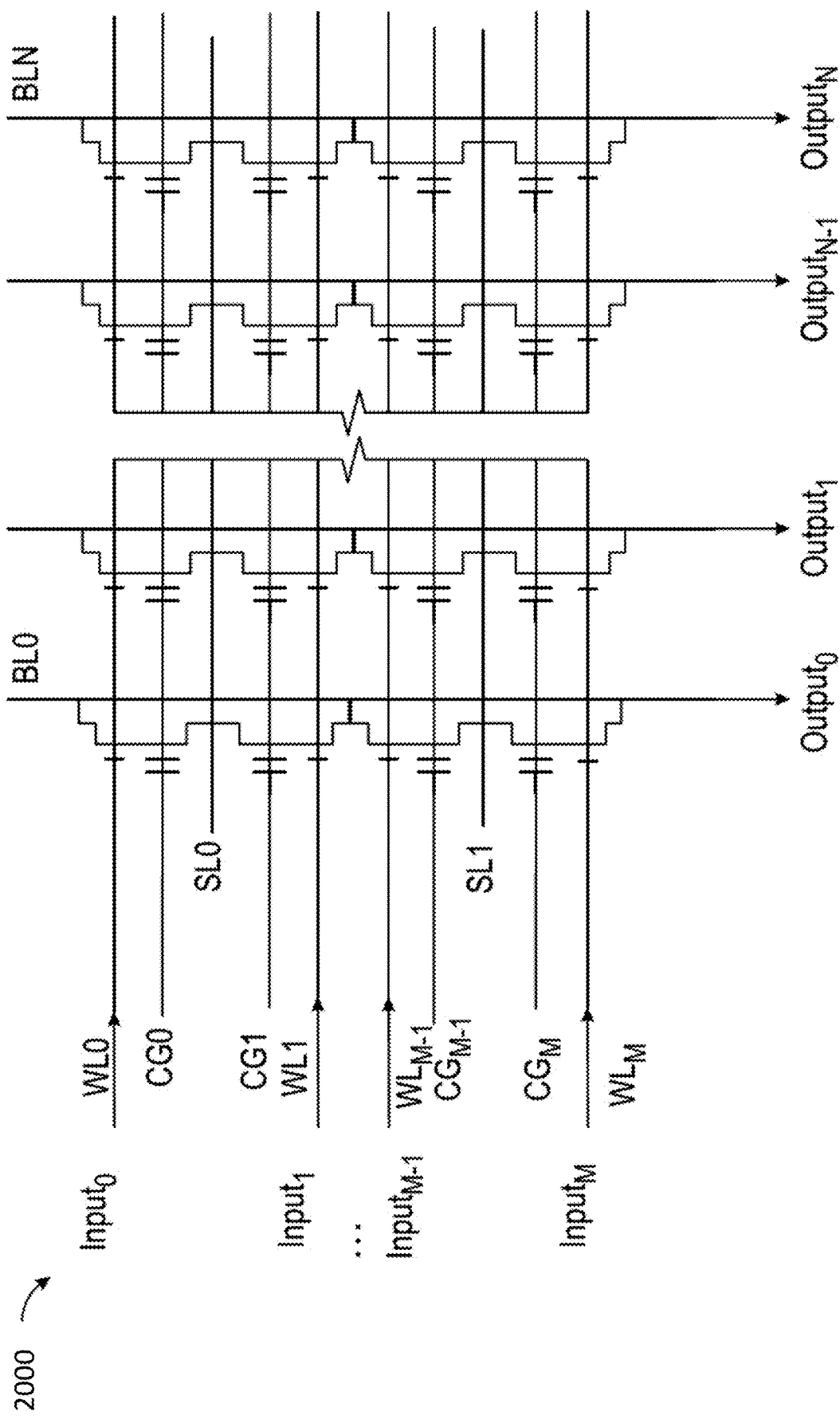
FIG. 20 depicts another example of a VMM array.
Figure 21:
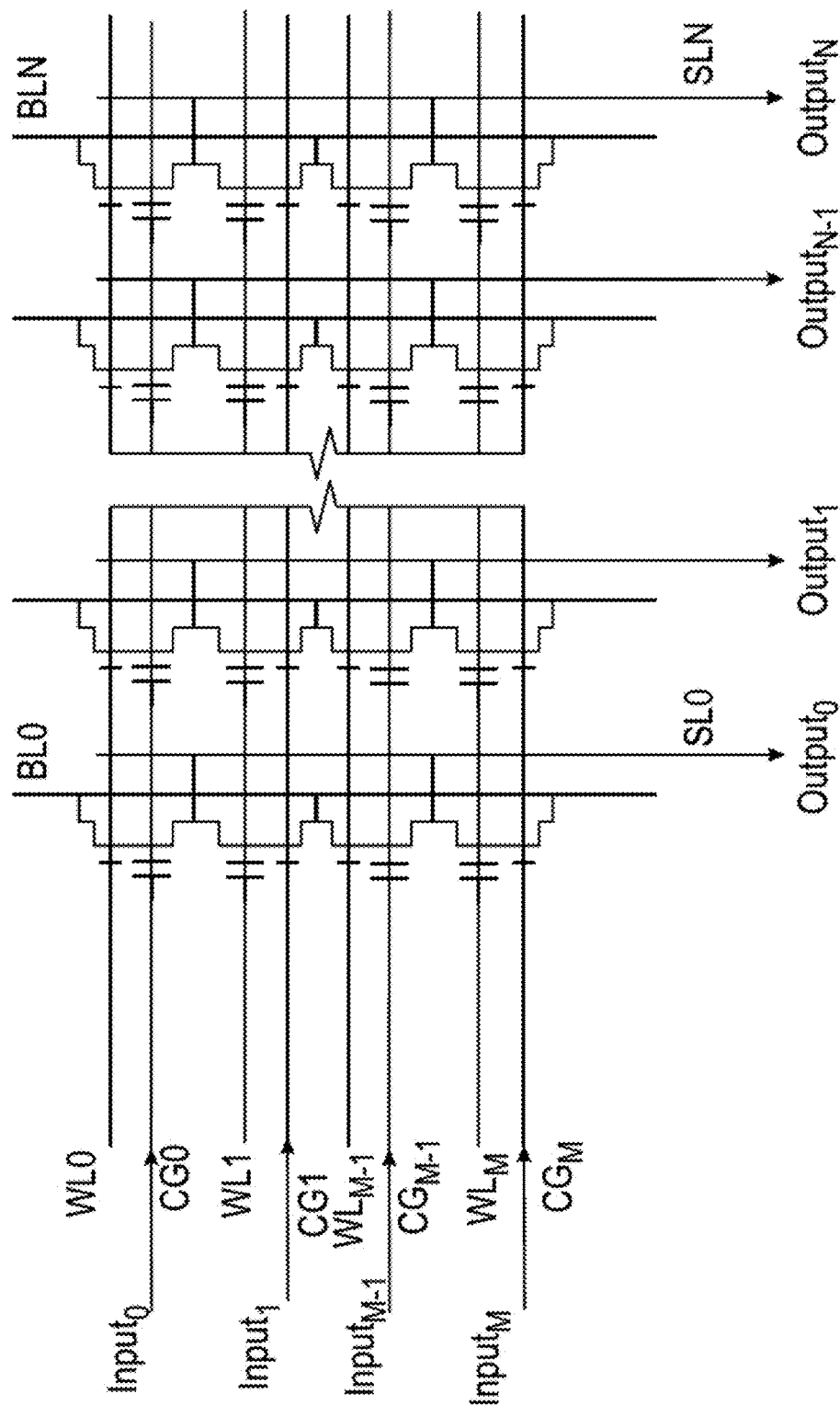
FIG. 21 depicts another example of a VMM array.
Figure 22:
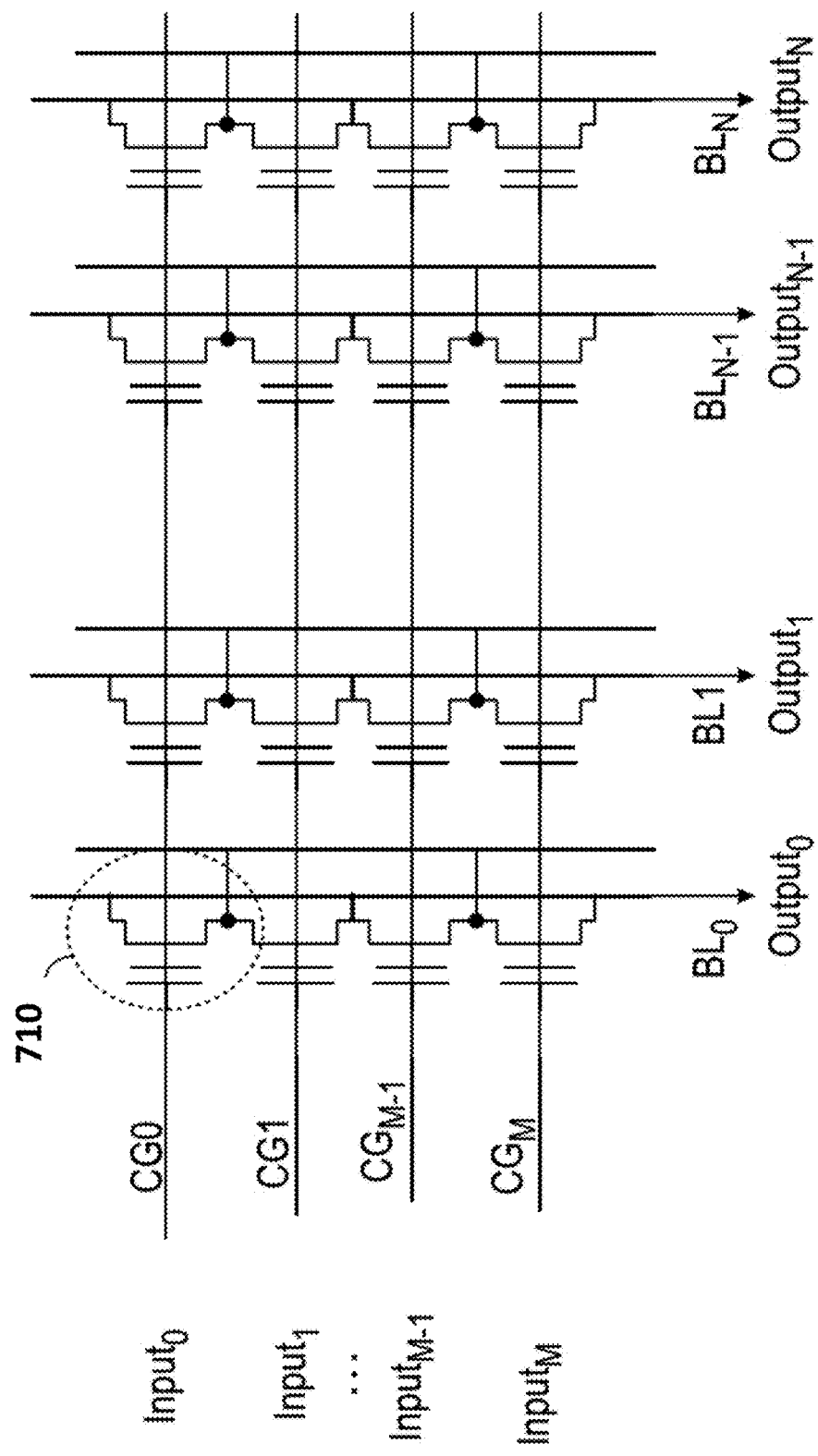
FIG. 22 depicts another example of a VMM array.
Figure 23:
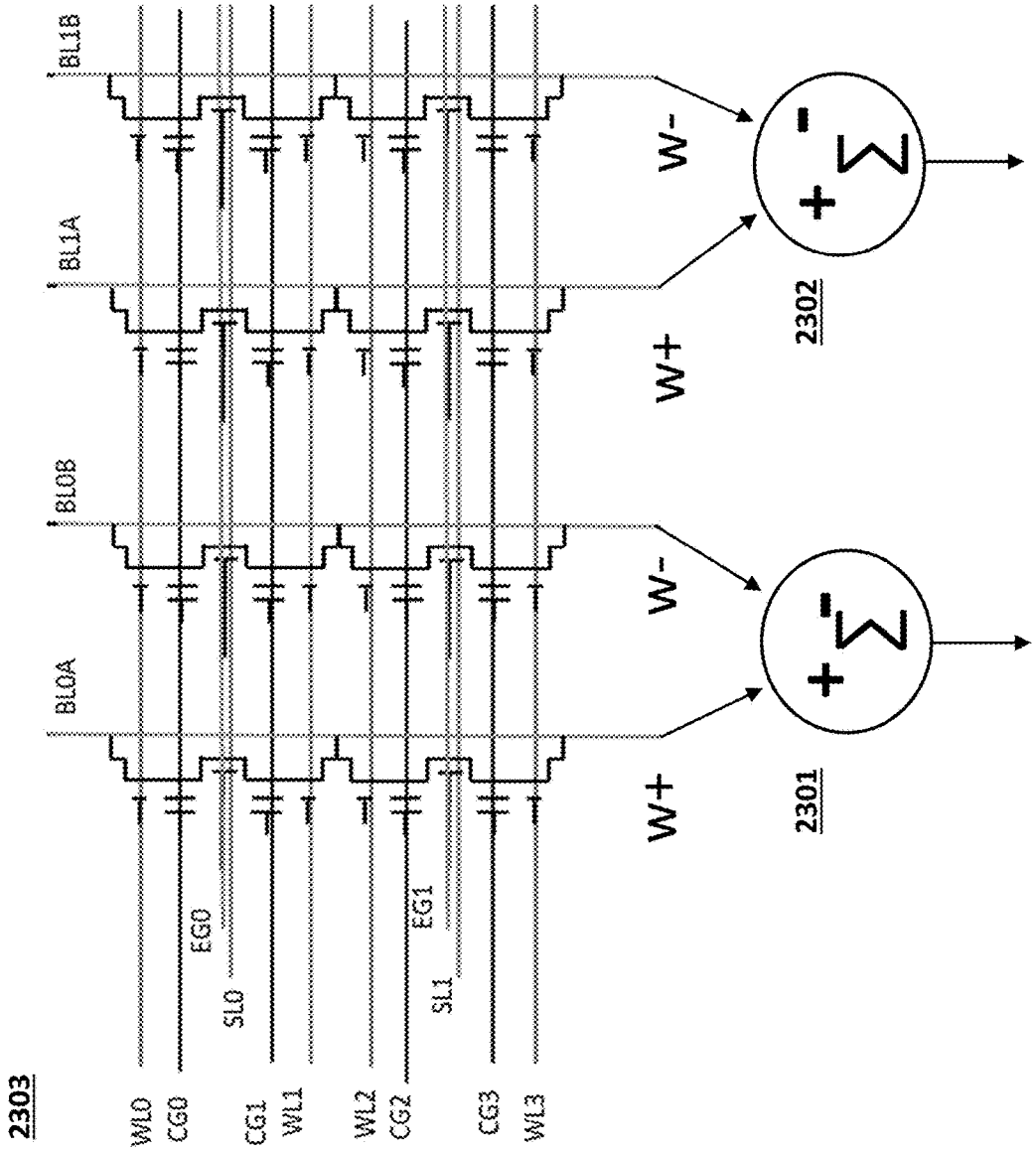
FIG. 23 depicts another example of a VMM system.
Figure 25:
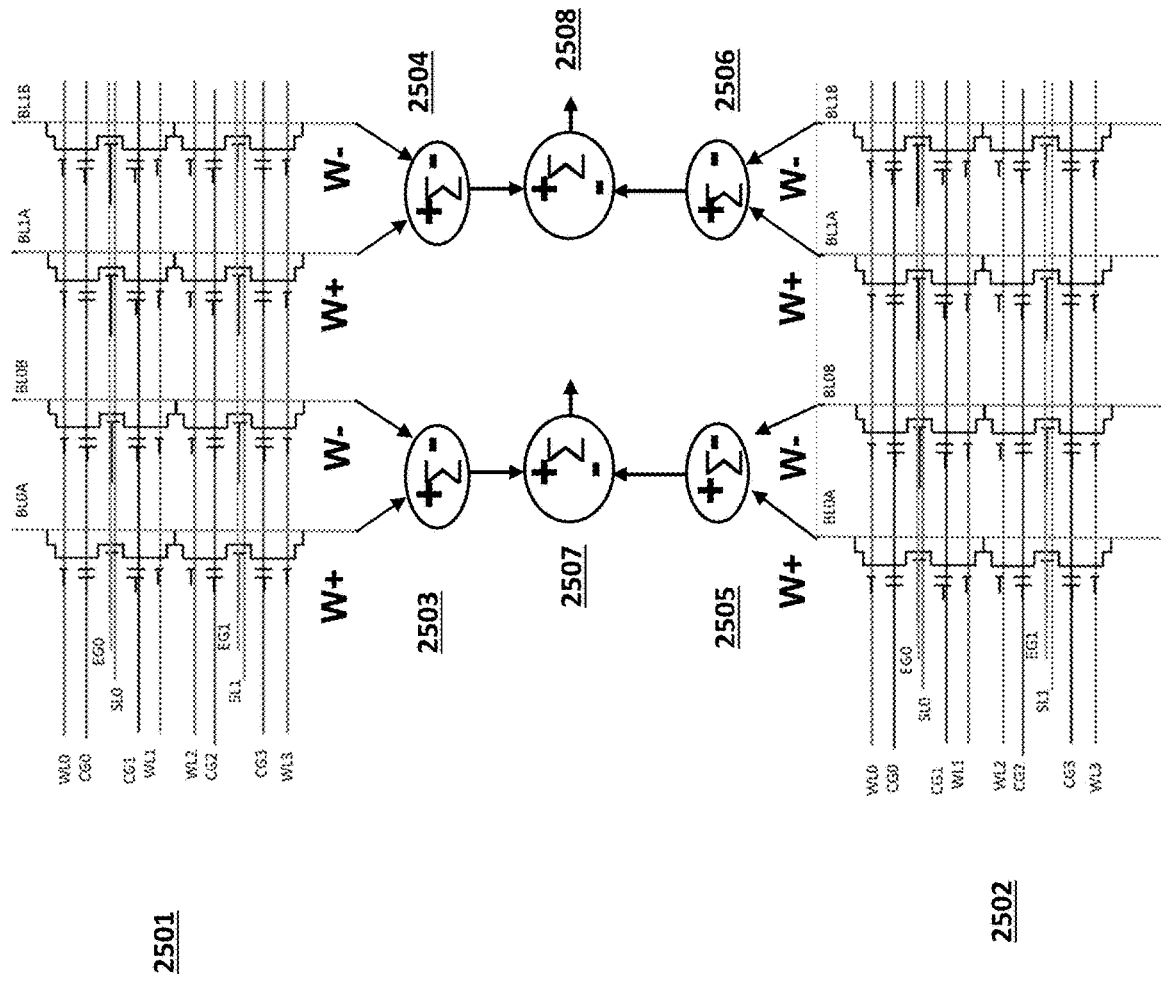
FIG. 25 depicts another example of a VMM system.
Figure 26:
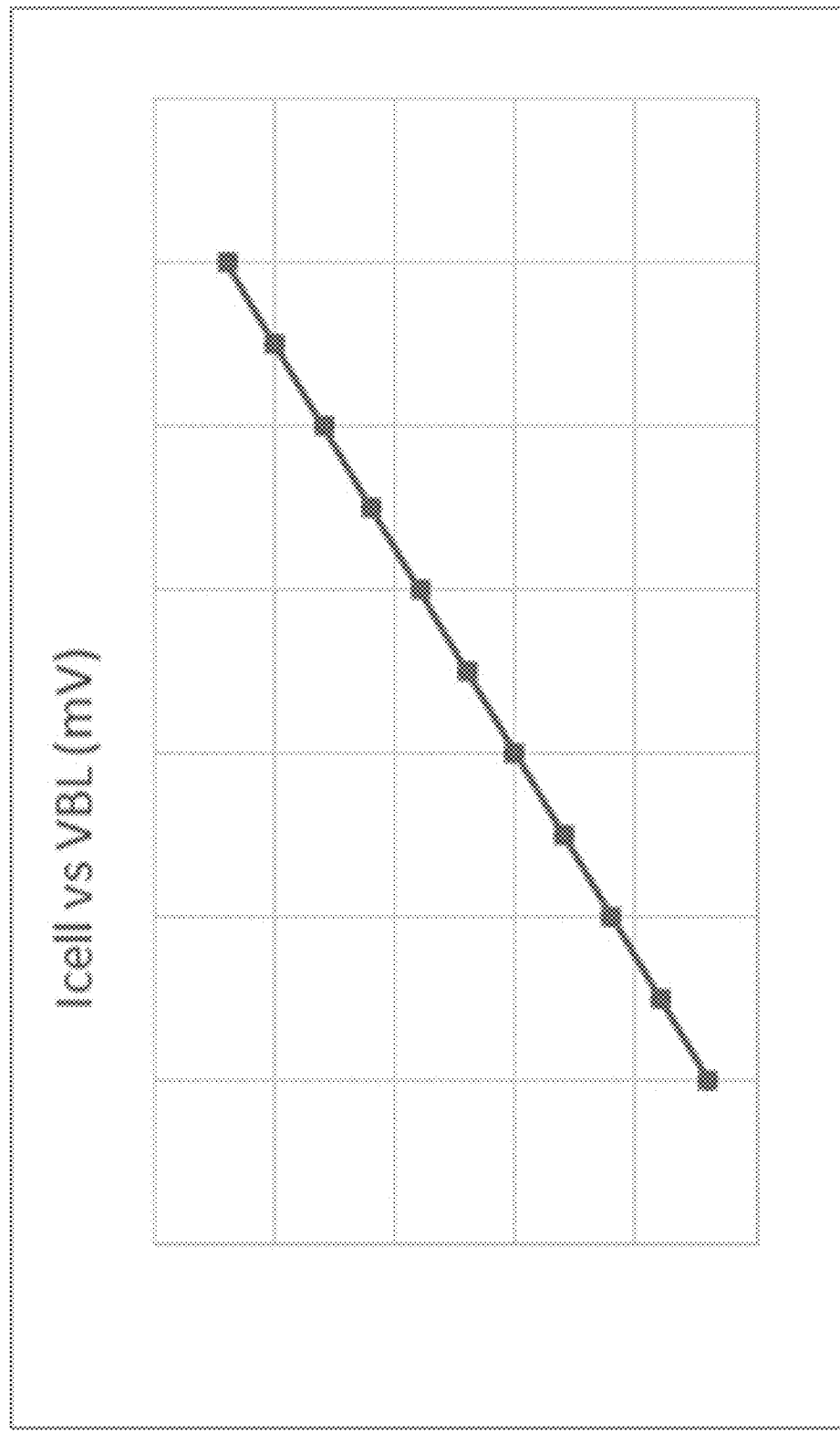
FIG. 26 depicts changes in voltage of a prior art bitline as bitline current changes.

Common mode circuit 3713 is decoupled from bitlines BL+ and BL−, specifically, by NMOS transistors 3711 and 3712 (which may be called bitline regulating transistors or bitline isolation transistors). Common mode circuit 3713 will cause the voltages provided to the inverting and non-inverting inputs of operational amplifier 3714 to be equal. By contrast, without BL+ regulation circuit 3720A, BL− regulation circuit 3720B, and common mode circuit 3713, the voltages on the lines carrying BL+ and BL-would change as the current through each line changes based on the values in the attached memory cells, as shown in the characterization shown in FIG. 26. The use of BL+ regulation circuit 3720A, BL− regulation circuit 3720B, and common mode circuit 3713 results in greater precision in the generation of voltages V+ and V− from the currents BL+ and BL−. It also decreases the asymmetry that would otherwise be present between a verify operation (where one or a handful of memory cells draw current) and a neural read operation (where many, or all, memory cells may draw current).

Figure 38:
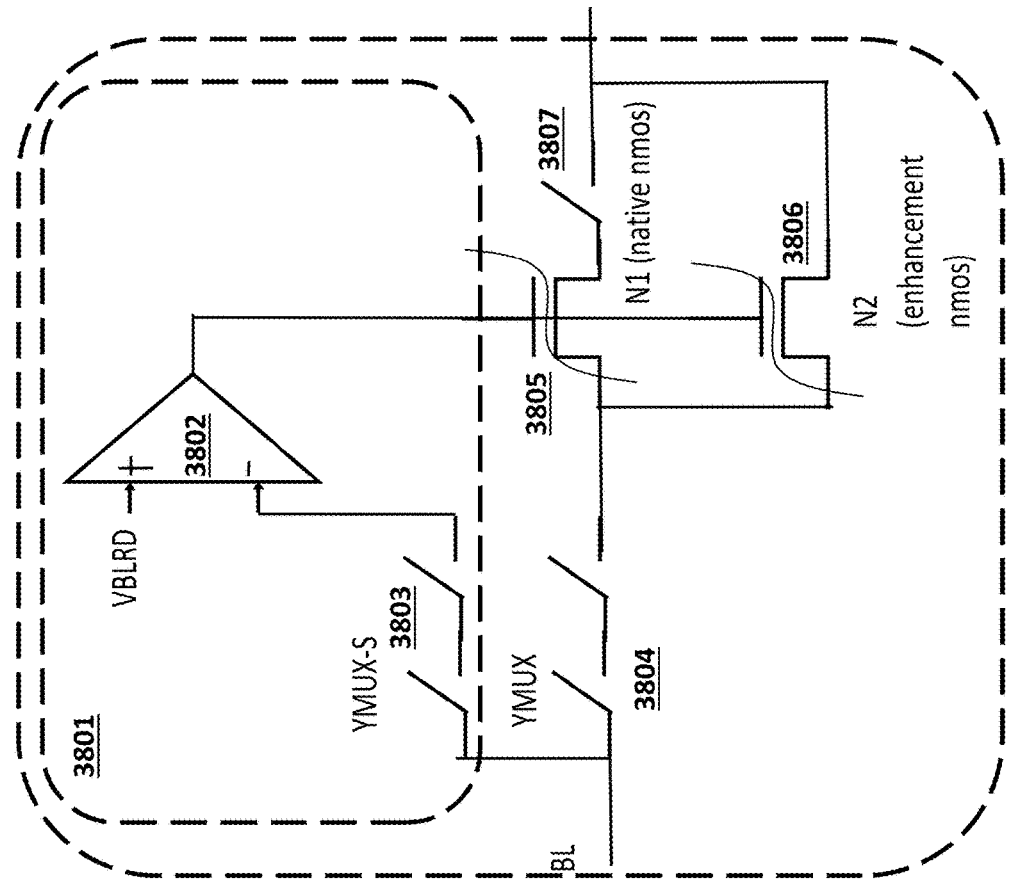
FIG. 38 depicts a bitline regulation circuit.

FIG. 38 depicts BL regulation circuit 3800, which can be used as an alternative to one or more of BL+ regulation circuit 3720A and BL− regulation circuit 3720B in FIG. 37. BL regulation circuit 3800 comprises regulator 3801, switches 3804, native NMOS transistor 3805, enhancement mode NMOS transistor 3806, and switch 3807. Regulator 3801 comprises switches 3803 and operational amplifier 3802 (which is an example of a regulating circuit). Switches 3804 and 3803 are portions of a column multiplexor that selects this particular bitline. Specifically, the column multiplexor selects this bitline by closing switches 3804 and 3803. The native NMOS transistor 3805 and enhancement mode NMOS transistor 3806 are enabled by the output of operation amplifier 3802 and are used for different current ranges on the bitline. For example, enhancement mode NMOS transistor 3806 can be used for low current levels in the nA range such as during a verify operation to limit the leakage, and the native NMOS transistor 3805 can be used for high current level in the uA range such as during a neural read operation (where many rows in the VMM are enabled).

Figure 39:
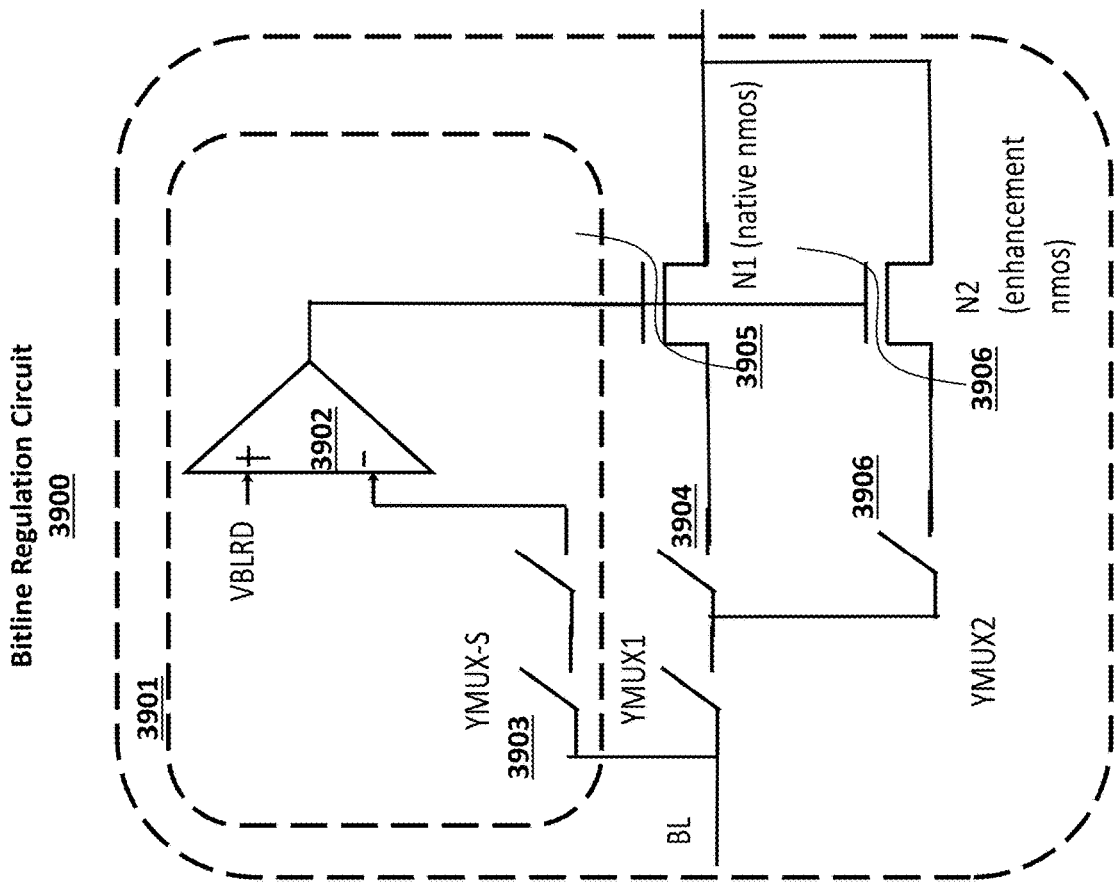
FIG. 39 depicts a bitline regulation circuit.

FIG. 39 depicts BL regulation circuit 3900, which can be used as an alternative to one or more of BL+ regulation circuit 3720A and BL− regulation circuit 3970B in FIG. 37. BL regulation circuit 3900 comprises regulator 3901, switches 3904, native NMOS transistor 3905, enhancement mode NMOS transistor 3906, and switch 3907. Regulator 3901 comprises switches 3903 and operational amplifier 3902 (which is an example of a regulating circuit). Switches 3904 and 3903 are portions of a column multiplexor that selects this particular bitline. Specifically, the column multiplexor selects this bitline by closing switches 3904 and 3903. The native NMOS transistor 3905 and enhancement mode NMOS transistor 3906 are enabled by the output of operation amplifier 3902 and are used for different current ranges on the bitline. For example, enhancement mode NMOS transistor 3906 can be used for low current levels in the nA range such as during a verify operation to limit the leakage, and the native NMOS transistor 3905 can be used for high current level in the uA range such as during a neural read operation (where many rows in the VMM are enabled).

Figure 40:
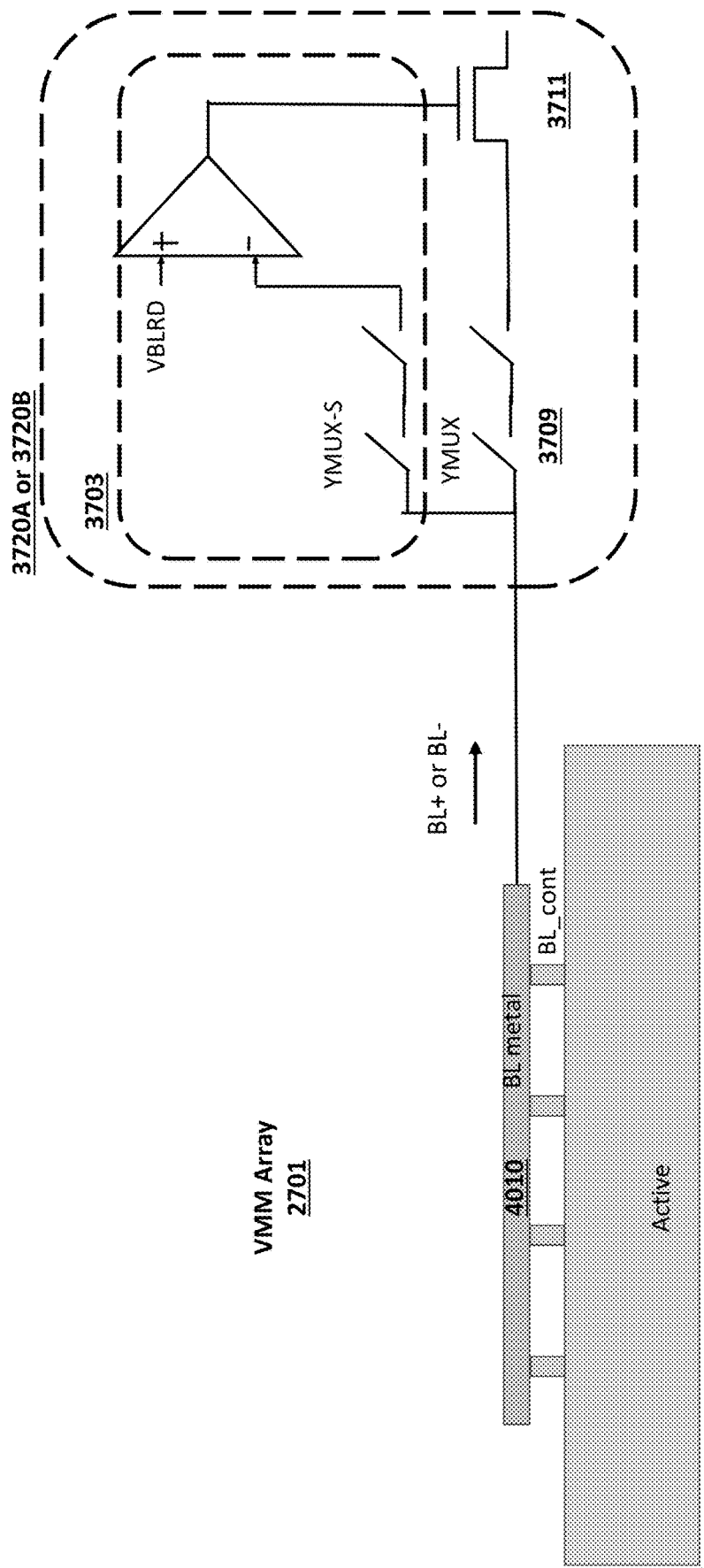
FIG. 40 depicts a bitline metal layer coupled to a current-to-voltage converter.

FIG. 40 depicts details regarding how the previous examples connect to bitlines in VMM array 2701. Here, a bitline metal layer 4010 in VMM array 2701 provides either BL+ or BL− to regulator 3703, switches 3709 and NMOS transistor 3711 shown in FIG. 37.

Figure 41:
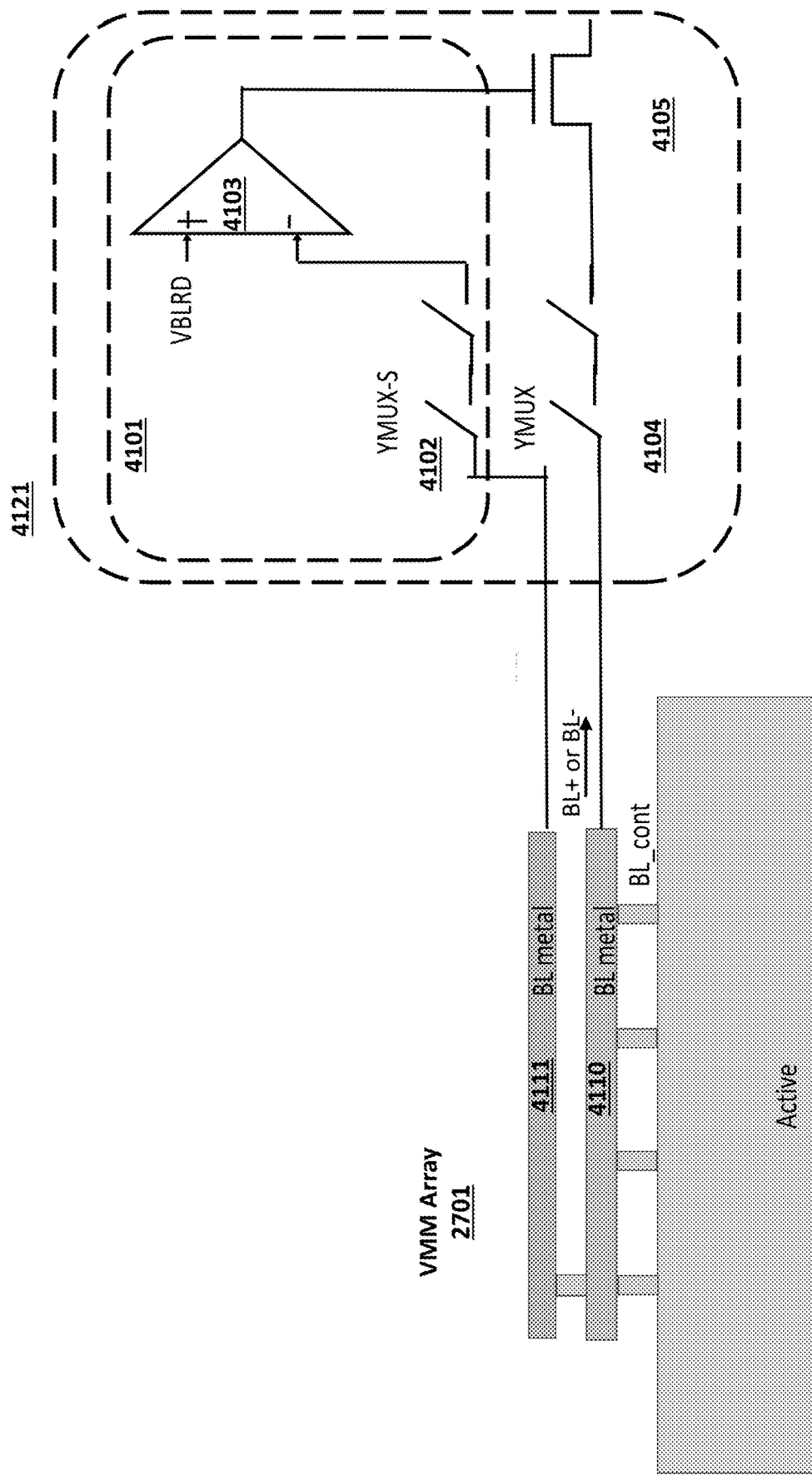
FIG. 41 depicts bitline metal layers coupled to a current-to-voltage converter.

FIG. 41 depicts details regarding a variation on how VMM array 2701 can be connected to the previous examples. Here a bitline sensing metal line 4111 carries no current due to the high input impedance of operational amplifier 4103 (which is an example of a regulating circuit) and is provided to accomplish precise bitline regulation. A bottom bitline metal layer 4110 (which is coupled to top bitline metal layer) provides current BL+ or BL− from the selected cell through switches 4104 to NMOS transistor 4105. BL+ regulator 4121 comprises regulator 4101, switches 4104, and NMOS transistor 4105. Regulator 4101 comprises operational amplifier 4103 and switches 4102. BL+ regulator 4121 can be substituted for BL+ regulator 3720A in FIG. 37. A similar regulator, BL− regulator (not shown), is connected to BL−.

Figure 42:
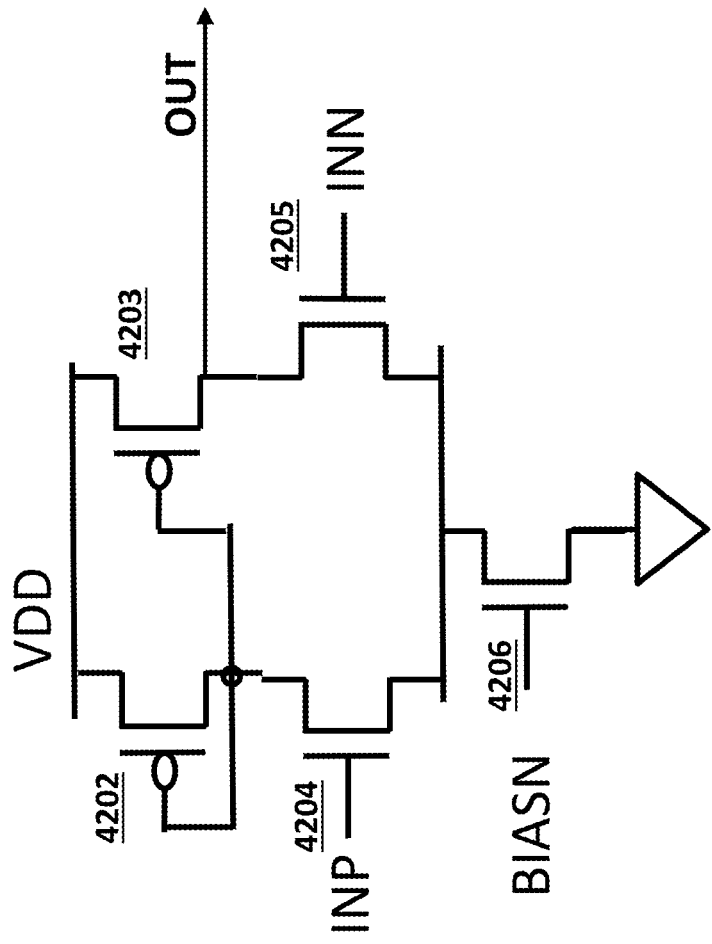
FIG. 42 depicts an operational amplifier.

FIG. 42 discloses operational amplifier 4201 (which is an example of a regulating circuit), which is an example of an operational amplifier that can be used for operational amplifiers 3705, 3707, and 3714 in FIG. 37, operational amplifiers 3802 and 3902 in FIGS. 38 and 39, and operational amplifier 4103 in FIG. 41. Operational amplifier 4201 comprises PMOS transistors 4202 and 4203 and NMOS transistors 4204, 4205, and 4206. The non-inverting input of operational amplifier 4201 is INP, the inverting input is INN, and the output is OUT.

Figure 43:
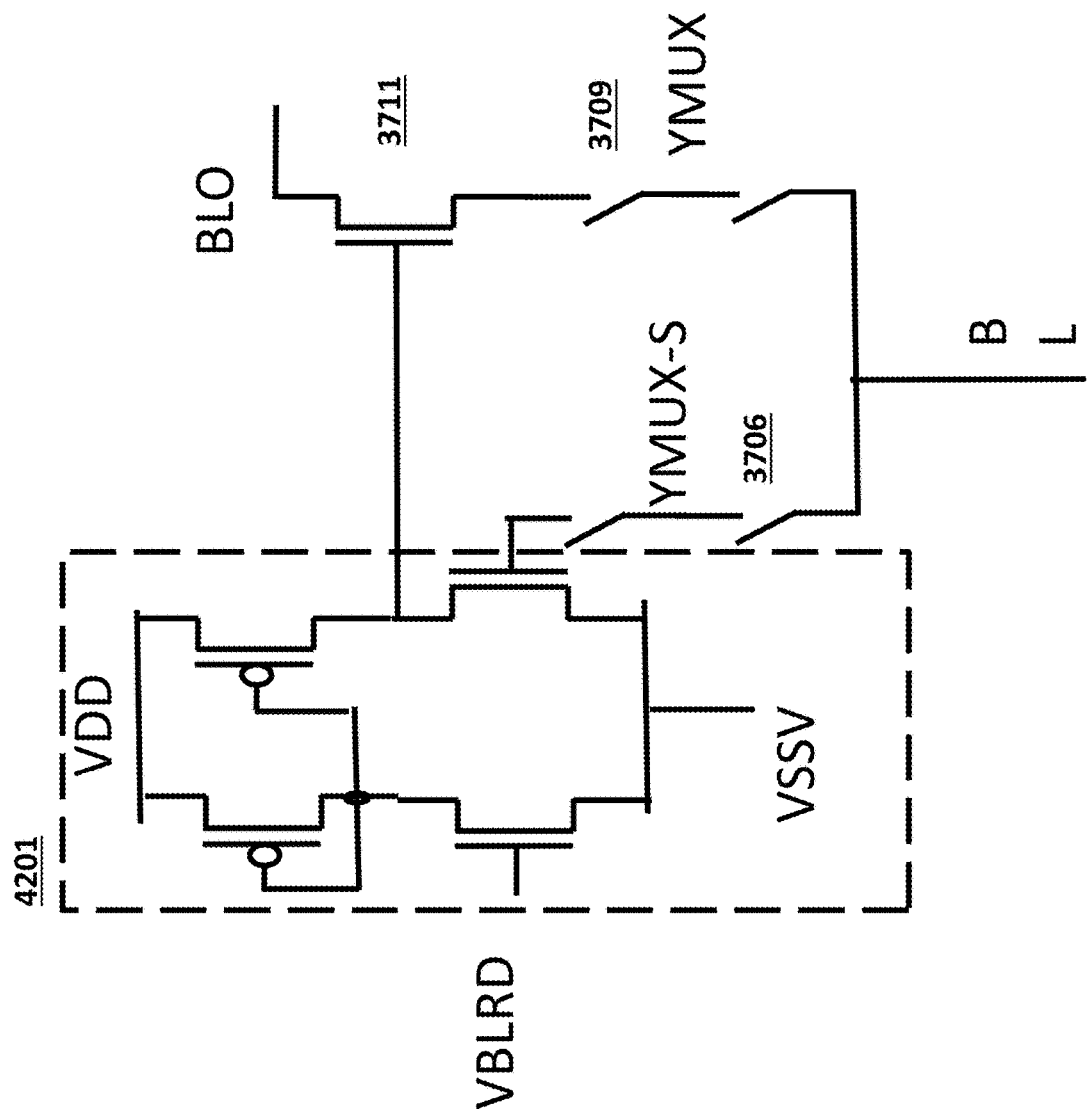
FIG. 43 depicts a portion of a current-to-voltage converter comprising an operational amplifier.

FIG. 43 discloses an example of how operational amplifier 4201 (which is an example of a regulating circuit) can be used in FIG. 37, here shown connecting to switches 3706 (sensing mux) and 3709 (current carrying mux) and transistor 3711 (BL regulating transistor) from FIG. 37.

Figure 44:
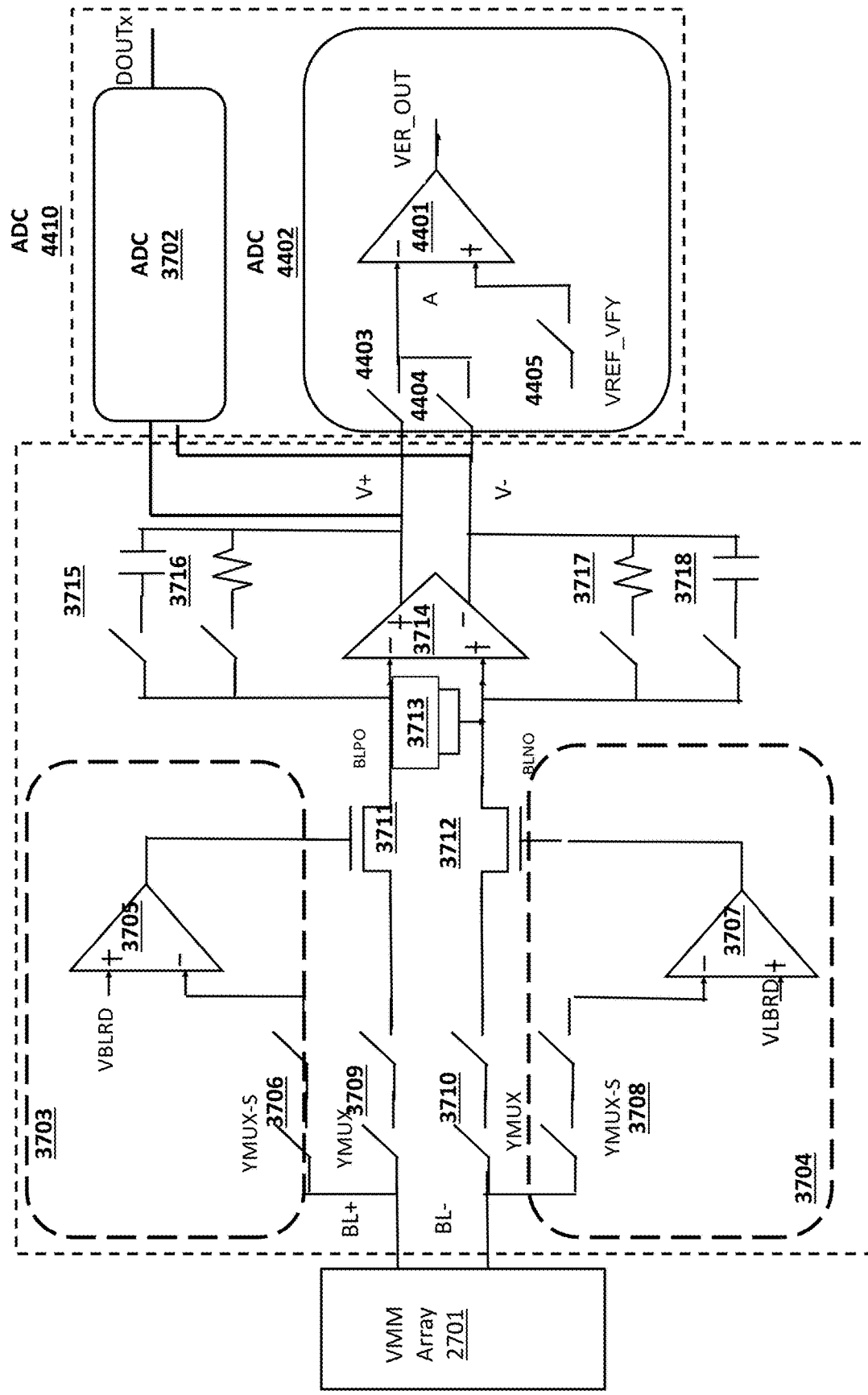
FIG. 44 depicts an output block.

FIG. 44 depicts an example output block for column pair 4400 that can be used during a verify operation or a read neural operation. Only one output block for column pair 4400 is shown, but it is to be understood that an instantiation of output block for column pair 4400 would be used for each pair of columns in VMM array 2701. Output block for column pair 4400 comprises current-to-voltage converter 3701 and analog-to-digital converter (ADC) 4410. ADC 4410 comprises ADC 3702, which was already described with reference to FIG. 37 and will not be described again here, and ADC 4402. ADC 4402 comprises comparator 4401 and switches 4403, 4404, and 4405. ADC 3702 is used during a first mode to perform a read neural operation on both V+ and V−, and ADC 4402 is used during a second mode to perform a verify operation on only one of V+ or V−. Optionally, ADC 3702 and ADC 4402 can share common components, such as comparator 4401, to save die space.

During a read neural operation in a first mode, output block for column pair 4400 receives current from a first bit line, BL+, coupled to a first column of non-volatile memory cells in VMM array 2701 and current from a second bit line, BL−, coupled to a second column of non-volatile memory cells in VMM array 2701 and generates DOUTx, a digital output that comprises a set of output bits, from ADC 3702. Regulator 3703 (a first regulator) provides a first input to regulating circuit 3714 and regulator 3704 (a second regulator) provides a second input to regulating circuit 3714.

During a verify operation of one or more cells coupled to BL+ in a second mode, regulator 3703 (a first regulator) provides a first input to regulating circuit 3714 and switch 4403 is closed and switch 4404 opened so that comparator 4401 compares V+ against VREF_VFY, which is the reference voltage against which verification is performed, with the output VER_OUT from ADC 4402 indicates if the verify operation is successful or not. During a verify operation of one or more cells coupled to BL− in the second mode, regulator 3704 (a second regulator) provides a second input to regulating circuit 3714 and switch 4403 is opened and switch 4404 is closed so that comparator 4401 compares V-against VREF_VFY, with VER_OUT indicating if the verify operation was successful or not.

In this manner, any offset of the regulators 3703 or 3704 are replicated during a verify operation to be the same as in a neural read operation for BL+ and BL− respectively. Various systems and methods for verification are disclosed in U.S. patent application Ser. No. 18/080,545, filed on Dec. 13, 2022, and titled, "Verification Method and System in Artificial Neural Network Array," which is incorporated by reference herein.

Figure 45:
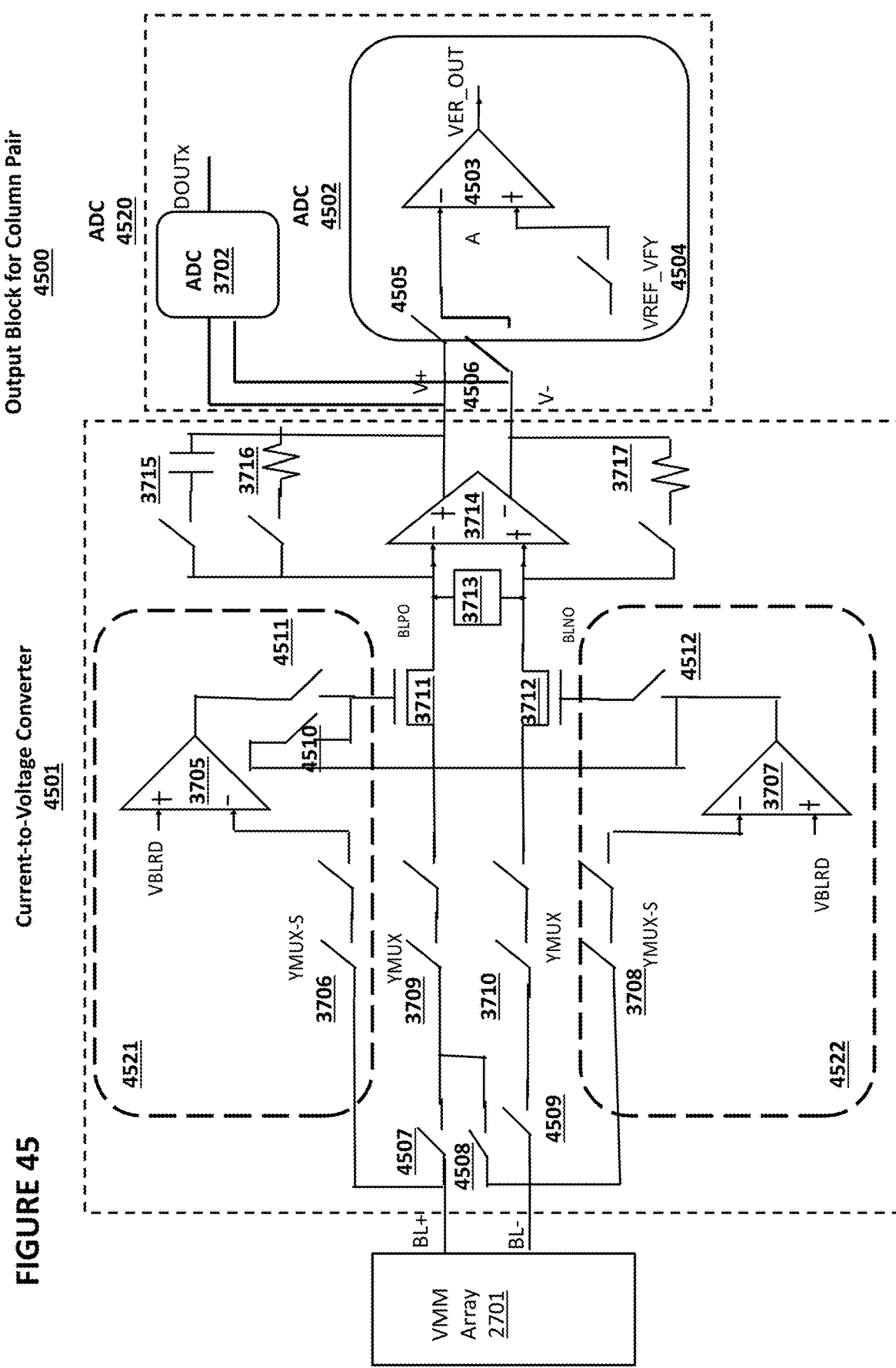
FIG. 45 depicts an output block.

FIG. 45 depicts an example output block for column pair 4500 that is used during a verify operation. Only one output block for column pair 4500 is shown, but it is to be understood that an instantiation of output block for column pair 4500 would be used for each pair of columns in VMM array 2701. Output block for column pair 4500 receives current BL+ (a first current) from one column of non-volatile memory cells in VMM array 2701 and current BL− (a second current) from another column of non-volatile memory cells in VMM array 2701 and generates DOUTx, a digital output that comprises a set of output bits. Output block for column pair 4500 comprises current-to-voltage converter 4501, and ADC 4520. ADC 4520 comprises ADC 3702 (as described with reference to FIG. 37), and ADC 4502. Current-to-voltage converter 4501 comprises many of the same components as current-to-voltage converter 3701. Those components have the same function as in current-to-voltage converter 3701 and will not be describe again for efficiency's sake. Current-to-voltage converter 4501 further comprises switches 4507, 4508, 4509, 4510, 4511, and 4512. ADC 3702 is used during a read neural operation, and ADC 4502 is used during a verify operation. ADC 4502 comprises comparator 4503 and switch 4504. Optionally, ADC 3702 and ADC 4502 could share common components, such as comparator 4503, to save die space. Optionally, ADC 3702 in FIG. 44 or 45 can be used for a verify operation. In this case, the set of output bits, DOUTx, of ADC 3702 is used as a verify target.

During a read neural operation, output block for column pair 4500 in a first mode receives current BL+ from one column and current BL− from another column in VMM array 2701 and generates DOUTx, a digital output that comprises a set of output bits, from ADC 3702. Regulator 4521 (a first regulator) provides a first input to regulating circuit 3714 and regulator 4522 (a second regulator) provides a second input to regulating circuit 3714.

During a verify operation of one or more cells coupled to BL+ in a second mode, regulator 4521 (a first regulator) provides a first input to regulating circuit 3714 and switches 4504, 4505, 4507, 4508, and 4511, and 4512 are closed, and switches 4506, 4509, and 4510 are opened so that comparator 4503 compares V+ against VREF_VFY, which is the reference voltage against which verification is performed, with the output VER_OUT from ADC 4502 indicates if the verify operation is successful or not.

During a verify operation of one or more cells coupled to BL− in the second mode, regulator 4522 (a second regulator) provides a second input to regulating circuit 3714 and switches 4504, 4506, 4508, 4509, 4510, and 4512 are closed and switches 4505, 4507, and 4511 are opened so that comparator 4503 compares V-against VREF_VFY, with VER_OUT indicating if the verify operation was successful or not.

Figure 46:
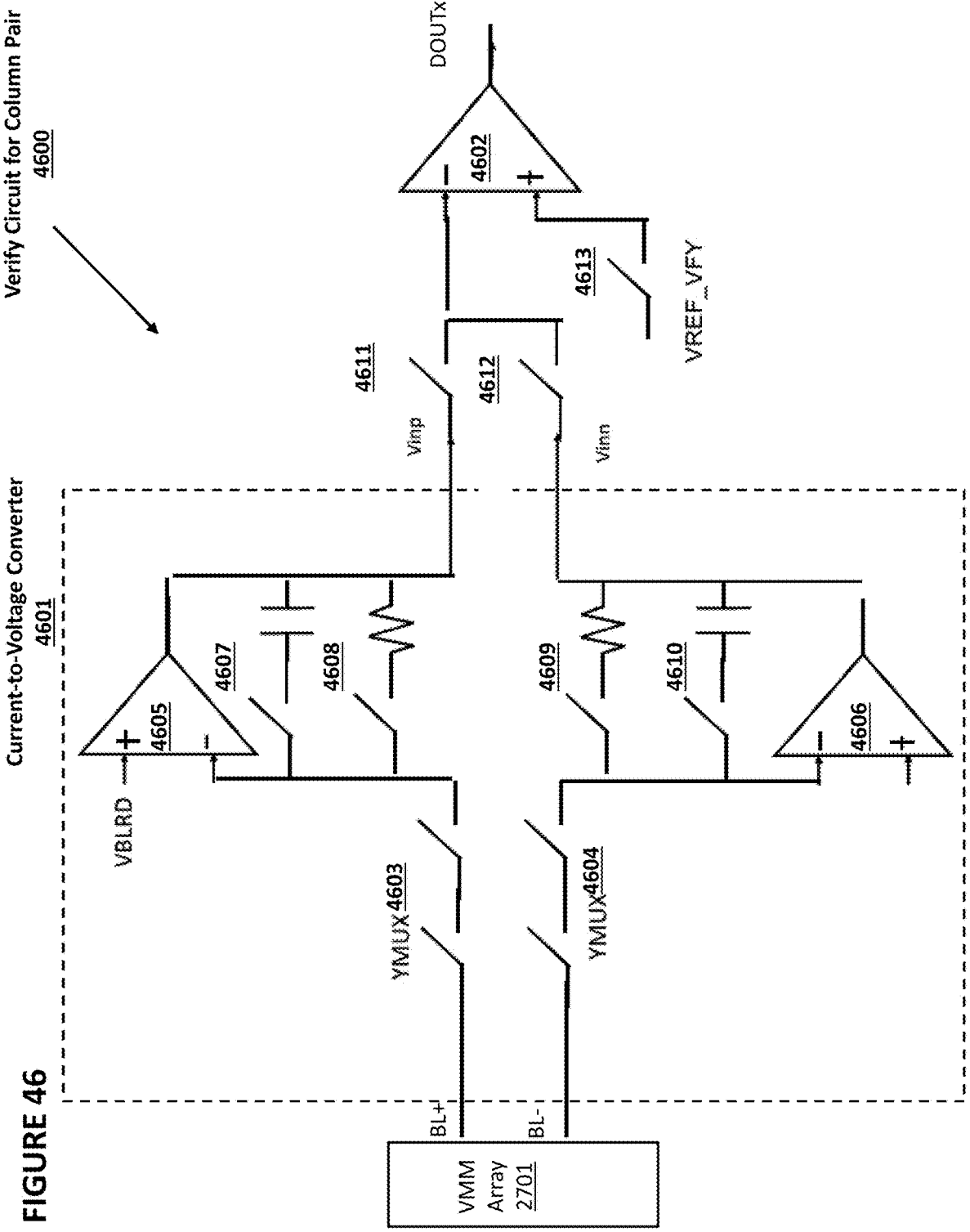
FIG. 46 depicts an output block.

FIG. 46 depicts verify circuit for column pair 4600. Only one verify circuit for column pair 4600 is shown, but it is to be understood that an instantiation of verify circuit for column pair 4600 would be used for each pair of columns in VMM array 2701. Verify circuit for column pair 4600 receives current BL+ (a first current) from a first bitline coupled to a first column of non-volatile memory cells in VMM array 2701 and current BL− (a second current) from a second bitline coupled to a second column of non-volatile memory cells in VMM array 2701 and generates DOUTx, a digital output that comprises a set of output bits.

Verify circuit for column pair 4600 comprises current-to-voltage (ITV) converter 4601 and comparator 4602 (which in this example is a 1-bit analog-to-digital converter). Current-to-voltage converter 4601 comprises first switch set 4603 (comprising one or more switches), second switch set 4604 (comprising one or more switches), operational amplifier 4605, operational amplifier 4606, switched capacitor 4607, switched resistor 4608, switched resistor 4609, and switched capacitor 4610.

Switch sets 4603 and 4604 are portions of a column multiplexor that multiplexes the bitlines from VMM array 2701 into the current-to-voltage converter 4601. Specifically, the column multiplexor selects the bitline providing BL+ by closing the respective switch set 4603 and the column multiplexor selects the bitline providing BL− by closing the respective switch set 4604. Switched capacitors 4607 and 4610 can be variable capacitors or fixed capacitors. Switched resistors 4608 and 4609 can be variable resistors or fixed resistors. Optionally, switched capacitors 4607 and 4610 can be removed. Optionally, switched resistors 4608 and 4609 can be removed. Switched capacitors 4607 and 4610 are enabled (by a pulse width) to convert the current into the voltages Vinp and Vinn such as for low current levels (in which case switched resistors 4608 and 4609 are turned off). Resistors 4608 and 4609 are enabled to convert the current into the voltages Vinp and Vinn such as for high current levels (in which case switched capacitors 4607 and 4610 can be on or off).

Current-to-voltage converter 4601 converts current BL+ into voltage Vinp and converts current BL− into voltage Vinn. VBLRD is a read voltage bias that is applied to the bitline BL+ and BL−, e.g., 0.6V. Initially, the voltage of bitline BL+ and BL− will be lower or higher than VBLRD, which causes the output voltage of operational amplifiers 4905 and 4907 to increase or decrease thereby turning on stronger or weaker NMOS transistors 4911 and 4912, respectively to maintains the voltage at the BL+ or BL− to be same as VBLRD. Switches 4611 and 4612 are closed to apply the voltage Vinp and Vinn, respectively, to the inverting input (a first input) of the comparator 4602. The non-inverting input (a second input or a reference input) of the comparator 4602 receives a reference voltage VREF_VFY, which is the intended voltage against which the voltage Vinp or Vinn is verified, when switch 4613 is closed. The output of the comparator 4602 is a digital output DOUTx that comprises a set of output bits, which during a verify operation will be a first value (e.g., "1") when the verify operation is successful and a second value (e.g., "0") when the verify operation is not successful (meaning that the cell or cells coupled to BL+ or BL−, depending on which switch 4611 or 4612 is closed, may need to undergo tuning).

Figure 47:
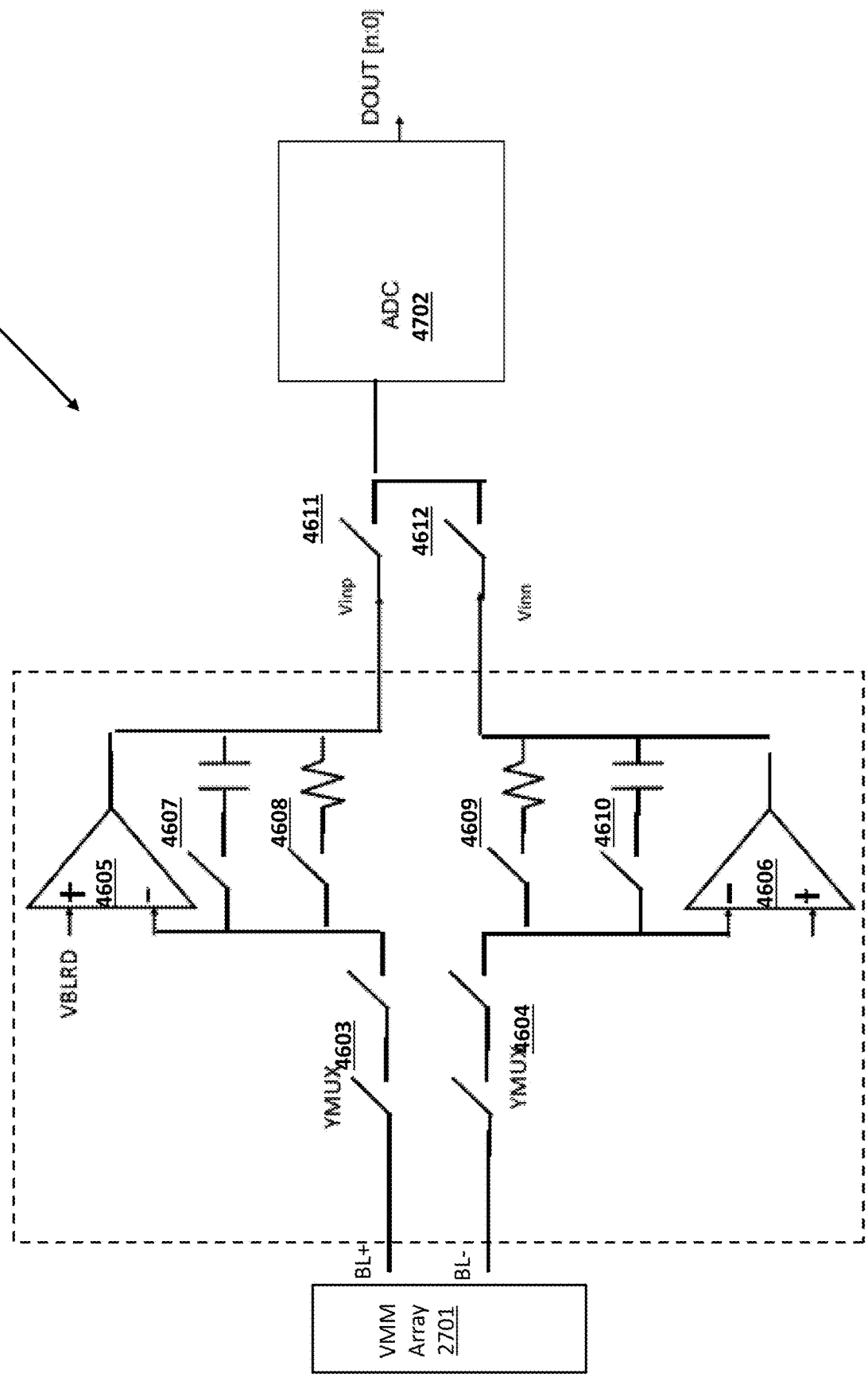
FIG. 47 depicts an output block.

FIG. 47 depicts output block for column pair 4700. Only one output block for column pair 4700 is shown, but it is to be understood that an instantiation of output block for column pair 4700 would be used for each respective pair of columns in VMM array 2701. Output block for column pair 4700 receives current BL+ from a first bitline coupled to a first column of non-volatile memory cells in VMM array 2701 and current BL− from a second bitline coupled to a second column of non-volatile memory cells in VMM array 2701 and generates DOUTx, a digital output that comprises a set of output bits.

Output block for column pair 4700 comprises current-to-voltage (ITV) converter 4601 and analog-to-digital converter (ADC) 4702. Current-to-voltage converter 4601 is the same as current-to-voltage converter 4601 in FIG. 46 and contains the same components. Current-to-voltage converter 4601 converts current BL+ into voltage Vinp (a first voltage) and converts current BL− into voltage Vinn (a second voltage). Switches 4611 and 4612 are closed to apply Vinp and Vinn, respectively to analog-to-digital converter (ADC) 4702, which converts the analog voltage into a digital signal DOUT[n:0]. ADC 4702 can be an SAR ADC (Successive Approximation Register ADC), Sigma Delta ADC, Slope ADC, or Algorithmic (aka Cyclic) ADC, without limitation.

Figure 48:
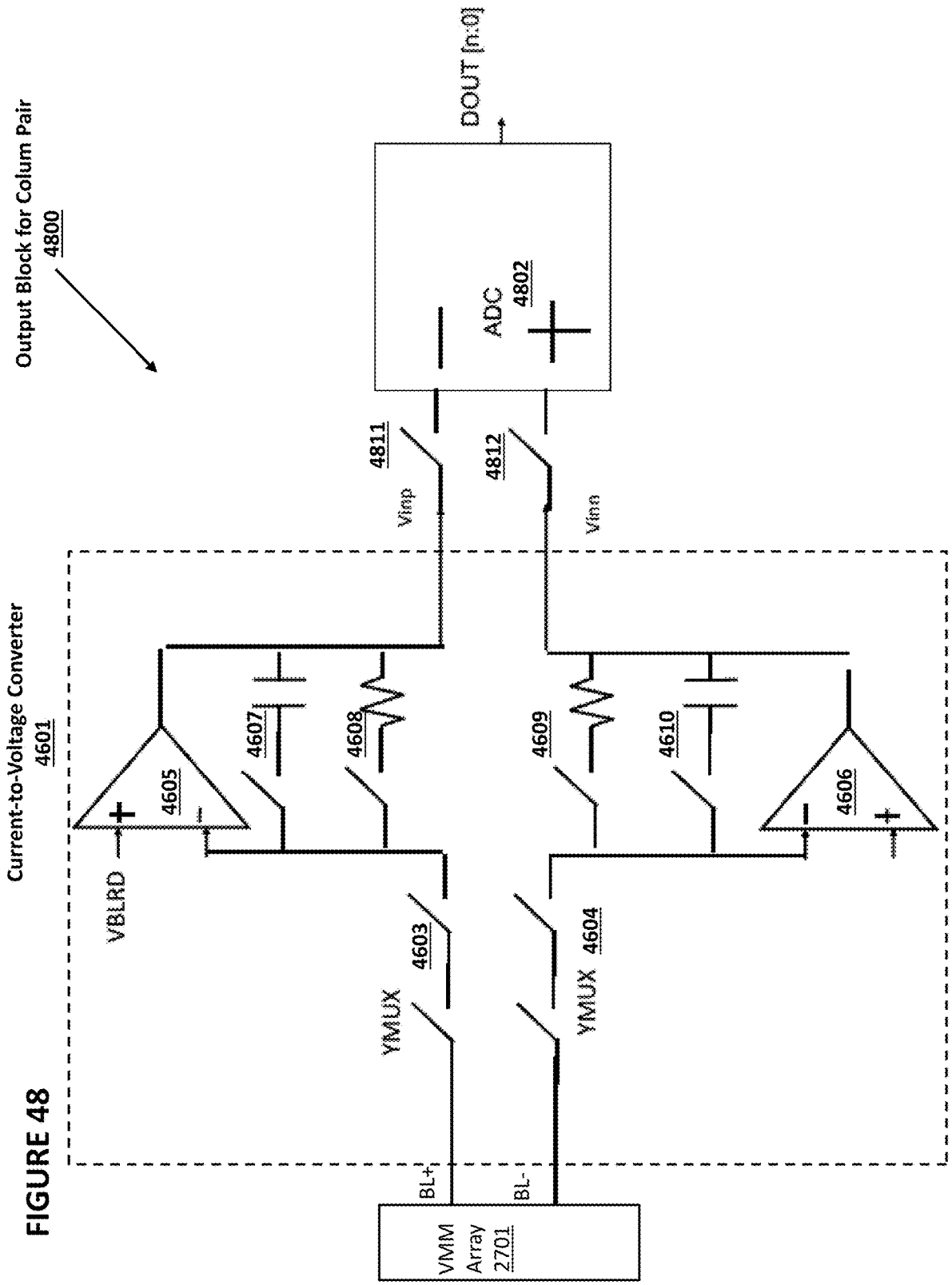
FIG. 48 depicts an output block.

FIG. 48 depicts output block for column pair 4800. Only one output block for column pair 4800 is shown, but it is to be understood that an instantiation of output block for column pair 4800 would be used for each respective pair of columns in VMM array 2701. Output block for column pair 4800 receives current BL+ from a first bitline coupled to one column of non-volatile memory cells in VMM array 2701 and current BL− from a second bitline coupled to another column of memory cells in VMM array 2701 and generates DOUTx, a digital output that comprises a set of output bits.

Output block for column pair 4800 comprises current-to-voltage (ITV) converter 4601 and differential analog-to-digital converter (ADC) 4802. Current-to-voltage converter 4601 is the same as current-to-voltage converter 4601 in FIG. 46 and contains the same components. Current-to-voltage converter 4601 converts current BL+ into voltage Vinp (a first voltage) and converts current BL− into voltage Vinn (a second voltage). Switches 4811 and 4812 are closed to apply Vinp and Vinn to the inverting input and the non-inverting input, respectively, of differential analog-to-digital converter (ADC) 4802, which converts the analog voltages into a digital signal DOUT[n:0]. ADC 4802 can be an SAR ADC (Successive Approximation Register ADC), Slope ADC, Sigma Delta ADC, or Algorithmic (aka Cyclic) ADC, without limitation.

Figure 49:
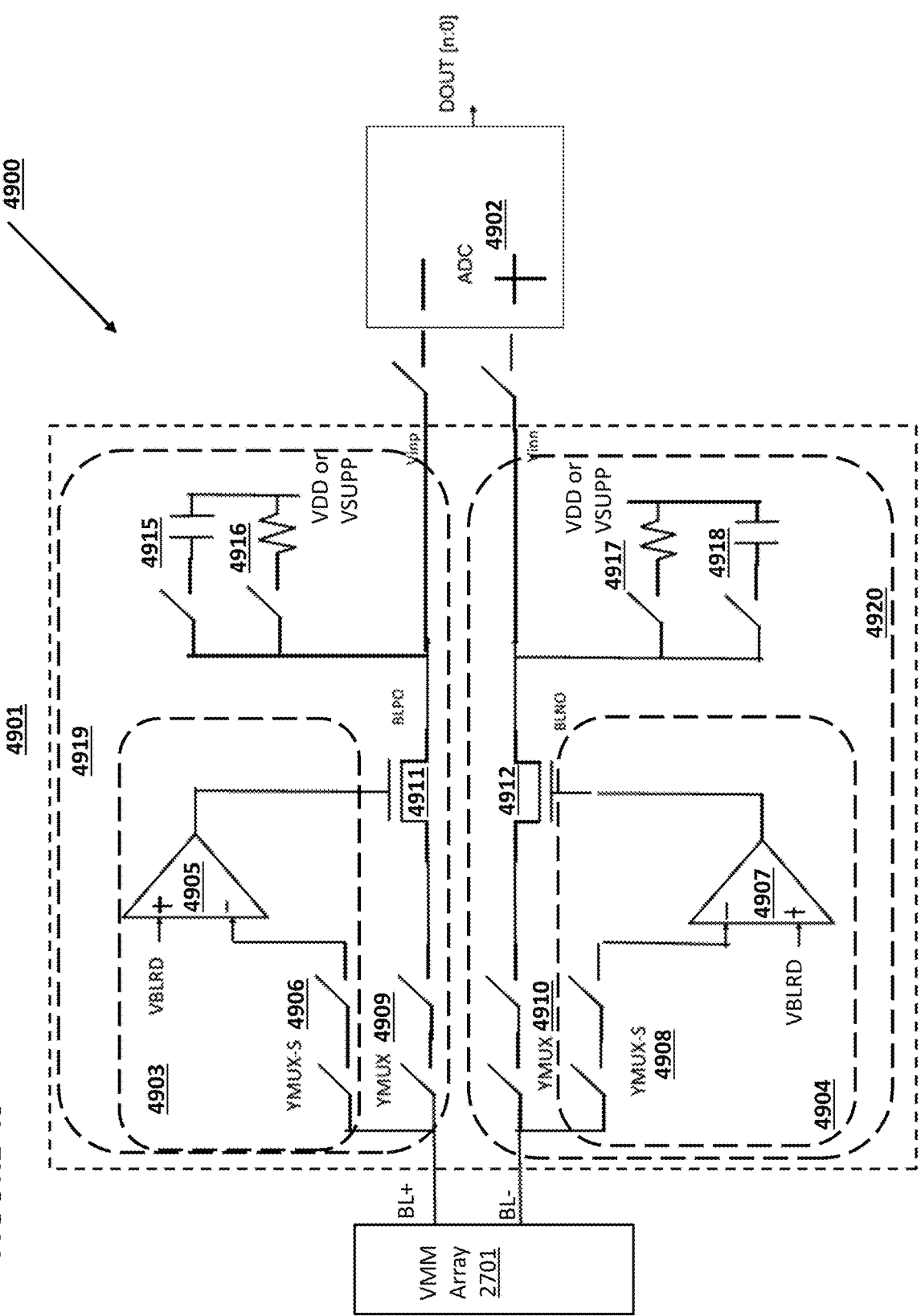
FIG. 49 depicts an output block.

FIG. 49 depicts output block for column pair 4900. Only one output block for column pair 4900 is shown, but it is to be understood that an instantiation of output block for column pair 4900 would be used for each respective pair of columns in VMM array 2701. Output block for column pair 4900 receives current BL+ from a first bitline coupled to a first column of non-volatile memory cells in VMM array 2701 and current BL− from a second bitline coupled to a second column of non-volatile memory cells in VMM array 2701 and generates DOUT[n:0], a digital output.

Output block for column pair 4900 comprises current-to-voltage (ITV) converter 4901 and a differential analog-to-digital converter (ADC) 4902. ADC 4902 can be an SAR ADC (Successive Approximation Register ADC), Slope ADC, Sigma Delta ADC, or Algorithmic (aka Cyclic) ADC, without limitation.

Current-to-voltage converter 4901 comprises BL+ regulation circuit 4919 and BL-regulation circuit 4920. Current-to-voltage converter 4901 converts current BL+ into voltage Vinp (a first voltage) and converts current BL− into voltage Vinn (a second voltage). BL+ regulation circuit 4919 comprises regulator 4903 (which can be referred to as a forcing regulator or a current-carrying regulator), first switch set 4909 (comprising one or more switches), regulating (cascoding) NMOS transistor 4911, switched capacitor 4915 and switched resistor 4916. BL− regulation circuit 4920 comprises regulator 4904, (which can be referred to as a forcing regulator or a current-carrying regulator), second switch set 4910 (comprising one or more switches), regulating (cascoding) NMOS transistor 4912, switched resistor 4917, and switched capacitor 4918.

Regulator 4903 comprises third switch set 4906 (comprising one or more switches) and operational amplifier 4905. Regulator 4904 comprises fourth switch set 4908 (comprising one or more switches) and operational amplifier 4907.

For the circuit path connecting bitline BL+ (a first bitline), the switch sets 4909 and 4906 are portions of a column multiplexor that multiplexes the respective bitlines from VMM array 2701 into the current-to-voltage converter 4901. Specifically, the column multiplexor selects the respective bitline BL+ by closing switch sets 4906 and 4909. A conventional column multiplexor only uses the equivalent of switch set 4909 which conduct the bitline current from VMM array 2701 to the current-to-voltage converter 4901 (which may also be referred to as an output circuit, or a sensing circuit). The example shown here adds switch set 4906 which is part of a sensing multiplexor (YMUX-S) that carries substantially no current due to the high impedance of operational amplifier 4905. Under this configuration, the lines coupled to switch sets 4906 and 4909, i.e. the inverting input of operational amplifier 4905 and the source of NMOS transistor 4911 (which is the terminal of NMOS transistor 4911 coupled to bitline BL+) will have substantially the same voltage but switch set 4909 will carry current while switch set 4906 will substantially not carry current. VBLRD is a read voltage bias that is applied to the bitline BL+ and BL−, e.g., 0.6V. When switch sets 4906 and 4909 are closed, the voltage of the bitline will initially be lower or higher than VBLRD, which causes the output voltage of operational amplifier 4905 to increase or decrease thereby turning on stronger or weaker NMOS transistor 4911 to maintains the voltage at the BL+ or BL− to be same as VBLRD.

For the circuit path connecting bitline BL− (a first bitline), the switch sets 4910 and 4908 are portions of a column multiplexor that multiplexes the respective bitlines from VMM array 2701 into the current-to-voltage converter 4901. Specifically, the column multiplexor selects the respective bitline BL− by closing switch sets 4908 and 4910. A conventional column multiplexor only uses the equivalent of switch set 4910 which conducts the bitline current from VMM array 2701 to the current-to-voltage converter 4901 (which may also be referred to as an output circuit, or a sensing circuit). The example shown here adds switch set 4908 which is part of a sensing multiplexor (YMUX-S) that carries substantially no current due to the high impedance of operational amplifier 4907. Under this configuration, the lines coupled to switch set 4908 and 4910, i.e. the inverting input of operational amplifier 4907 and the source of NMOS transistor 4912 will have substantially the same voltage but switch set 4910 will carry current while switch set 4908 will substantially not carry current. When switch sets 4908 and 4910 are closed, the voltage of the bitline will initially be lower or higher than VBLRD, which causes the output voltage of operational amplifier 4907 to increase or decrease thereby turning on stronger or weaker the NMOS transistor 4912 to maintains the voltage at the BL− to be same as VBLRD. The increase in voltage on the gate of NMOS transistor 4912 increases the current flow through NMOS transistor 4912 which causes the voltage of the source of NMOS transistor 4912 to also increase until the voltage of the bitline equals VBLRD.

Switched capacitors 4915 and 4918 can be variable capacitors or fixed capacitors, and respectively couple the drain voltage of NMOS transistors 4911, 4912, denoted respectively Vinp, Vinn, to VDD or VSUPP. Switched resistors 4916 and 4917 can be variable resistors or fixed resistors, and are respectively arranged in parallel with switched capacitors 4915, 4918. Optionally, switched capacitors 4915 and 4918 can be removed. Optionally, switched resistors 4916 and 4917 can be removed. Switched capacitors 4915 and 4918 and switched resistors 4916 and 4917 are a load that generates voltages Vinp and Vinn, respectively, in response the received current. Because ADC 4902 has a relatively high impedance, the current will substantially flow into switched capacitors 4915 and 4918 and switched resistors 4916 and 4917, and there will be a corresponding voltage drop with reference to the supply voltage VDD or VSUPP and VINP and Vinn, respectively.

Regulator 4903 comprises switch set 4906 and operational amplifier 4905. Regulator 4904 comprises switch set 4908 and operational amplifier 4907.

Figure 50:
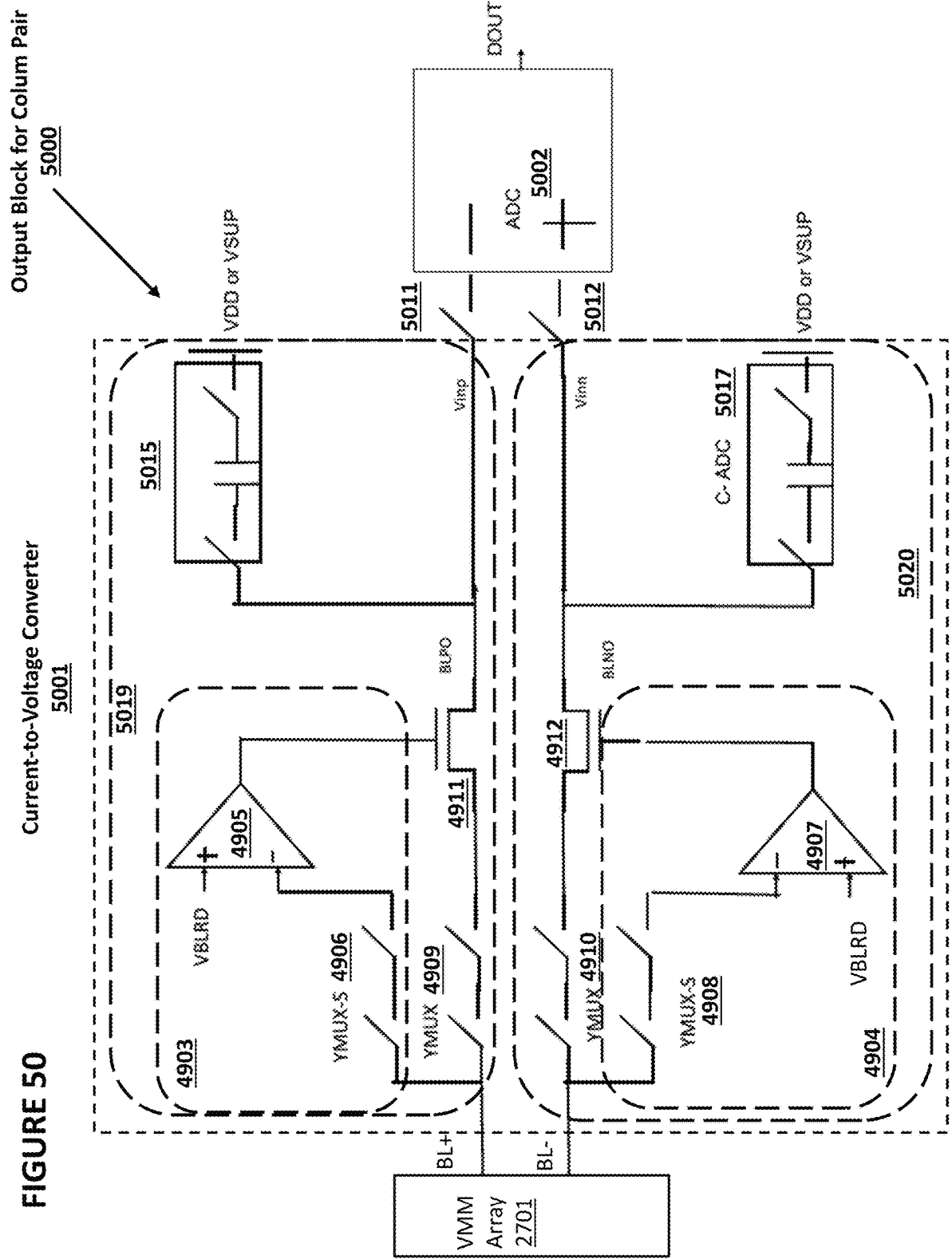
FIG. 50 depicts an output block.

FIG. 50 depicts output block for column pair 5000. Only one output block for column pair 5000 is shown, but it is to be understood that an instantiation of output block for column pair 5000 would be used for each respective pair of columns in VMM array 2701. Output block for column pair 5000 receives current BL+ from one respective column of memory cells in VMM array 2701 and current BL− from another respective column of memory cells in VMM array 2701 and generates DOUT[n:0], a digital output that comprises a set of output bits.

Output block for column pair 5000 comprises current-to-voltage (ITV) converter 5001, analog-to-digital converter (ADC) 5002, and switches 5011 and 5012. Current-to-voltage converter 5001 comprises BL+ regulation circuit 5019 and BL− regulation circuit 5020. Current-to-voltage converter 5001 converts current BL+ into voltage Vinp (a first voltage) and converts current BL− into voltage Vinn (a second voltage).

BL+ regulation circuit 5019 comprises regulator 4903, first switch set 4909 (comprising one or more switches), regulating (cascoding) NMOS transistor 4911 and switched capacitor 5015 coupling voltage Vinp to a voltage source VDD or VSUP. Regulator 4903 comprises third switch set 4906 (comprising one or more switches) and operational amplifier 4905. BL− regulation circuit 5020 comprises regulator 4904, second switch set 4910 (comprising one or more switches), regulating (cascoding) NMOS transistor 4912, and switched capacitor 5017 coupling voltage Vinn to a voltage source VDD or VSUP. Regulator 4904 comprises fourth switch set 4908 (comprising one or more switches) and operational amplifier 4907.

Alternatively, the NMOS transistor 4911 and 4912 can be replaced with PMOS transistors.

Switched capacitors 5015 and 5017 are a load that generates voltage Vinp and Vinn, respectively, in response the received current. Because ADC 5002 has a relatively high impedance, the current will substantially flow into switched capacitors 5015 and 5017, and there will be a corresponding voltage drop with reference to the supply voltage VDD or VSUPP and VINP and Vinn, respectively.

Current-to-voltage converter 5001 converts current BL+ into voltage Vinp and converts current BL− into voltage Vinn. Switches 5011 and 5012 are closed to apply Vinp and Vinn as inputs to analog-to-digital converter (ADC) 5002, which converts the analog voltage into a digital signal DOUT[n:0].

FIG. 51 depicts output block for column pair 5100. Only one output block for column pair 5100 is shown, but it is to be understood that an instantiation of output block for column pair 5100 would be used for each respective pair of columns in VMM array 2701. Output block for column pair 5100 receives current BL+ from a first bitline coupled to one column of memory cells in VMM array 2701 and current BL− from a second bitline coupled to another column of memory cells in VMM array 2701 and generates DOUT[n:0], a digital output.

Output block for column pair 5100 comprises current-to-voltage (ITV) converter 5001, which was described above with respect to FIG. 50, and SAR ADC 5102. Current-to-voltage converter 5001 converts current BL+ into voltage Vinp (a first voltage) and converts current BL− into voltage Vinn (a second voltage). SAR ADC 5102 converts Vinp and Vinn into a digital signal DOUT[n:0] that comprises a set of output bits. The S/H capacitor 5015 and 5017 in FIG. 50 (which are the loads that convert current from the bitlines into voltages) can be implemented using capacitor arrays 5115 and 5117 in SAR 5102. Due to this sharing of circuitry for different functions, the area of space used within the semiconductor die is reduced. As noted in FIG. 51, the output voltages of the ITVs connecting to BL+ and BL− are connected to negative and positive terminals of the SAR ADC 5102, respectively.

Figure 53:
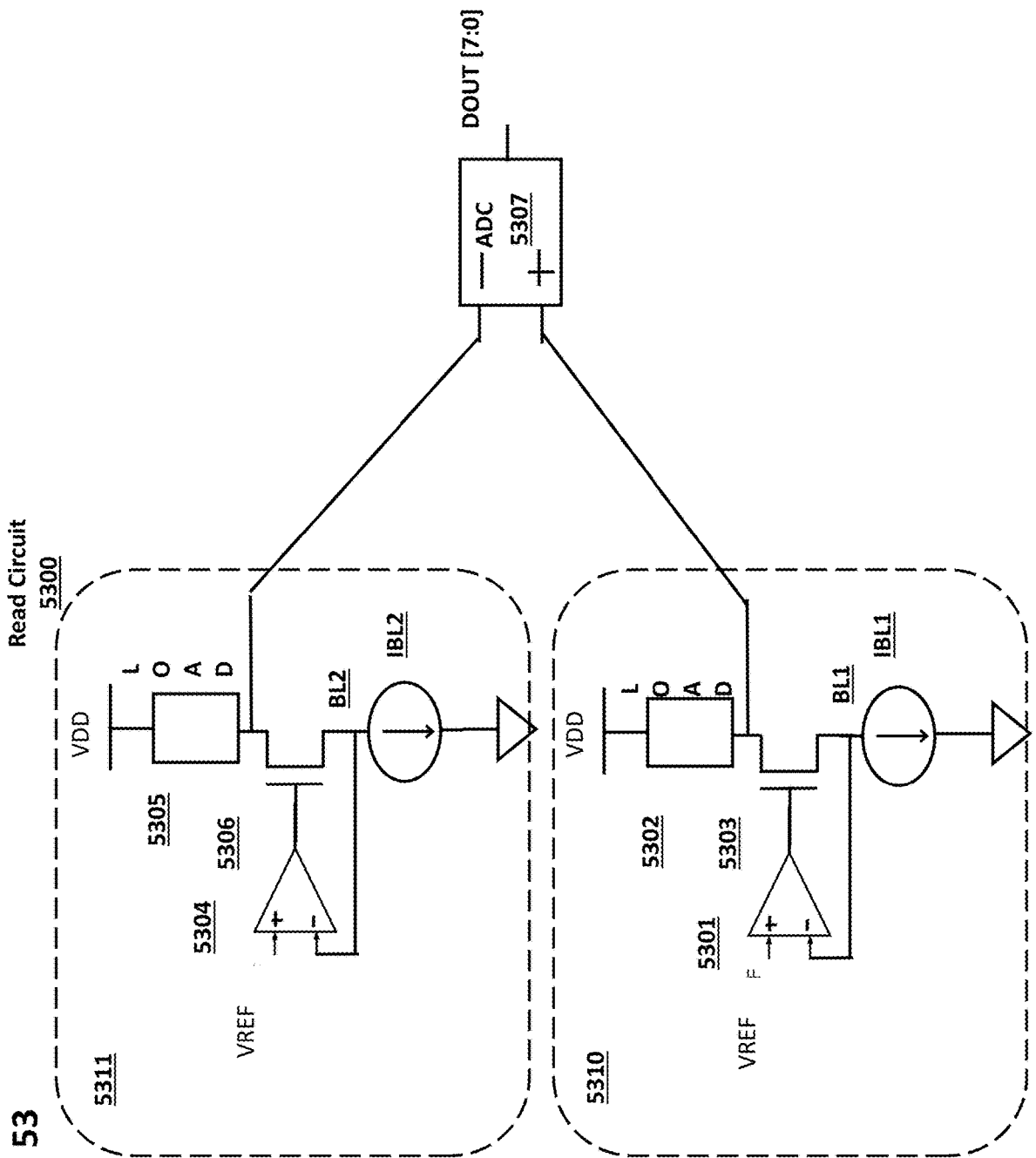
FIG. 53 depicts a read circuit.
Figure 54:
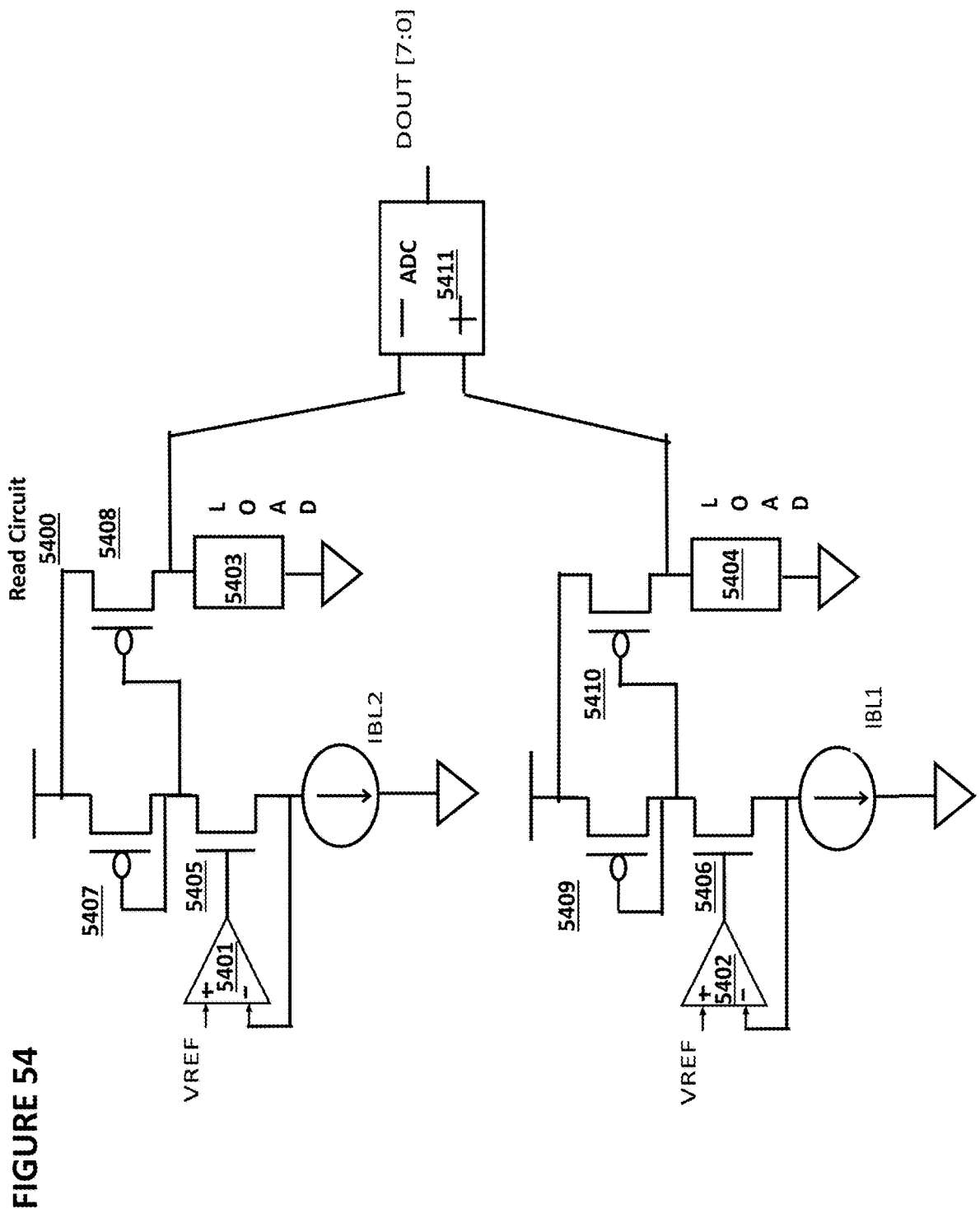
FIG. 54 depicts a read circuit.
Figure 55:
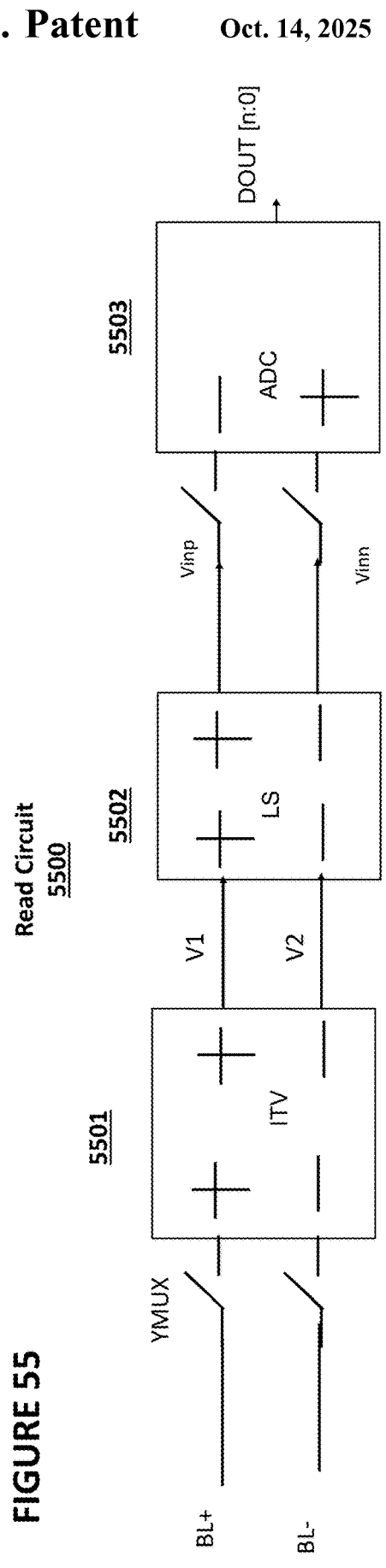
FIG. 55 depicts a read circuit.

The outputs of ADC 4802 in FIG. 48, ADC 4902 in FIG. 49, ADC 5002 in FIG. 50, SAR ADC 5102 in FIG. 51, ADC 5307 in FIGS. 53 and 54, and ADC 5503 in FIG. 55 effectively implement a differential weight as W=W+−W−, where W+ are positive weights stored in cells coupled to bitline BL+ and W− are negative weights stored in cells coupled to bitline BL−. For example, for an 8-bit ADC, for IBL+=Imax, IBL−=Imin, the ADC output=255; for IBL+ =Imin, IBL−=Imax, the ADC output=0. Example values are Imax=20 uA, Imin=0 uA.

Figure 52:
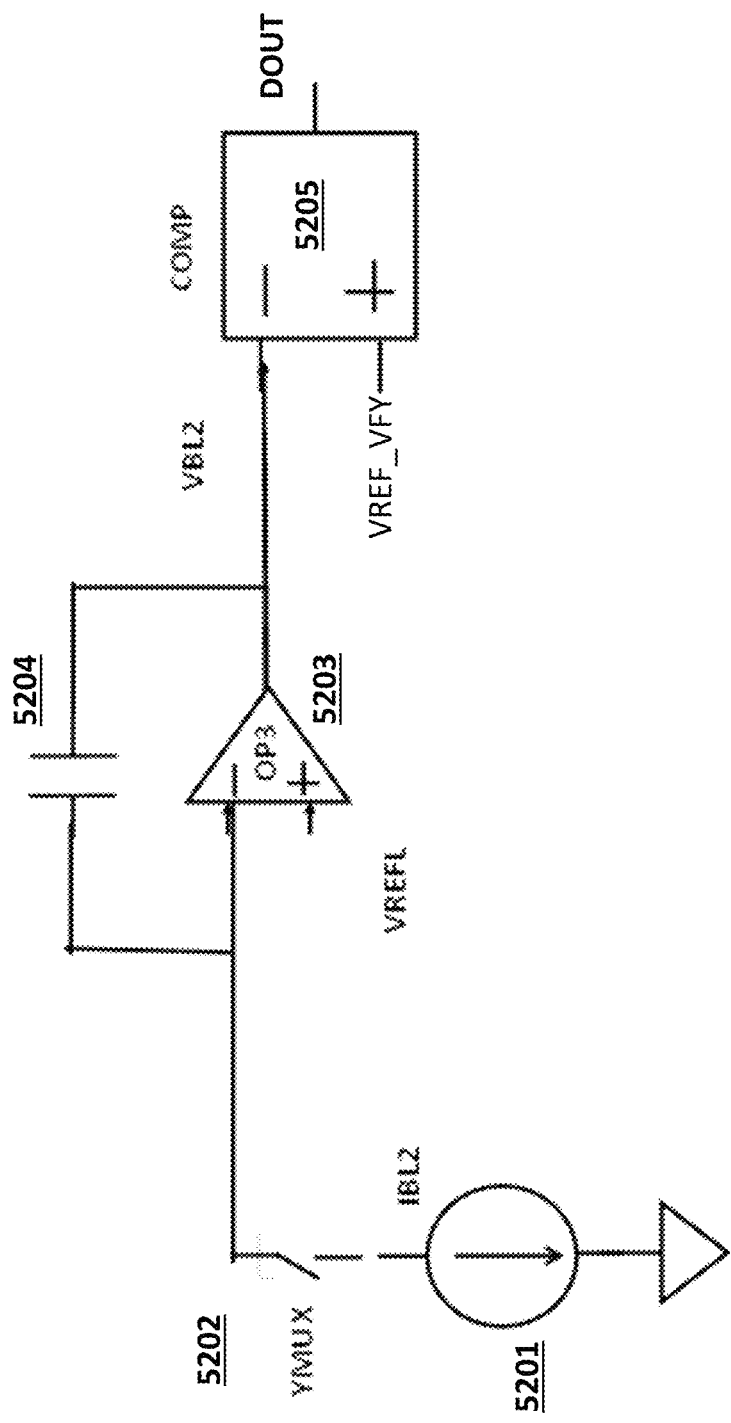
FIG. 52 depicts a verify circuit.

FIG. 52 depicts verify circuit 5200, which is used to verify the value stored in one or more memory cells coupled to a bit line, where current source 5201 represents IBL2, the current drawn by the bit line. Verify circuit comprises multiplexor 5202, of which only a single switch is shown, operational amplifier 5203, capacitor 5204, and comparator 5205 (which in this example is a 1-bit ADC). The non-inverting input of operational amplifier 5203 is coupled to a reference voltage VREFL (such as 0.6V, the voltage imposed on the bitline of the read cell), and the inverting input of operational amplifier 5203 is coupled to receive the IBL2, when multiplexor 5202 passes IBL2. Capacitor 5204 is arranged between the output of operational amplifier 5203 and the inverting input of operational amplifier 5203. The capacitor 5204 is used to convert the cell current IBL2 into the voltage VBL2. Comparator 5205 compares the received voltage VBL2 to the target value, reference voltage VREF_VFY. Verify circuit 5200 receives the current IBL2 and generates a digital signal, DOUT, which during a verify operation will be a first value (e.g., "1") when the verify operation is successful, (i.e., when VBL2 is ≥VREF_VFY) and a second value (e.g., "0") when the verify operation is not successful (i.e., when VBL2<VREF_VFY) (meaning that the cell or cells coupled to the bit line may undergo tuning).

FIG. 53 depicts read circuit 5300, which is used to read a value stored in differential memory cells coupled to a first bit line and a second bit line in an array of memory cells, where IBL1 is the current drawn by the first bit line coupled to a first column of cells in the array and IBL2 is the current drawn by the second bit line coupled to a second column of cells in the array and generate differential digital output bits by a differential ADC.

Read circuit 5300 comprises current-to-voltage converter 5310 (a first current-to-voltage converter), current-to-voltage converter 5311 (a second current-to-voltage converter), and differential ADC 5307 (which can be a SAR ADC or other type of ADC).

Current-to-voltage converter 5310 comprises operational amplifier 5301 (a first operational amplifier) (or an equivalent regulating circuit), load 5302 (a first load, which can comprise one or more resistors, capacitors, or transistors), and NMOS transistors 5303 (a first transistor). Load 5302 comprises a first terminal coupled to a voltage source VDD and a second terminal. NMOS transistor 5303 comprises a first terminal coupled to the second terminal of load 5302, a gate, and a second terminal coupled to the first bit line. Operational amplifier 5301 comprises an inverting input coupled to the first bit line, an inverting input coupled to VREF1 (a first reference voltage) and an output coupled to the gate of NMOS transistor 5303.

Current-to-voltage converter 5311 comprises operational amplifier 5304 (a second operation amplifier) (or an equivalent regulating circuit), load 5305 (a second load, which can comprise one or more resistors, capacitors, or transistors), and NMOS transistor 5306 (a second transistor). Load 5305 comprises a first terminal coupled to a voltage source VDD and a second terminal. NMOS transistor 5306 comprises a first terminal coupled to the second terminal of load 5305, a gate, and a second terminal coupled to the second bit line. Operational amplifier 5304 comprises an inverting input coupled to the second bit line, an inverting input coupled to VREF2 (a second reference voltage, which can be the same or different than VREF1) and an output coupled to the gate of NMOS transistor 5303.

ADC 5307 comprises a first input coupled to the second terminal of the first load, a second input coupled to the second terminal of the second load, and an output to generate a set of output bits.

Thus, the non-inverting inputs of operational amplifiers 5303, 5304 are each coupled to a reference voltage Vref, and the source of regulating transistors 5306, 5303 are connected to the inverting input of operational amplifiers 5304, 5301, respectively. The source voltage of transistors 5306, 5303 are thus driven to be equal to VREF, meaning voltages of BL1 and BL2 coupled to the selected cells are driven to VREF voltage). Here, the voltages provided to the inverting and non-inverting terminals of ADC 5307 are referenced with respect to the supply voltage, VDD, and are the result of voltage drops from the supply voltage in amounts equal to the currents IBL2 and IBL1 through loads 5305 and 5302, respectively. The output of the ADC effectively implements W=W+−W−.

FIG. 54 depicts read circuit 5400, which is used to read the value stored in differential memory cells coupled to a first bit line and a second bit line, where IBL1 is the current drawn by the first bit line and IBL2 is the current drawn by the second bit line. Read circuit 5400 comprises operational amplifiers 5401 and 5402 (or equivalent regulating circuits), loads 5403 and 5404 (which can comprise one or more resistors, capacitors, or transistors), NMOS transistors 5405 and 5406, PMOS transistors 5407, 5408, 5409, and 5410, and differential ADC 5411 (which can be a SAR ADC or other type of ADC). PMOS transistors 5407 and 5408 form a current mirror that mirrors the bitline current IBL2 into load 5403. PMOS transistors 5409 and 5410 form a current mirror that mirrors the bitline current IBL1 into load 5404. Here, the voltages provided to the inverting and non-inverting terminals of ADC 5411 are referenced with respect to ground and are the result of voltage gains over ground in amounts equal to the currents IBL2 and IBL1 through loads 5403 and 5404, respectively. The output of ADC 5411 effectively implements W=W+−W−.

Figure 56:
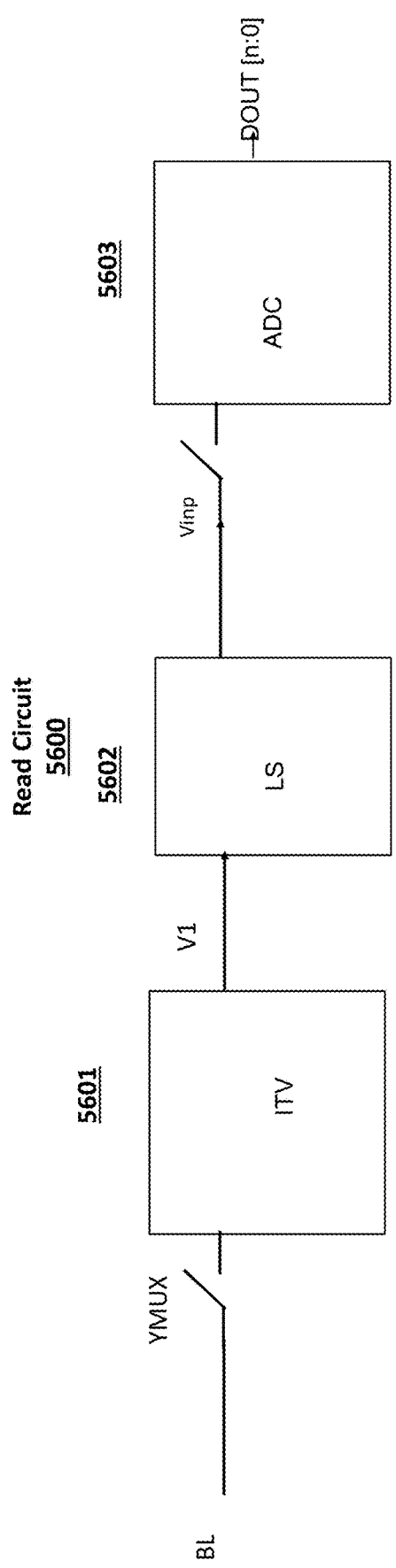
FIG. 56 depicts a read circuit.

FIGS. 55 and 56 depict examples of read circuits that comprise a level shifter.

In FIG. 55, read circuit 5500 comprises current-to-voltage converter 5501, level shifter 5502, and analog-to-digital converter 5503 and converts current received as BL+ and BL− from VMM array 2701 into a digital output, DOUT [n:0] that comprise a set of output bits. Current-to-voltage converter 5501 converts BL+(a first current) into V1 (a first voltage) and to convert BL− (a second current) into V2 (a second voltage), where BL+ and BL− are differential currents. Level shifter 5502 converts V1 into Vinp (a third voltage) and V2 into Vinn (a fourth voltage), where the third voltage is different than the first voltage and the fourth voltage is different than the second voltage. Analog-to-digital converter 5503 converts Vinp and Vinn into DOUT [n:0].

In FIG. 56, read circuit 5600 comprises current-to-voltage converter 5601, level shifter 5602, and analog-to-digital converter 5603 and converts current received as BL from VMM array 2701 into a digital output, DOUT[n:0] that comprises a set of output bits. Current-to-voltage converter 5601 converts BL (a first current) into V1 (a first voltage). Level shifter 5602 converts V1 into Vinp (a second voltage), where the second voltage is different than the first voltage. Analog-to-digital converter 5603 converts Vinp and Vinn into DOUT[n:0].

The use of level shifter 5502 and 5602 in FIGS. 55 and 56 might be advantageous, for example, when current-to-voltage converters 5501 and 5502 are operating in a first voltage domain (for example, with supply voltage Vdd=1.8V) and a second voltage domain (for example, with supply voltage Vdd=1.0V) would provide more voltage headroom for ADC 5503 or 5603 to increase speed and utilize less area within the semiconductor die.

Figure 57B:
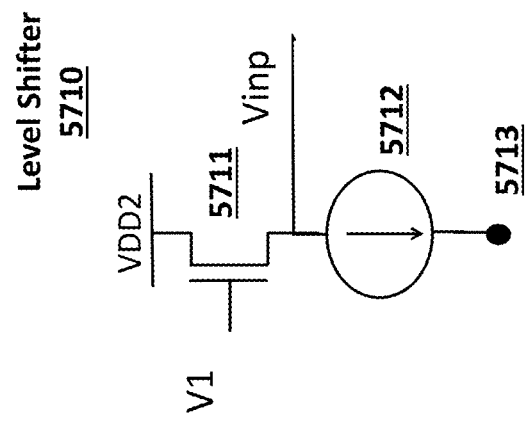
FIG. 57B depicts a level shifter.
Figure 57A:
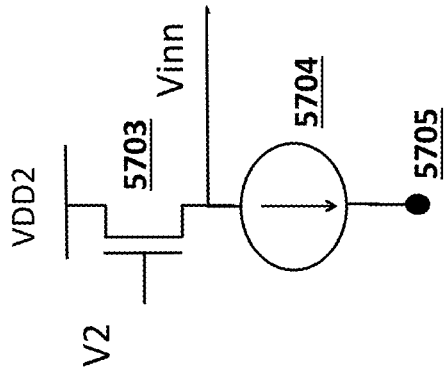
FIG. 57A depicts a level shifter.

FIG. 57A depicts level shifter 5700 that can be used as level shifter 5502 in FIG. 55. Level shifter 5700 comprises NMOS transistor 5701 (a first transistor) and current source 5702 (a first current source) in a source follower configuration, and NMOS transistor 5703 (a second transistor) and current source 5704 (a second current source) in a source follower configuration. NMOS transistor 5701 comprises a first terminal coupled to VDD2 (a supply voltage) a gate to receive input voltage V1 (a first voltage), and a second terminal to provide an output voltage Vinp (a third voltage). Current source 5702 comprises a first terminal coupled to the second terminal of NMOS transistor 5701 and a second terminal coupled to common node 5705, which can be ground or another voltage. NMOS transistor 5703 comprises a first terminal coupled to VDD2 (a supply voltage), a gate to receive input voltage V2 (a second voltage), and a second terminal to provide an output voltage Vinn (a fourth voltage). Current source 5704 comprises a first terminal coupled to the second terminal of NMOS transistor 5703 and a second terminal coupled to common node 5705.

Level shifter 5700 receives differential input voltages, V1 and V2, and generates differential output voltages, Vinp and Vinn. Vinp=V1−dV1, where dV1 is determined by the threshold voltage of the NMOS transistor 5701 and current bias 5702. Vinn=V2−dV2, where dV2 is determined by the threshold voltage of the NMOS transistor 5703 and current bias 5704. V1 and V1 are in a first voltage domain, and Vinp and Vinn are in a second voltage domain different than the first voltage domain. For example, V1 and V2 can be in a 1.8V voltage domain and Vinp and Vinn can be in a 1V voltage domain.

FIG. 57B depicts level shifter 5710 that can be used as level shifter 5710 in FIG. 56. Level shifter 5710 comprises NMOS transistor 5711 (a first transistor) and current source 5712 (a first current source) in a source follower configuration. NMOS transistor 5711 comprises a first terminal coupled to VDD2 (a supply voltage), a gate to receive input voltage V1 (a first voltage), and a second terminal to provide an output voltage Vinp (a second voltage). Current source 5712 comprises a first terminal coupled to the second terminal of NMOS transistor 5711 and a second terminal coupled to common node 5705, which can be ground or another voltage. NMOS transistor 5703 comprises a first terminal coupled to VDD2 (a supply voltage), a gate to receive input voltage V2 (a second voltage), and a second terminal to provide an output voltage Vinn (a fourth voltage). Current source 5704 comprises a first terminal coupled to the second terminal of NMOS transistor 5703 and a second terminal coupled to node 5713, which can be ground or another voltage.

Level shifter 5710 receives input voltage, V1, and generates output voltage, Vinp. Vinp=V1−dV1, where dV1 is determined by the threshold voltage of the NMOS transistor 5711 and current bias 5712. V1 is in a first voltage domain, and Vinp is in a second voltage domain different than the first voltage domain. For example, V1 can be in a 1.8V voltage domain and Vinp can be in a 1V voltage domain.

Figure 58:
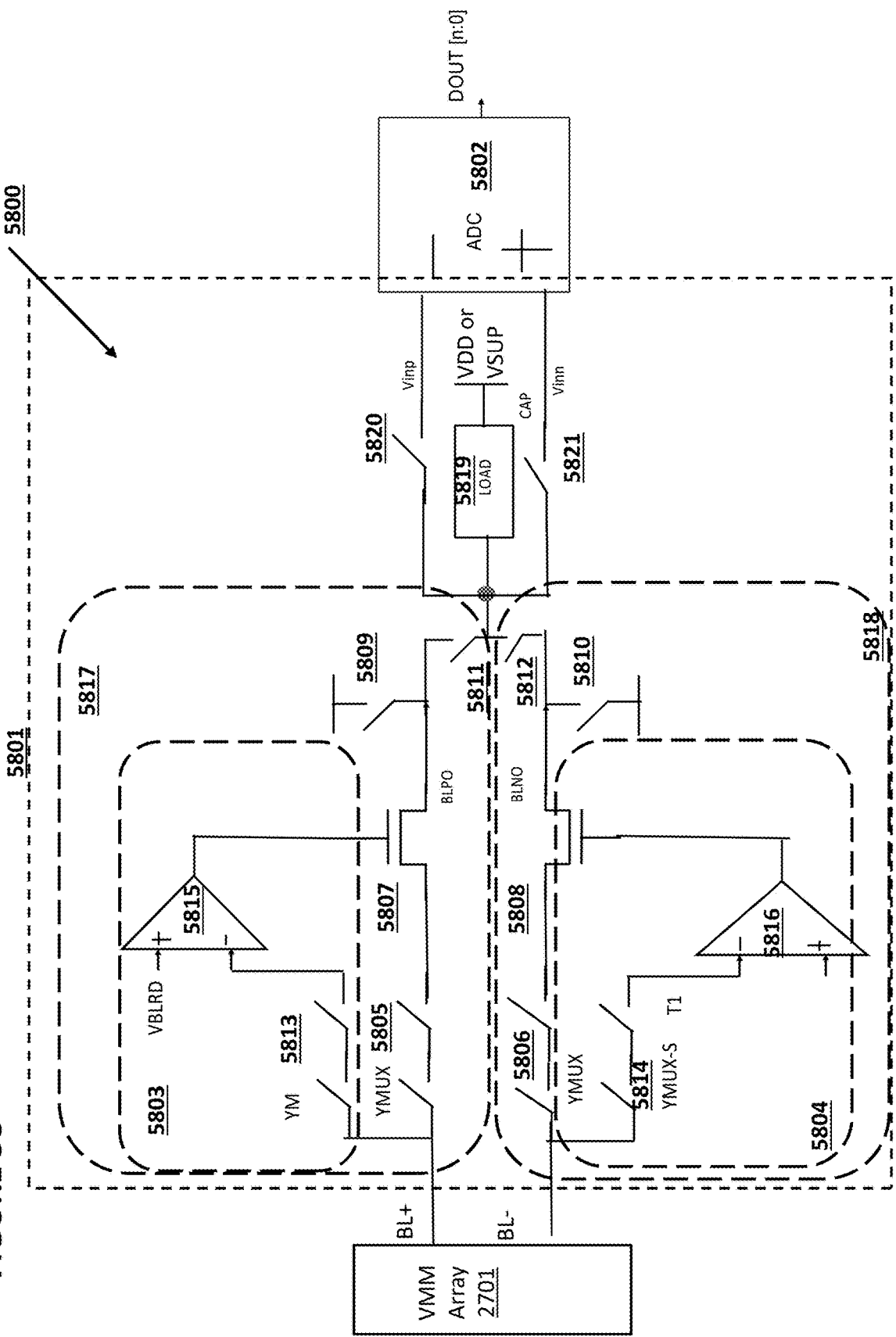
FIG. 58 depicts an output block.

FIG. 58 depicts output block for column pair 5800. Only one output block for column pair 5800 is shown, but it is to be understood that an instantiation of output block for column pair 5800 would be used for each respective pair of columns in VMM array 2701. Output block for column pair 5800 receives current BL+ from a first bitline coupled to one column of non-volatile memory cells in VMM array 2701 and current BL− from a second bitline coupled to another column of non-volatile memory cells in VMM array 2701 and generates DOUT[n:0], a digital output.

Output block for column pair 5800 comprises current-to-voltage (ITV) converter 5801 and a differential analog-to-digital converter (ADC) 5802. ADC 5802 can be an SAR ADC (Successive Approximation Register ADC), Slope ADC, Sigma Delta ADC, or Algorithmic (aka Cyclic) ADC, without limitation. Current-to-voltage converter 5801 comprises BL+ regulation circuit 5817, BL− regulation circuit 5817, switches 5820 and 5821, and load 5819 (which can comprise one or more resistors, capacitors, MOS transistors, or other load). Current-to-voltage converter 5801 converts current BL+ into voltage Vinp (a first voltage) and converts current BL-into voltage Vinn (a second voltage).

BL+ regulation circuit 5817 comprises regulator 5803 (which can be referred to as a forcing regulator or a current-carrying regulator), first switch set 5805 (comprising one or more switches), regulating (cascoding) NMOS transistor 5807, switch 5809 and switch 5811.

BL− regulation circuit 5818 comprises regulator 5804, (which can be referred to as a forcing regulator or a current-carrying regulator), second switch set 5806 (comprising one or more switches), regulating (cascoding) NMOS transistor 5808, switch 5810, and switch 5812.

Regulator 5803 comprises third switch set 5813 (comprising one or more switches) and operational amplifier 5815 (or an equivalent regulating circuit). Regulator 5804 comprises fourth switch set 5814 (comprising one or more switches) and operational amplifier 5816 (or an equivalent regulating circuit).

For the circuit path connecting bitline BL+ (a first bitline), the switch sets 5805 and 5813 are portions of a column multiplexor that multiplexes the respective first bitline from VMM array 2701 into the current-to-voltage converter 5801. Specifically, the column multiplexor selects bitline BL+ by closing switch sets 5805 and 5813. A conventional column multiplexor only uses the equivalent of switch set 5805 which conducts the bitline current from VMM array 2701 to the current-to-voltage converter 5801 (which may also be referred to as an output circuit, or a sensing circuit). The example shown here adds switch set 5813 which is part of a sensing multiplexor (YMUX-S) that carries substantially no current due to the high impedance of operational amplifier 5815. Under this configuration, the bitlines coupled to switch sets 5805 and 5813, i.e. the inverting input of operational amplifier 5815 and the source of NMOS transistor 5807 (which is the terminal of NMOS transistor 5807 coupled to the bitline BL+) will have the substantially the same voltage but switch set 5805 will carry current while switch set 5813 will substantially not carry current. When switch sets 5805 and 5813 are closed, the voltage of the bitline will initially be lower or higher than VBLRD, which causes the output voltage of operational amplifier 5815 to increase or decrease thereby turning on stronger or weaker the NMOS transistor 5807 to maintains the voltage at the BL+ to be same as VBLRD. The increase in voltage on the gate of NMOS transistor 5807 increases the current flow through NMOS transistor 5807 which causes the voltage of the source of NMOS transistor 5807 to also increase until the voltage of the bitline equals VBLRD.

For the circuit path connecting bitline BL− (a first bitline), the switch sets 5806 and 5814 are portions of a column multiplexor that multiplexes the respective bitlines from VMM array 2701 into the current-to-voltage converter 5801. Specifically, the column multiplexor selects the respective bitline BL− by closing switch sets 5806 and 5814. A conventional column multiplexor only uses the equivalent of switch set 5806 which conducts the bitline current from VMM array 2701 to the current-to-voltage converter 5801 (which may also be referred to as an output circuit, or a sensing circuit). The example shown here adds switch set 5814 which is part of a sensing multiplexor (YMUX-S) that carries substantially no current due to the high impedance of operational amplifier 5816. Under this configuration, the lines coupled to switch sets 5806 and 5814, i.e. the inverting input of operational amplifier 5816 and the source of NMOS transistor 5808 (which is the terminal of NMOS transistor 5808 coupled to the bitline BL−) will have substantially the same voltage but switch set 5806 will carry current while switch set 5814 will substantially not carry current. When switch sets 5806 and 5814 are closed, the voltage of the bitline will initially be lower or higher than VBLRD, which causes the output voltage of operational amplifier 5816 to increase or decrease thereby turning on stronger or weaker the NMOS transistor 5808 to maintains the voltage at the BL− to be same as VBLRD. The increase in voltage on the gate of NMOS transistor 5808 increases the current flow through NMOS transistor 5808 which causes the voltage of the source of NMOS transistor 5808 to also increase until the voltage of the bitline equals VBLRD. The shared ITV load 5819 is shared between the two bitlines (differential bitlines BL+ and BL−), with a first end of load 5819 coupled through switches 5811, 5812, respectively to the drains of NMOS transistors 5807, 5808. It will convert the current from the IBL+ or IBL− into voltages that are applied to the ADC 5802 in a time multiplexing fashion, such as operation for IBL+ first then operation for IBL− is applied. In this way of sharing load, the area is reduced. A second end of load 5819 is coupled to VDD or VSUP. Alternatively, the ITV load 5819 can be shared more than two bitlines, such as for 4 or 128.

Figure 59:
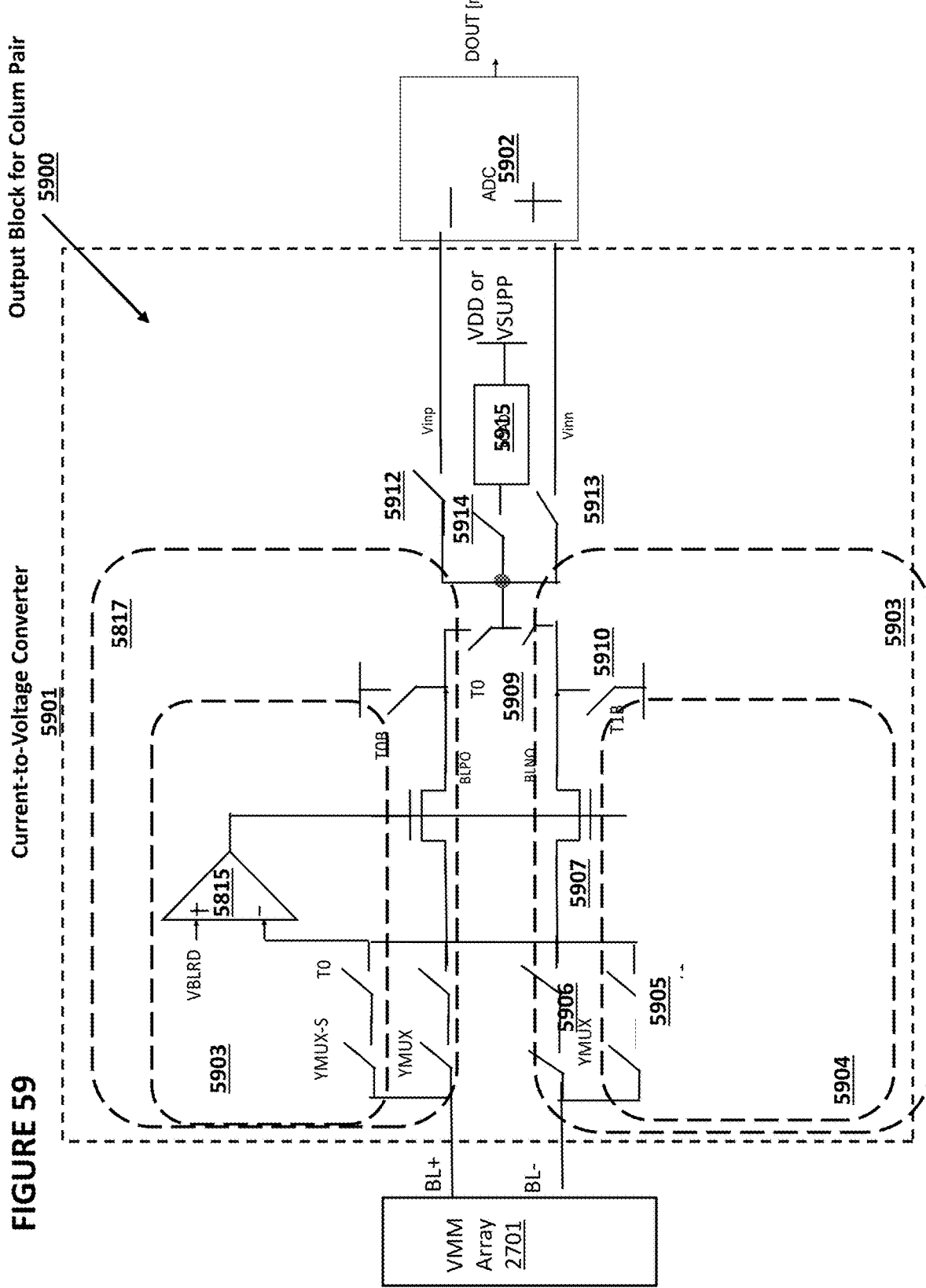
FIG. 59 depicts an output block.

FIG. 59 depicts output block for column pair 5900. Only one output block for column pair 5900 is shown, but it is to be understood that an instantiation of output block for column pair 5900 would be used for each respective pair of columns in VMM array 2701. Output block for column pair 5900 receives current BL+ from a first bitline coupled to one column of non-volatile memory cells in VMM array 2701 and current BL− from a second bitline coupled to another column of non-volatile memory cells in VMM array 2701 and generates DOUT[n:0], a digital output.

Output block for column pair 5900 comprises current-to-voltage (ITV) converter 5901 and a differential analog-to-digital converter (ADC) 5902. ADC 5902 can be an SAR ADC (Successive Approximation Register ADC), Slope ADC, Sigma Delta ADC, or Algorithmic (aka Cyclic) ADC, without limitation. Current-to-voltage converter 5901 converts current BL+ into voltage Vinp (a first voltage) and converts current BL− into voltage Vinn (a second voltage).

Current-to-voltage converter 5901 comprises BL+ regulation circuit 5817 discussed previously with reference to FIG. 58, and which will not be described again in the interest of efficiency. Current-to-voltage converter 5901 further comprises BL− regulation circuit 5903, which comprises regulator 5904, third switch set 5905 (comprising one or more switches), fourth switch set 5906 (comprising one or more switches), regulating (cascoding) NMOS transistor 5907, and switches 5909 and 5910. Current-to-voltage converter 5901 further comprises switches 5912, 5913, and 5914, and load 5915 (which can comprise a capacitor, a resistor, or other load).

The circuit path connecting bitline BL+(a first bitline) behaves as in FIG. 58.

For the circuit path connecting bitline BL− (a first bitline), the switch sets 5905 and 5906 are portions of a column multiplexor that multiplexes the bitlines from VMM array 2701 into the current-to-voltage converter 5901. Specifically, the column multiplexor selects bitline BL− by closing switch sets 5905 and 5906. A conventional column multiplexor only uses the equivalent of switch set 5906 which conducts the bitline current from VMM array 2701 to the current-to-voltage converter 5901 (which may also be referred to as an output circuit, or a sensing circuit). The example shown here adds switch set 5905 which is part of a sensing multiplexor (YMUX-S) that carries substantially no current due to the high impedance of operational amplifier 5815. Under this configuration, the lines coupled to switch sets 5905 and 5906 will have substantially the same voltage but switch set 5906 will carry current while switch set 5905 will substantially not carry current. When switch sets 5905 and 5906 are closed, the voltage of the bitline will initially be lower or higher than VBLRD, which causes the output voltage of operational amplifier 5815 to increase or decrease thereby turning on stronger or weaker the NMOS transistor 5907 to s maintains the voltage at the BL− to be same as VBLRD. The increase in voltage on the gate of NMOS transistor 5907 increases the current flow through NMOS transistor 5907 which causes the voltage of the source of NMOS transistor 5907 to also increase until the voltage of the bitline equals VBLRD. In this example, op amp 5815 is shared between the two bitlines BL+ and BL− and load 5915 is shared between the two bitlines BL+ and BL−. Alternatively, op amp 5815 can be shared by more than two bitlines, and load 5915 can be shared by more than two bitlines.

Figure 60:
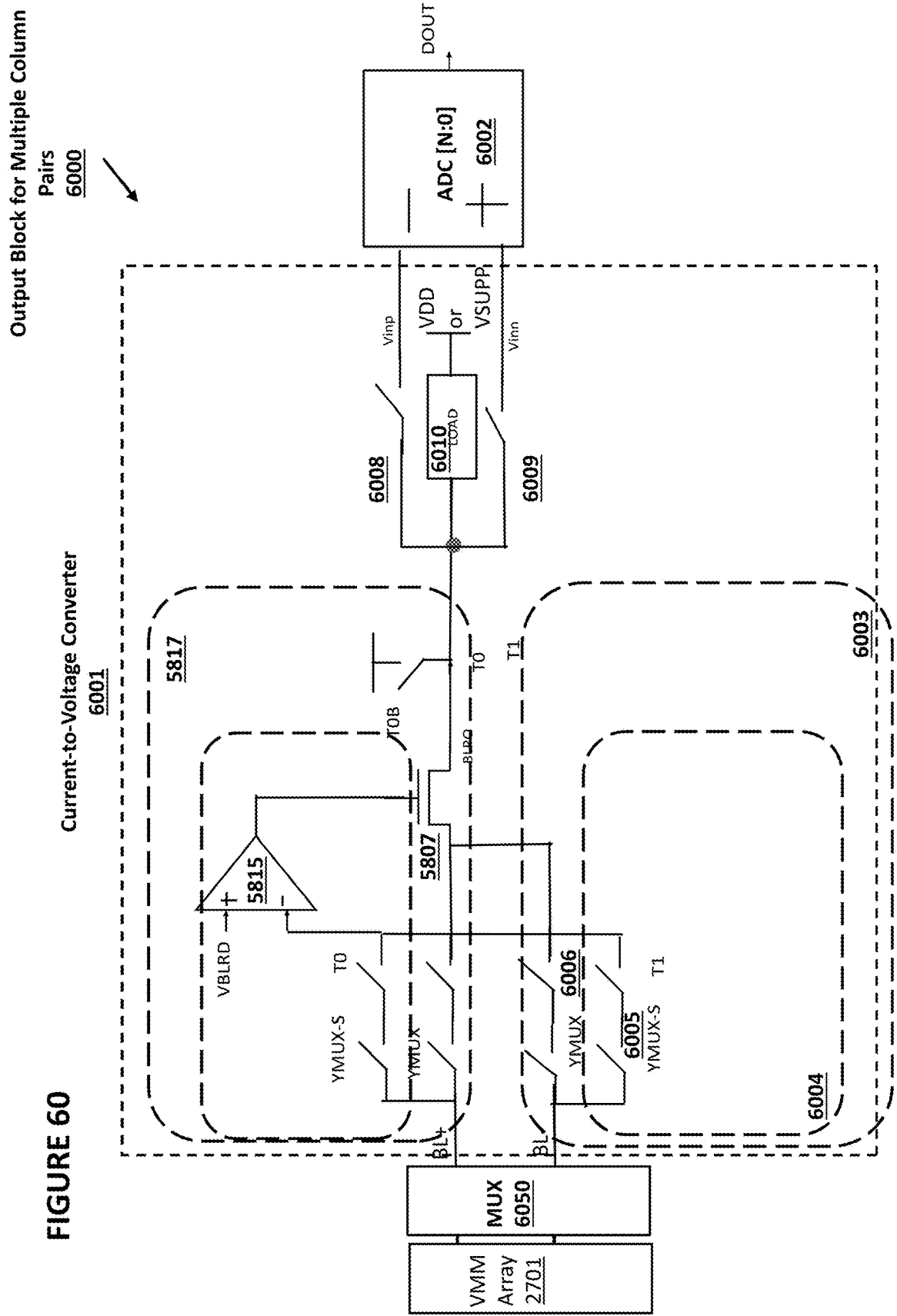
FIG. 60 depicts an output block.

FIG. 60 depicts output block for multiple column pairs 6000. Output block for multiple column pairs 6000 comprises current-to-voltage (ITV) converter 6001, multiplexor 6050, and differential analog-to-digital converter (ADC) 6002. ADC 6002 can be an SAR ADC (Successive Approximation Register ADC), Slope ADC, Sigma Delta ADC, or Algorithmic (aka Cyclic) ADC, without limitation.

Multiplexor 6050 is coupled to a plurality of column pairs in VMM array 2701 and can connect any pair within that plurality of column pairs to current-to-voltage converter 6001. The connected column pair carries current BL+ and BL−, which is understood to be the column pair selected by multiplexor 6050.

Current-to-voltage converter 6001 converts current BL+ into voltage Vinp (a first voltage) and converts current BL− into voltage Vinn (a second voltage). Current-to-voltage converter 6001 comprises BL+ regulation circuit 5817 discussed previously with reference to FIG. 58, and which will not be described again in the interest of efficiency. Current-to-voltage converter 6001 further comprises BL− regulation circuit 6003, which comprises regulator 6004, third switch set 6005 (comprising one or more switches), and fourth switch set 6006 (comprising one or more switches). Current-to-voltage converter 6001 further comprises switches 6008 and 6009 and load 6010 (which can comprise a capacitor, a resistor, or other load).

The circuit path connecting bitline BL+ (a first bitline) behaves as in FIG. 58.

For the circuit path connecting bitline BL− (a first bitline), the switch sets 6005 and 6006 are portions of a column multiplexor that multiplexes the bitlines from VMM array 2701 into the current-to-voltage converter 6001. Specifically, the column multiplexor selects the respective bitline BL− by closing switch sets 6005 and 6006. A conventional column multiplexor only uses the equivalent of switch set 6006 which conducts the bitline current from VMM array 2701 to the current-to-voltage converter 6001 (which may also be referred to as an output circuit, or a sensing circuit). The example shown here adds switch set 6005 which is part of a sensing multiplexor (YMUX-S) that carries substantially no current due to the high impedance of operational amplifier 5815. Under this configuration, the lines coupled to switch sets 6005 and 6006 will have substantially the same voltage but switch set 6006 will carry current while switch set 6005 will substantially not carry current. When switch sets 6005 and 6006 are closed, the voltage of the bitline will initially be lower or higher than VBLRD, which causes the output voltage of operational amplifier 5815 to increase or decrease thereby turning on stronger or weaker the NMOS transistor 5807. This maintains the voltage at the BL+ and BL− to be same as VBLRD. The increase in voltage on the gate of NMOS transistor 5807 increases the current flow through NMOS transistor 5807 which causes the voltage of the source of NMOS transistor 5807 to also increase until the voltage of the bitline equals VBLRD.

Figure 61:
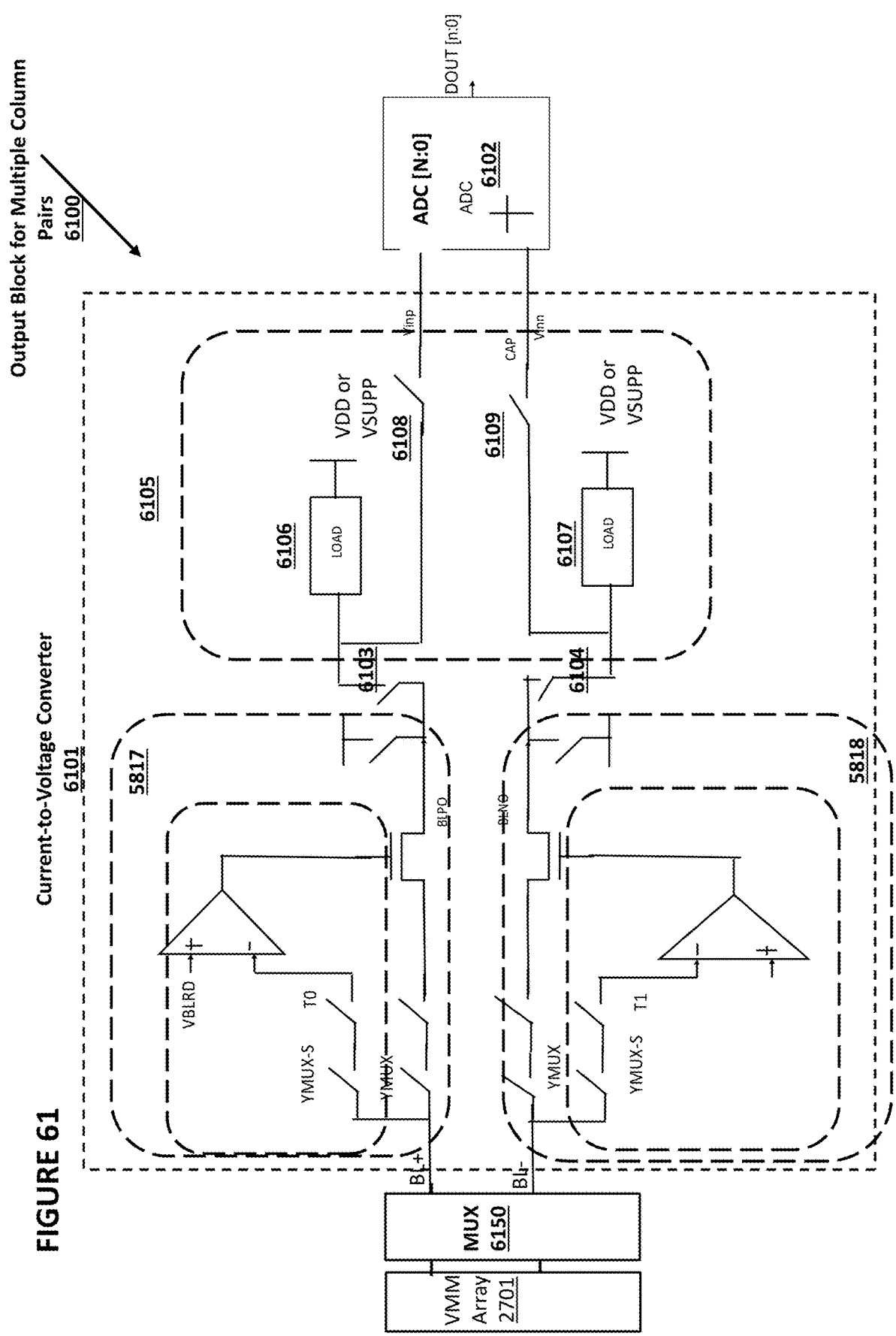
FIG. 61 depicts an output block.

FIG. 61 depicts output block for multiple columns 6100, which comprises current-to-voltage (ITV) converter 6101, ADC 6102, and multiplexor 6150. ADC 6102 can be an SAR ADC (Successive Approximation Register ADC), Slope ADC, Sigma Delta ADC, or Algorithmic (aka Cyclic) ADC, without limitation.

Multiplexor 6150 is coupled to a plurality of column pairs in VMM array 2701 and can connect any pair within that plurality of column pairs to current-to-voltage converter 6101. The connected column pair carries current BL+ and BL−, which is understood to be the column pair selected by multiplexor 6150.

Current-to-voltage converter 6101 converts current BL+ into voltage Vinp (a first voltage) and converts current BL− into voltage Vinn (a second voltage). Current-to-voltage converter 6101 comprises BL+ regulation circuit 5817 and BL− regulation circuit 5818, which were discussed previously with reference to FIG. 58, and which will not be described again in the interest of efficiency.

Current-to-voltage converter 6101 further comprises switches 6103 and 6104 and load circuit 6105. Load circuit 6105 is shared among multiple instantiations of output block for column pair 6100 for multiple column pairs. Load circuit 6105 comprises load 6106 (which can comprise a capacitor, a resistor, MOS transistor, or other load), load 6107 (which can comprise a capacitor, a resistor, or other load), and switches 6108 and 6109. When switch 6103 is closed, load 6106 is coupled between the output of BL+ regulation circuit 5817 and VDD or VSUPP. When switch 6104 is closed, load 6107 is coupled between the output of BL− regulation circuit 5818 and VDD or VSUPP.

Figure 62:
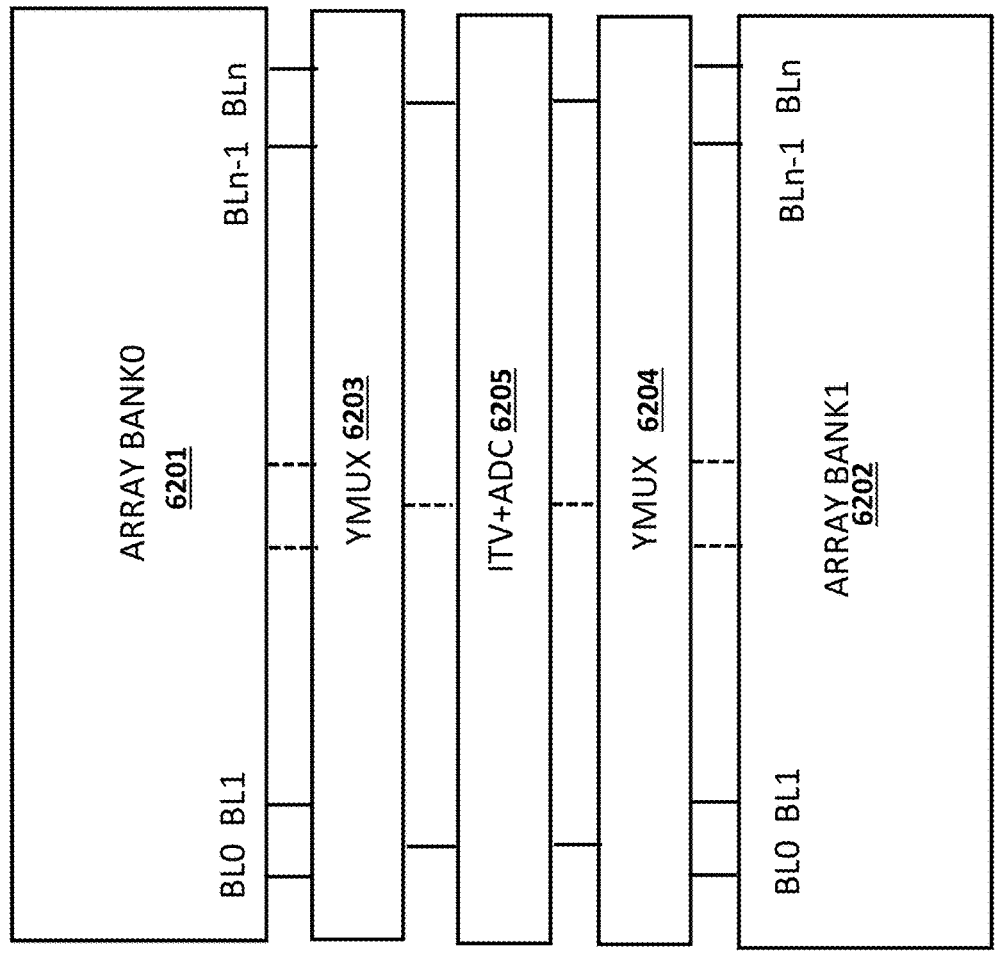
FIG. 62 depicts a VMM system.

FIG. 62 depicts VMM system 6200. VMM system 6200 comprises VMM arrays 6201 and 6202 (each of which is an instantiation of VMM array 2701, and are respectively denoted BANK0, BANK1), column multiplexors 6203 and 6204, and current-to-voltage converter and analog-to-digital converter block 6205 (which comprises a plurality of output blocks based on output block for column pair 5800 in FIG. 58, output block for column pair 5900 in FIG. 59, output block for multiple columns 6000 in FIG. 60, or output block for multiple columns 6100 in FIG. 61). In this example, unselected bit lines from an unselected array among VMM arrays 6201 and 6202 are used as capacitive loads to serve as loads for load 5819 in FIG. 58; load 5915 in FIG. 59; load 6010 in FIG. 60; and loads 6106 and 6107 in FIG. 61.

Figure 63:
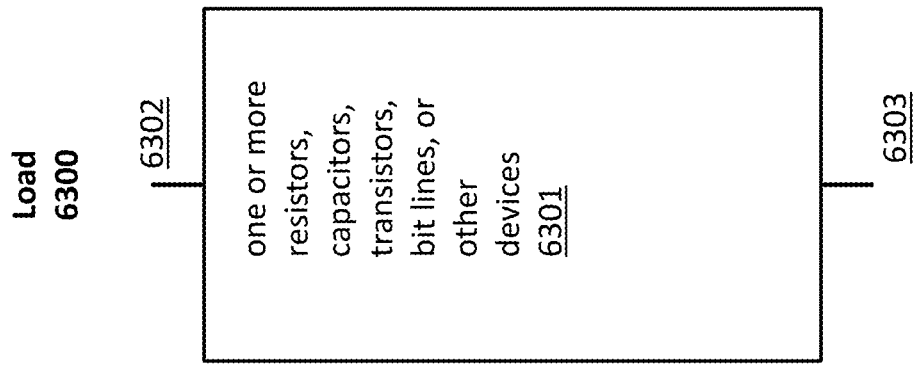
FIG. 63 depicts examples of a load.

FIG. 63 depicts load 6300, which can be used for any of loads 5302 and 5305 in FIG. 53, loads 5403 and 5404 in FIG. 54, load 5819 in FIG. 58, load 5915 in FIG. 59, load 6010 in FIG. 60, and loads 6106 and 6107 in FIG. 61. Load 6300 comprises one or more resistors, capacitors, transistors, bit lines (such as an unselected bit line in an unselected memory array as described above with reference to FIG. 62), or other devices 6301, coupled to a first terminal 6302 and a second terminal 6303.

The high supply for the ITV load in FIGS. 49, 50, 51, 53, 54, 58, 59, 60, and 61 can come from a global voltage regulation circuit or a local voltage regulation circuit such as a local replica voltage supply circuit.

It should be noted that, as used herein, the terms "over" and "on" both inclusively include "directly on" (no intermediate materials, elements or space disposed therebetween) and "indirectly on" (intermediate materials, elements or space disposed therebetween). Likewise, the term "adjacent" includes "directly adjacent" (no intermediate materials, elements or space disposed therebetween) and "indirectly adjacent" (intermediate materials, elements or space disposed there between), "mounted to" includes "directly mounted to" (no intermediate materials, elements or space disposed there between) and "indirectly mounted to" (intermediate materials, elements or spaced disposed there between), and "electrically coupled" includes "directly electrically coupled to" (no intermediate materials or elements there between that electrically connect the elements together) and "indirectly electrically coupled to" (intermediate materials or elements there between that electrically connect the elements together). For example, forming an element "over a substrate" can include forming the element directly on the substrate with no intermediate materials/elements therebetween, as well as forming the element indirectly on the substrate with one or more intermediate materials/elements there between.

What is claimed is:

1. A system comprising:
    an array of non-volatile memory cells arranged into rows and columns, the array comprising a first bit line coupled to a first column of non-volatile memory cells and a second bit line coupled to a second column of non-volatile memory cells;
    an output block coupled to the array, the output block comprising:
        a current-to-voltage converter to convert a first current on the first bit line into a first voltage and to convert a second current on the second bit line into a second voltage; and
        an analog-to-digital converter to convert a voltage received on a first input into a set of output bits;
        a first switch to apply, when closed, the first voltage to the first input of the analog-to-digital converter; and
        a second switch to apply, when closed, the second voltage to the first input of the analog-to-digital converter.

2. The system of claim 1, wherein the analog-to-digital converter comprises a reference input to receive a reference voltage, wherein the set of output bits are generated by comparing the one or more of the first and voltage and the second voltage to the reference voltage.

3. The system of claim 1, wherein the analog-to-digital converter comprises a comparator comprising an inverting input and a non-inverting input, the non-inverting input to receive a reference voltage.

4. The system of claim 1, wherein the analog-to-digital converter comprises a successive-approximation-register (SAR) analog-to-digital converter.

5. A system comprising:
    an array of non-volatile memory cells arranged into rows and columns, the array comprising a first bit line coupled to a first column of non-volatile memory cells and a second bit line coupled to a second column of non-volatile memory cells; and
    an output block coupled to the array, the output block comprising:
        a current-to-voltage converter to convert a first current on the first bit line into a first voltage and to convert a second current on the second bit line into a second voltage; and
        an analog-to-digital converter to convert one or more of the first voltage and the second voltage into a set of output bits;
        wherein the current-to-voltage converter comprises:
            a first switch set coupled to the first bit line;
            a second switch set coupled to the first bit line;
            a third switch set coupled to the second bit line; and
            a fourth switch set coupled to the second bit line.

6. The system of claim 1, wherein the current-to-voltage converter comprises one or more of a resistor and a capacitor to convert current into voltages.

7. The system of claim 6, wherein the voltages are referenced to a voltage supply or ground.

8. A system comprising:
an array of non-volatile memory cells arranged into rows and columns, the array comprising a first bit line coupled to a first column of non-volatile memory cells and a second bit line coupled to a second column of non-volatile memory cells; and
an output block coupled to the array, the output block comprising:
a current-to-voltage converter to convert a first current on the first bit line into a first voltage and to convert a second current on the second bit line into a second voltage; and
an analog-to-digital converter to convert one or more of the first voltage and the second voltage into a set of output bits;
wherein the current-to-voltage converter comprises a load shared across multiple bitlines to convert currents into voltages.

9. The system of claim 8, wherein the analog-to-digital converter is shared by a plurality of current-to-voltage converters.

10. The system of claim 8, wherein the load comprises one or more of a resistor and a capacitor.

11. The system of claim 8, wherein the load comprises an unselected bitline.

12. The system of claim 11, wherein the unselected bitline is in an unselected memory array.

13. A system comprising:
an array of non-volatile memory cells arranged into rows and columns, the array comprising a first bit line coupled to a first column of non-volatile memory cells and a second bit line coupled to a second column of non-volatile memory cells; and
an output block coupled to the array, the output block comprising:
a current-to-voltage converter to convert a first current on the first bit line into a first voltage and to convert a second current on the second bit line into a second voltage; and
an analog-to-digital converter to convert one or more of the first voltage and the second voltage into a set of output bits;
wherein the current-to-voltage converter comprises one or more of a resistor and a capacitor to convert current into voltages and wherein a terminal of the one or more of the resistor and the capacitor is connected a supply voltage.

14. The system of claim 13, wherein the current-to-voltage converter comprises the capacitor and the capacitor is shared with the analog-to-digital converter.

15. The system of claim 1, where the output bits indicate a differential weight stored in the array.

16. A system comprising:
an array of non-volatile memory cells arranged into rows and columns, the array comprising a first bit line coupled to a first column of non-volatile memory cells and a second bit line coupled to a second column of non-volatile memory cells; and
an output block coupled to the array, the output block comprising:
a current-to-voltage converter to convert a current on the first bit line into a first voltage and to convert a current on the second bit line into a second voltage, the current-to-voltage converter comprising a shared load coupled to the first bit line and the second bit line; and
an analog-to-digital converter to convert a difference between the first and second voltages into a set of output bits.

17. A system comprising:
an array of non-volatile memory cells arranged into rows and columns, the array comprising a first bit line coupled to a first column of non-volatile memory cells and a second bit line coupled to a second column of non-volatile memory cells; and
an output block coupled to the array, the output block comprising:
a current-to-voltage converter to convert a current on the first bit line into a first voltage and to convert a current on the second bit line into a second voltage; and
an analog-to-digital converter to convert the first and second voltages into a set of output bits;
wherein the current-to-voltage converter converts the first current into the first voltage by running the first current through a shared load.

18. The system of claim 17, wherein the voltage is referenced to a supply voltage or to ground.

19. A method comprising:
converting a first current on a first bit line coupled to a first column of non-volatile memory cells in an array of non-volatile memory cells arranged into rows and columns into a first voltage;
converting a second current on a second bit line coupled to a second column of non-volatile memory cells in the array into a second voltage;
closing a first switch to convert the first voltage into a first set of output bits; and
closing a second switch to convert the second voltage into a second set of output bits.

* * * * *